US007019883B2

(12) United States Patent
Moon et al.

(10) Patent No.: US 7,019,883 B2
(45) Date of Patent: *Mar. 28, 2006

(54) DYNAMIC OPTICAL FILTER HAVING A SPATIAL LIGHT MODULATOR

(75) Inventors: John Moon, Wallingford, CT (US); Alan D. Kersey, South Glastonbury, CT (US); James Sirkis, Wallingford, CT (US); James Dunphy, South Glastonbury, CT (US); Joseph Pinto, Wallingford, CT (US); Paul Szczepanek, Middletown, CT (US); Michael Davis, Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 201 days.

This patent is subject to a terminal disclaimer.

(21) Appl. No.: 10/115,647

(22) Filed: Apr. 3, 2002

(65) Prior Publication Data
US 2002/0176151 A1    Nov. 28, 2002

Related U.S. Application Data

(60) Provisional application No. 60/365,461, filed on Mar. 18, 2002, provisional application No. 60/365,741, filed on Mar. 18, 2002, provisional application No. 60/332,319, filed on Nov. 16, 2001, provisional application No. 60/311,002, filed on Aug. 8, 2001, provisional application No. 60/281,079, filed on Apr. 3, 2001.

(51) Int. Cl.
*G02B 26/00* (2006.01)

(52) U.S. Cl. ............... 359/290; 359/291; 359/292; 359/571; 359/572; 359/573

(58) Field of Classification Search ........ 359/297–298, 359/308, 900, 571–573, 290–292, 295
See application file for complete search history.

(56) References Cited
U.S. PATENT DOCUMENTS 4,626,066 A    12/1986  Levinson ............... 385/22

(Continued)

FOREIGN PATENT DOCUMENTS

EP    1 052 868 A2    11/2000

(Continued)

OTHER PUBLICATIONS

Texas Instruments, Provisional Pat. Appl. No. 60/250,520 Filed Nov. 30, 2000, Ref from Publication No. 2002/0081070, Tew.

(Continued)

*Primary Examiner*—Hung Xuan Dang
*Assistant Examiner*—Joseph Martinez

(57) ABSTRACT

An dynamic optical filter 10 is provided to selectively attenuate or filter a wavelength band(s) of light (i.e., optical channel(s)) or a group(s) of wavelength bands of an optical WDM input signal 12. The optical filter is controllable or programmable to selectively provide a desired filter function. The optical filter 10 includes a spatial light modulator 36, which comprises an array of micromirrors 52 that effectively forms a two-dimensional diffraction grating mounted in a retro-reflecting configuration. Each optical channel 14 is dispersed separately or overlappingly onto the array of micro-mirrors 52 along a spectral axis or direction 55 such that each optical channel or group of optical channels are spread over a plurality of micromirrors to effectively pixelate each of the optical channels or input signal. Each channel 14 or group of channels may be selectively attenuated by flipping or tilting a selected number of micromirrors to thereby deflect a portion of the incident radiation away from the return optical path. The micro-mirrors operate in a digital manner by flipping between a first and second position in response to a control signal 56 provided by a controller 58 in accordance with an attenuation algorithm and an input command 60. The switching algorithm may provide a bit (or pixel) map or look-up table indicative of the state of each of the micromirrors 52 of the array to selectively attenuate the input signal and provide a modified output signal 38 at optical fiber 40.

20 Claims, 51 Drawing Sheets

U.S. PATENT DOCUMENTS

| | | | | |
|---|---|---|---|---|
| 4,710,732 | A | * 12/1987 | Hornbeck | 359/291 |
| 4,799,795 | A | 1/1989 | Fateley | 356/10 |
| 4,819,084 | A | 4/1989 | Bark | 358/296 |
| 5,121,239 | A | 6/1992 | Post | 359/272 |
| 5,158,420 | A | 10/1992 | Weyer | 414/694 |
| 5,166,766 | A | 11/1992 | Grudkowski et al. | 257/15 |
| 5,504,575 | A | 4/1996 | Stafford | 356/330 |
| 5,696,614 | A | 12/1997 | Ishikawa et al. | |
| 5,699,462 | A | 12/1997 | Fouquet et al. | 385/18 |
| 5,729,386 | A | 3/1998 | Hwang | 359/618 |
| 5,774,604 | A | 6/1998 | McDonald | 385/18 |
| 5,777,781 | A | 7/1998 | Nam et al. | |
| 5,915,063 | A | 6/1999 | Colbourne et al. | 385/140 |
| 5,960,133 | A | 9/1999 | Tomlinson | |
| 6,097,859 | A | 8/2000 | Solgaard et al. | |
| 6,128,077 | A | 10/2000 | Jovin et al. | 356/310 |
| 6,160,928 | A | 12/2000 | Schroeder | 385/18 |
| 6,204,946 | B1 | 3/2001 | Aksyuk et al. | 398/9 |
| 6,222,954 | B1 * | 4/2001 | Riza | 385/18 |
| 6,246,818 | B1 | 6/2001 | Fukushima | 385/47 |
| 6,263,127 | B1 | 7/2001 | Dragone et al. | 385/24 |
| 6,275,623 | B1 * | 8/2001 | Brophy et al. | 385/14 |
| 6,434,291 | B1 | 8/2002 | Kessler et al. | 385/24 |
| 6,459,484 | B1 | 10/2002 | Yokoi | 356/318 |
| 6,525,863 | B1 | 2/2003 | Riza | 359/290 |
| 6,671,295 | B1 * | 12/2003 | Gutin | 372/20 |
| 2001/0046350 | A1 | 11/2001 | Tedesco | |
| 2002/0009257 | A1 | 1/2002 | Bouevitch et al. | |
| 2002/0081070 | A1 | 6/2002 | Tew | |

FOREIGN PATENT DOCUMENTS

| | | |
|---|---|---|
| WO | WO 01/11419 A2 | 2/2001 |
| WO | WO 01/18577 A1 | 3/2001 |

OTHER PUBLICATIONS

S. Yuan et al., "General Formula for Coupling-loss Characterization of Single-Mode Fiber Collimators by Use of Gradient-Index Rod Lenses, Applied Optics", vol. 38. No. 15, May 20, 1999, pp. 3214-3222.

N. Riza, "Reconfigurable Optical Wireless", IEEE Lasers and Electro-Optics Society 1999 Annual Meeting, vol. 1, pp. 70-71.

N. Riza et al., "Digitally Controlled Fault-Tolerant Multiwavelength Programmable Fiber-Optic Attenuator Using a Two-Dimensional Digital Micromirror Device", 1999 Optical Society of America.

N. Riza et al., "Multiwavelength Three Dimensional 2×2 Fiber-Optic Switch Structure Using Small Tilt Micro-Mirrors", SPIE vol. 3749, pps 470-471.

G. Love, "Liquid-crystal Phase Modulator For Unpolarized Light", Applied Optics, vol. 32, No. 13, May 1, 1993, pps 2222-2223.

N. Riza et al., "Synchronous Amplitude and Time Control for an Optimum Dynamic Range Variable Photonic Delay Line", Applied Optics, vol. 38, No. 11, Apr. 10, 1999, 2309-2318.

N. Riza et al., "Robust Packaging of Photonic RF Modules Using Ultra-Thin Adaptive Optical Interconnect Devices", SPIE vol. 3160, pps. 170-176.

N. Riza et al., "Demonstration of a Liquid-crystal adaptive alignment tweeker for high-speed Infrared Band Fiber-Fed Free-space Systems", Opt. Eng. 37(6), Jun. 1998, 1876-1880.

M. D. Johnson et al., "Two-axis Micromirror Scanner", SPIE vol. 3787, Jul. 1999, pps. 88-95.

H. Laor et al., "Performance of a S76×576 Optical Cross Connect", National Fiber Optic Engineers Conference, Sep. 26-30, 1999, pps. 276-281.

Patent Abstract of Japan, F. Nobuhiro, "Optical Demultiplexer", Publication No. 62264009 Publication Date, Nov. 17, 1987.

* cited by examiner

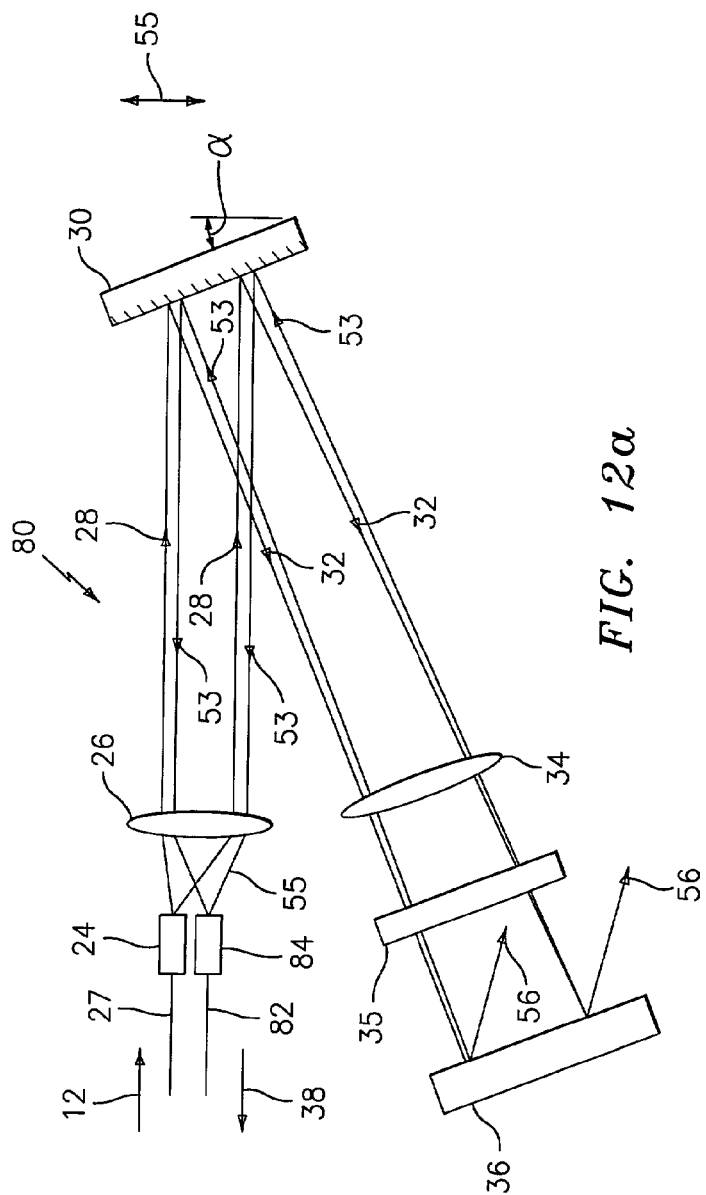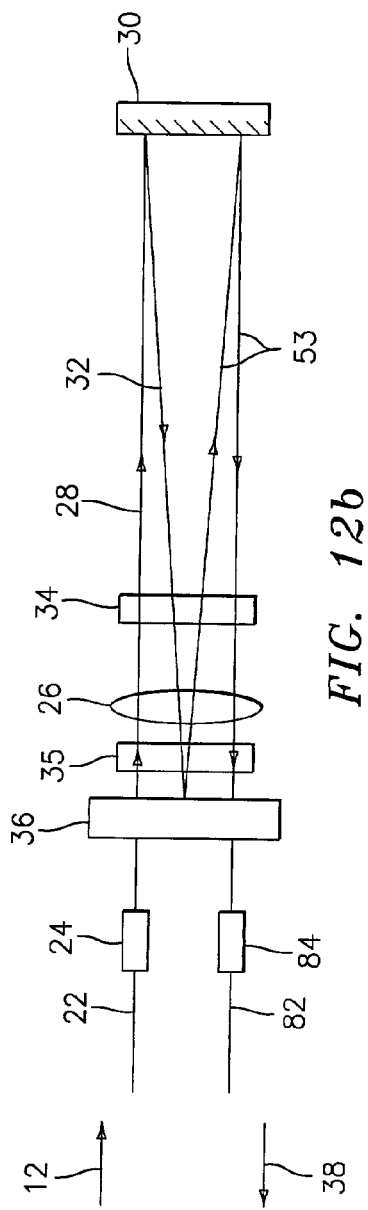
FIG. 12a
FIG. 12b

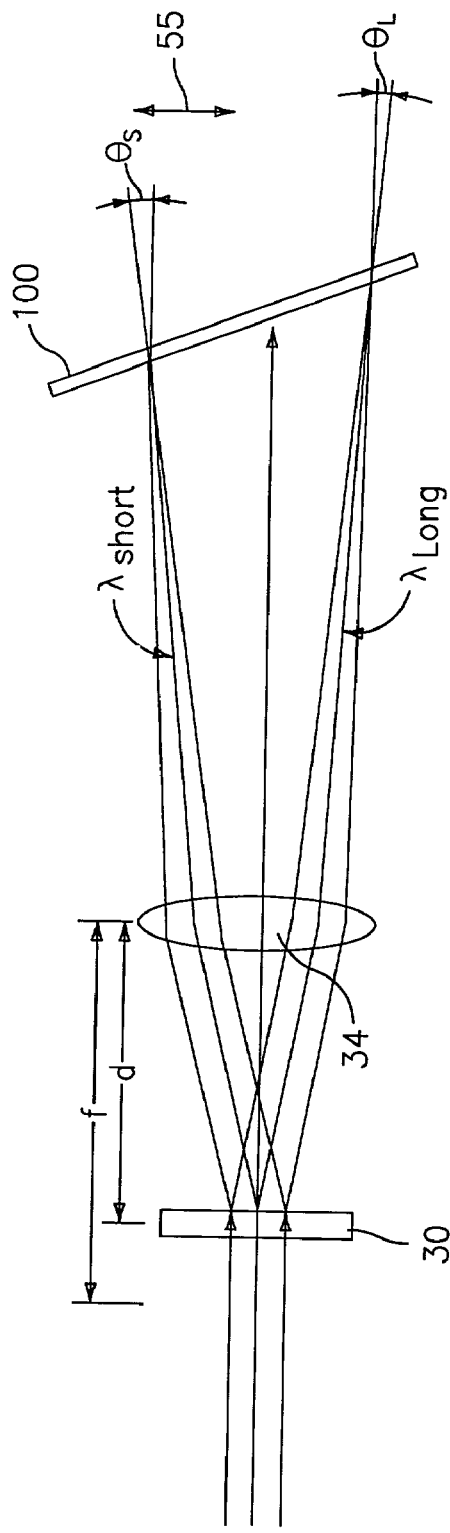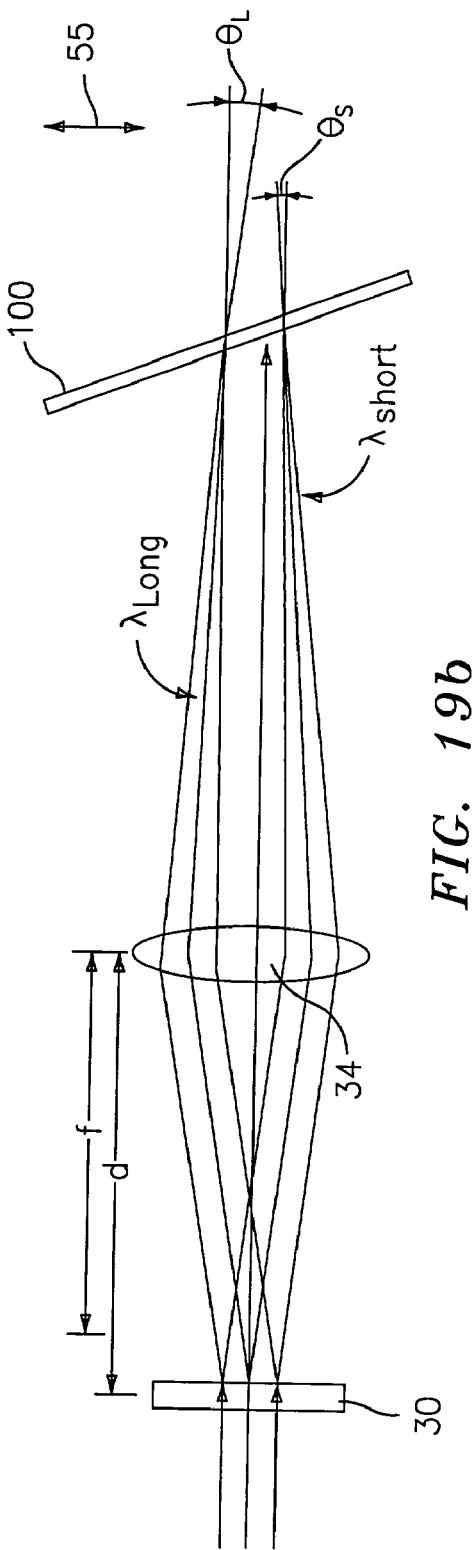
FIG. 19a
FIG. 19b

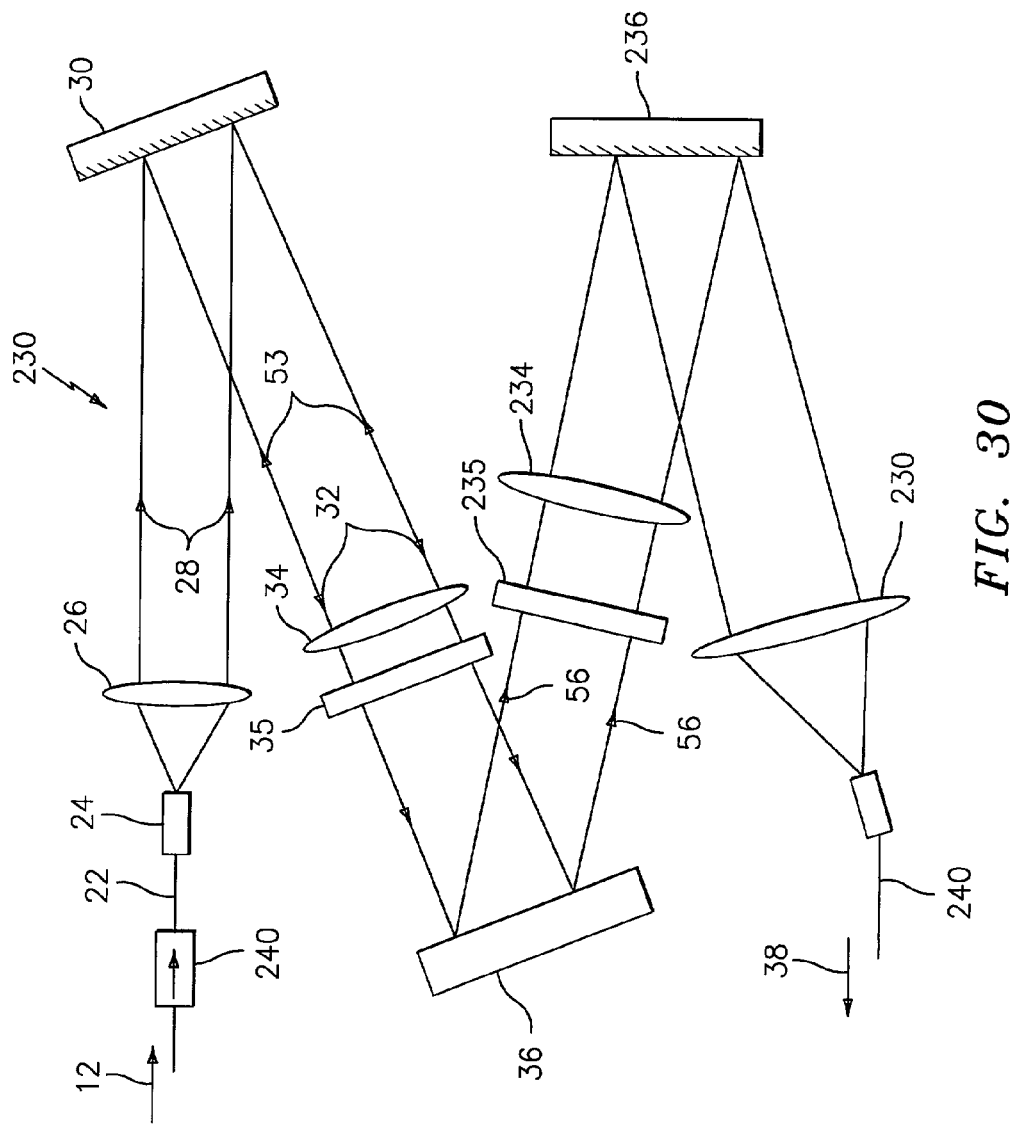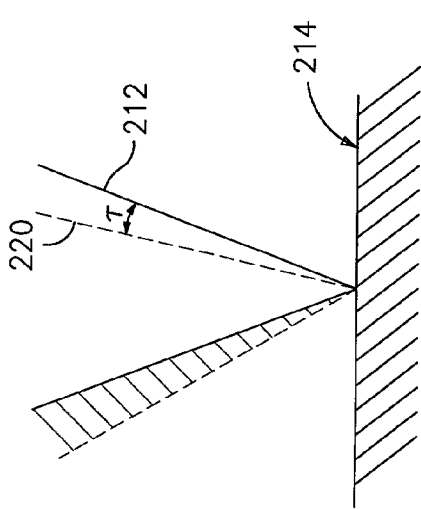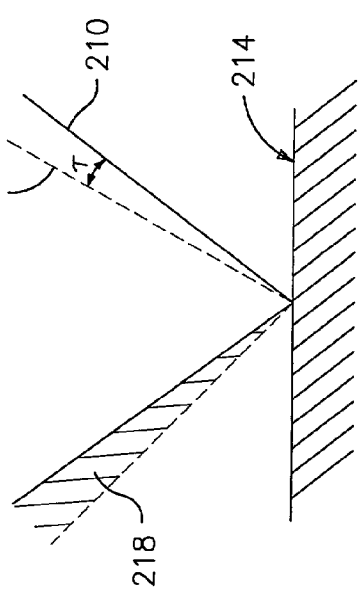

DYNAMIC OPTICAL FILTER HAVING A SPATIAL LIGHT MODULATOR

CROSS REFERENCES TO RELATED APPLICATIONS

This application claims the benefit of U.S. Provisional Application No. 60/281,079, filed Apr. 3, 2001; U.S. Provisional Application No. 60/311,002, filed Aug. 8, 2001; U.S. Provisional Application No. 60/332,319, filed Nov. 16, 2001; U.S. Provisional Application No. 60/365,741, filed Mar. 18, 2002; U.S. Provisional Application No. 60/365,461, filed Mar. 18, 2002; and U.S. patent application Ser. No. 10/120,617, filed Apr. 11, 2002, all of which are incorporated herein by reference in their entirety.

TECHNICAL FIELD

The present invention relates to optical filters, and more particularly to dynamic optical filter, such as dynamic gain equalization filters (DGEFs), including a spatial light modulator, such as an array of micro-mirrors to selectively attenuate a wavelength division multiplexed (WDM) optical signal.

BACKGROUND ART

MEMS micro-mirrors have been widely explored and used for optical switching and attenuation applications. The most commonly used application of a MEMS micro-mirror device being optical cross-connect switching. In most cases, individual micro-mirror elements are used to 'steer' a beam (i.e., an optical channel) to a switched port or to deflect the beam to provide attenuation on a channel-by-channel basis. Consequently, if the system is designed for a particular 'wavelength plan'—e.g. "X" number of channels at a spacing "Y", the system is not 'scalable' to other wavelength plans.

Further, dynamic gain equalization (or "flattening") is a critical technology for deployment of next-generation optical network systems. Dynamic gain equalization filters (DGEF's) or Dynamic gain-flattening filters (DGFF's) function by adding varying amounts of attenuation at different wavelengths in the signal spectrum of optical fiber communication systems to equalize the power at each wavelength. For instance, a DGEF may be designed to operate in the "C-band" (~1530–1565 nm) of the communication spectrum by being able to selectively attenuate spectrally concatenated "bands" of some pre-selected spectral width (e.g., 3 nm). The total number of bands within the operating range of a DGEF is determined by the width of each individual band.

A method of attenuating or flattening a WDM signal is to spatially separate different wavelengths, channels or wavelength bands using bulk diffraction grating technology, as is known in spectroscopy. For example, each channel of a DGEF is mapped to a different location on a generic micro-electro-mechanical system (MEMS) device, whereby each channel or band of channels is appropriately attenuated to flatten or equalize the output signal. The MEMs device, although discussed as a DGEF may also embody a DGFF, may be composed of a series of tilting mirrors, wherein each discrete channel hits near the center of a respective mirror and does not hit the edges. In other words, one optical channel reflects off a single respective mirror.

The MEMs-based DGEF that has one mirror for each optical channel are very sensitive to calibration and alignment. They are also sensitive to environmental changes, such as shock, vibration and temperature changes. Further, these DGEFs are not wavelength plan independent. In other words, a DGEF for compensating a WDM signal having 50 GHz spacing cannot compensate a WDM signal having 25 GHz spacing without having to alter the optical components or recalibrating the device.

SUMMARY OF THE INVENTION

An object of the present invention is to provide a dynamic optical filter, such as a DGEF, having a spatial light modulator, wherein the spatial light modulator pixelates the spectrum of the optical signal, to thereby permit attenuating or filtering of the optical signal by redirecting a portion (or pixelated portion) of light away from a return path.

In accordance with an embodiment of the present invention, an optical filter includes An dynamically selectable optical filter, comprising: a light dispersive element which receives an optical input signal having various wavelength channels of light, which provides a separated light signal having said wavelength channels spatially distributed by a predetermined amount; a pixellating device, which receives said separated light, having a two dimensional array of pixels, each of said channels being incident on a plurality of pixels, each of said pixels having a first reflection state and a second reflection state in response to a pixel control signal, and said pixellating device providing a reflected separated light signal indicative of light provided from said first reflection state; a light combining element, which receives said reflected separated light, recombines said reflected separated light, and provides an optical filter output signal indicative of a spectrally filtered optical input signal based on a filter function; and a controller which generates said pixel control signal indicative of said filter function and wherein said filter function is selectable based on a desired spectral filter profile.

BRIEF DESCRIPTION OF THE DRAWINGS

FIG. 12a is a block diagram of the spectral plane in partial illustration of another embodiment of an optical filter including a spatial light modulator in accordance with the present invention;

FIG. 12b is a block diagram of the spatial plane of the embodiment of the optical filter of FIG. 9a;

FIG. 19a is a graphical representation of a portion of the optical filter wherein the grating order causes the shorter wavelengths of light to image onto the micromirror device that is closer than the section illuminated by the longer wavelengths, in accordance with the present invention;

FIG. 19b is a graphical representation of a portion of the optical filter wherein the grating order causes the longer wavelengths of light to image onto the micromirror device that is closer than the section illuminated by the shorter wavelengths, in accordance with the present invention;

FIG. 28 is a graphical representation of the light of an optical channel reflecting off a spatial light modulator, wherein the light is focused relatively tight, in accordance with the present invention;

FIG. 29 is a graphical representation of the light of an optical channel reflecting off a spatial light modulator, wherein the light is focused relatively loose compared to that shown in FIG. 28, in accordance with the present invention;

FIG. 30 is a block diagram of another embodiment of an optical filter including a spatial light modulator in accordance with the present invention;

BEST MODE FOR CARRYING OUT THE INVENTION

Figure 1:
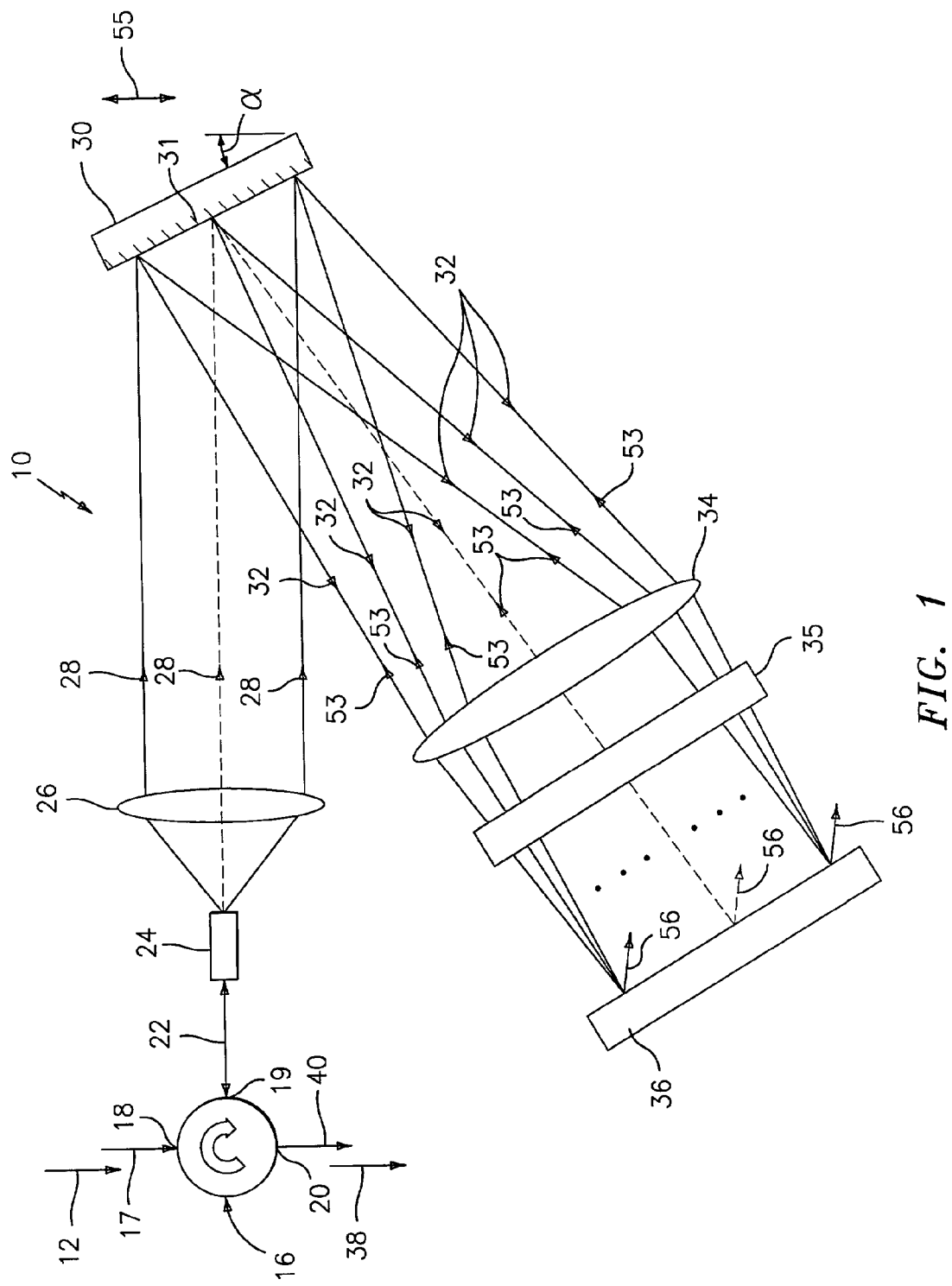
FIG. 1 is a block diagram of an optical filter including a spatial light modulator in accordance with the present invention.
Figure 2:
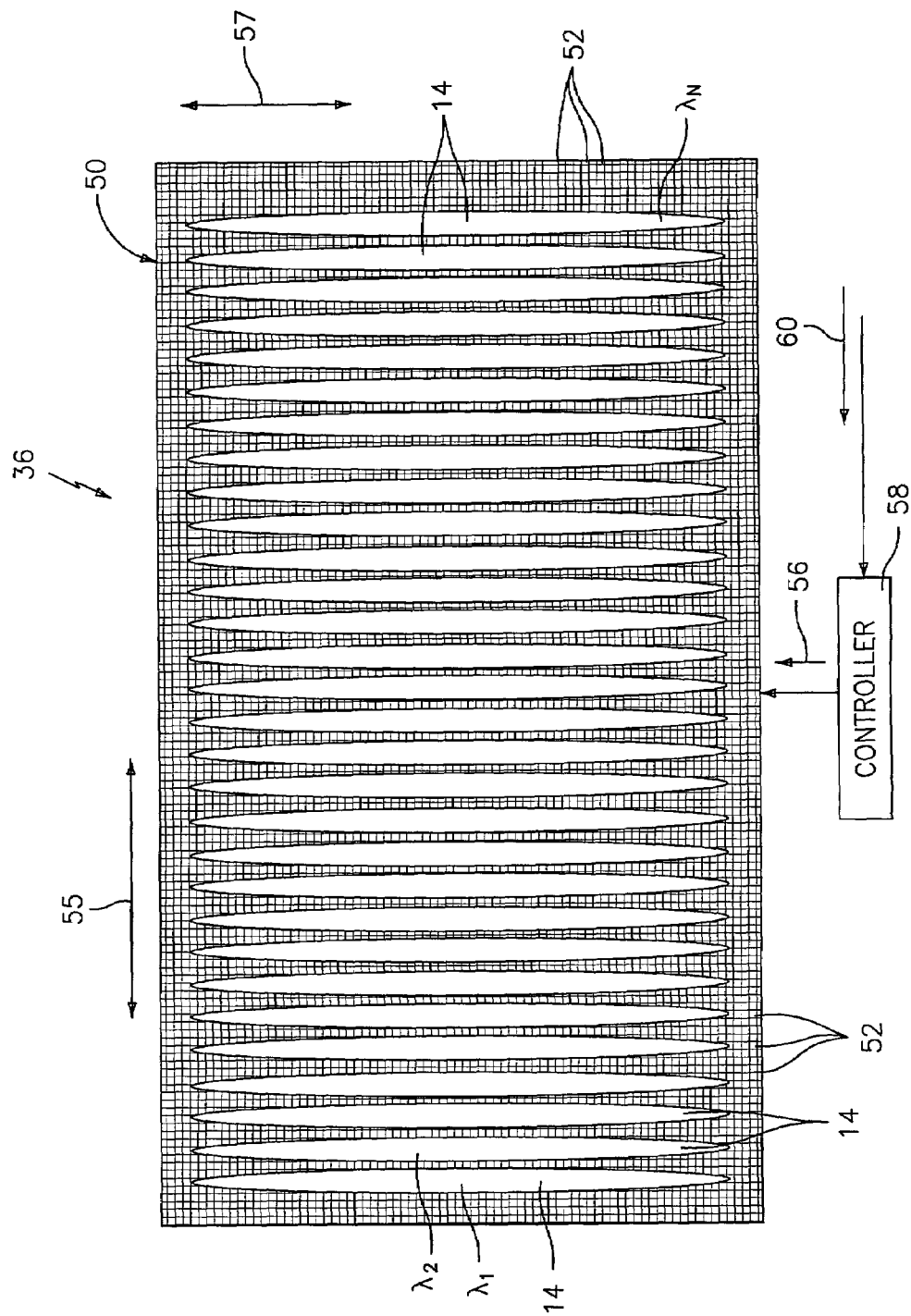
FIG. 2 is a block diagram of a spatial light modulator of the optical filter of FIG. 1 having a micro-mirror device, wherein the optical channels of a WDM input light are substantially dispersed onto the micro-mirror device, in accordance with the present invention.

As shown in FIGS. 1 and 2, an optical filter, generally shown as 10, selectively attenuates or filters a wavelength band(s) of light (i.e., optical channel(s)) or a group(s) of wavelength bands of an optical WDM input signal 12. Each of the optical channels 14 (see FIG. 2) of the input signal 12 is centered at a respective channel wavelength ($\lambda_1, \lambda_2, \lambda_3, \ldots \lambda_N$). The optical filter is controllable or programmable to selectively provide a desired filter function, which will be described in greater detail hereinafter. For example, the optical filter may function as a dynamic gain equalization filter (DGEF) (or dynamic spectral equalizer (DSE)) that selectively attenuates an optical channel or group of optical channels of the optical WDM input signal 12 to equalize the power or gain of the output signal over its spectrum. To simply the description of the optical filter 10 embodying the present invention, the following description of the optical filter will be described as a DGEF. However, one will appreciate that the optical filter may have any desired filter function to provide any desire output signal.

The DGEF 10 includes a spatial light modulator 36 that comprises a micromirror device 50. The micromirror device includes an array of micromirrors 52 that effectively forms a two-dimensional diffraction grating that is mounted in a retro-reflecting configuration, although other configurations are contemplated by the present invention. The micro-mirrors 52 may be positioned or tilted to provide a filter function that provides varying attenuation of the desired spectral range to flatten or equalize the peaks of the input light 12, such as that amplified by an Erbium-doped fiber amplifier (EDFA).

Each optical channel 14 is dispersed onto the array of micro-mirrors 52 along a spectral axis or direction 55 such that each optical channel or group of optical channels are spread over a plurality of micromirrors. Each channel 14 or group of channels may be selectively attenuated by flipping or tilting a selected number of micromirrors away from the return path to thereby effectively pixelate the optical channels or input signal 12, as will be described in greater detail hereinafter.

Referring to FIG. 1, the DGEF 10 further comprises a three-port circulator 16 for directing light from a first port 18 to a second port 19 and from the second port to a third port 20. An optical fiber or pigtail 22 or other known optical attachment is optically connected to the second port of the circulator 16. A capillary tube 24, which may be formed of glass, is attached to one end of the pigtail 22 such as by epoxying or collapsing the tube onto the pigtail 22. The circulator 16 at the first port 18 receives the WDM input signal 12 from an optical network (not shown), for example, via optical fiber 17, and directs the input light to the pigtail 22. The input beam 12 exits the pigtail 22 (into free space) and passes through a collimator 26, which substantially collimates the input beam. The collimator 26 may be an aspherical lens, an achromatic lens, a doublet, a GRIN lens or similar collimating lens or lens system. The collimated input signal 28 is incident on a wavelength dispersion element 30 (e.g., a diffraction grating), which separates or spreads spectrally the optical channels of the collimated input signal 28 by diffracting or dispersing the light from (or through as in the case of a prism or a transmission grating) the light dispersion element.

In one embodiment, the light dispersion element is a diffraction grating 30 that comprises a blank of polished fused silica or glass with a reflective coating (such as evaporated gold or aluminum), wherein a plurality of grooves 31 (or lines) are etched, ruled or otherwise formed in the coating. The diffraction grating 30 has a predetermined number of lines illuminated on the grating surface, such as 600 lines/mm and 1200 lines/mm. The grating 30 may be similar to those manufactured by Thermo RGL, part number 3325FS-660 and by Optometrics, part number 3-9601. Alternatively, the grating may be formed using holographic techniques, as is well known in the art. Further, the light dispersion element may include a prism or arrayed waveguide to disperse the light as the light passes therethrough, or a prism having a reflective surface or coating on its backside to reflect the dispersed light.

The separated light 32 passes through a bulk lens 34 (e.g., a Fourier lens, cylindrical lens), which focuses the separated light onto the micro-mirror device 50 of the spatial light modulator 36, as shown in greater detail in FIG. 2. A $\lambda/4$ wave retardation plate 35 (at for example a nominal wavelength of 1550 nm) may be disposed between the bulk lens 34 and the spatial light modulator 36 to minimize polarization dependent loss (PDL) by compensating for the polarization response of the diffraction grating 30. Alternatively, the $\lambda/4$ wave plate may be eliminated by providing a diffraction grating having low PDL characteristics.

Power attenuation of selected wavelength channels is accomplished with a spatial light modulator, which is capable of deflecting a portion of the incident radiation away from the optical path. The remaining undeflected radiation of the optical channels reflects back through the same optical path to the pigtail 22. The equalized optical channels propagate from the second port 19 to the third port 20 of the optical circulator 16 to provide a gain equalized or pre-emphasized output signal 38 from optical fiber 40. While the DGEF 10 attenuates the optical channels to equalize the power of each channel, one will appreciate that the channels may be selectively attenuated to provide any desired gain profile of the output signal 38.

Figure 3:
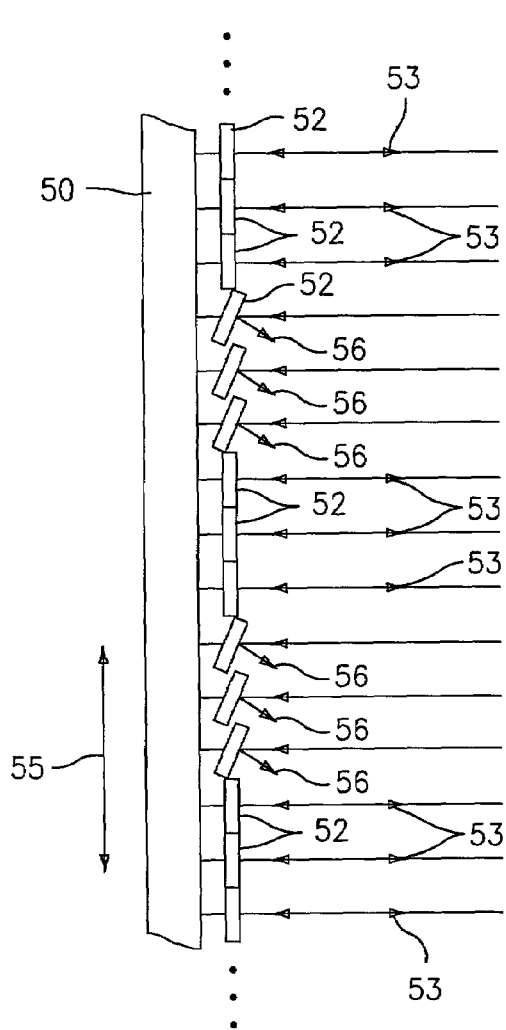
FIG. 3 shows a pictorial view of a partial row of micro-mirrors of the micro-mirror device of FIG. 2 in accordance with the present invention.
Figure 4:
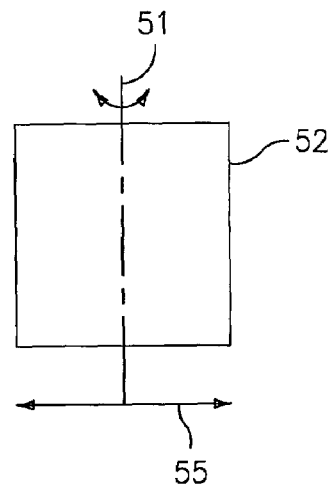
FIG. 4 is a plan view of a micro-mirror of the micro-mirror device of FIG. 2 in accordance with the present invention.

As shown in FIG. 2, the spatial light modulator 36 comprises a micro-mirror device 50 having a two-dimensional array of micro-mirrors 52, which cover a surface of the micro-mirror device. The micro-mirrors 52 are generally square and typically 14–20 μm wide are spaced approximately 1 μm. FIG. 3 illustrates a partial row of micro-mirrors 52 of the micro-mirror device 50. The micro-mirrors may operate in a "digital" manner. In other words, the micromirrors either lie flat in a first position and thus reflect light back along the return path, as indicated by arrows 53. Or the micro-mirrors 52 can be tilted, flipped or rotated to a second position such that the micro-mirrors direct light out of or away from the return path at the predetermined angle (e.g., 20 degrees), as indicated by arrows 56. As described herein the positions of the mirrors, either flat or tilted, are described relative to the optical path wherein "flat" refers to the mirror surface positioned orthogonal to the light path, either coplanar in the first position or parallel as will be more fully described herein after. The micro-mirrors 52 flip about an axis 51 perpendicular to the spectral axis 55, as shown in FIG. 4. One will appreciate, however, that the micro-mirrors may flip about any axis, such as perpendicular to the spatial axis 57 or at a 45 degree angle to the spatial axis (i.e., flip about a diagonal axis extending from opposing corners of the micromirrors).

Referring to FIG. 2, the micro-mirrors 52 are individually flipped between the first position and the second position in response to a control signal 56 provided by a controller 58 in accordance with an attenuation algorithm and an input command 60. The switching algorithm may provide a bit (or pixel) map or look-up table indicative of the state (flat or tilted) of each of the micro-mirrors 52 of the array to selectively attenuate the input signal and provide a modified output signal 38 at optical fiber 40. Alternatively, each group of mirrors 52, which reflect a respective optical channel 14, may be individually controlled by flipping a group of micro-mirrors to attenuate the input signal 12.

One will appreciate that the DGEF 10 may be configured for any wavelength plan or spacing scheme by simply modifying the software.

The optical channel plan independence of the filter is a result of being able to spread a single optical channel over any multiple micromirrors. This can be accomplished in practice using spatial light modulators that have very high fill-factors (i.e. very small optical losses <3 dB) due to "dead space" between active modulator elements. In other words, the DGEF 10 is wavelength plan independent. For example, a DGEF for filtering a 50 GHz WDM optical signal may be modified to filter a 100 GHz or 25 GHz WDM optical signal by simply modifying or downloading a different attenuation algorithm, without modifying the hardware. In other words, any changes, upgrades or adjustments to the DGEF (such as varying the spacing of the channels and center wavelength of the light beams) may be accomplished by simply modifying statically or dynamically the attenuation algorithm (e.g., modifying the bit map).

As best shown in FIGS. 1–3, the micro-mirror device 50 is oriented to reflect the focused light back through the bulk lens 34 to the pigtail 22, as indicated by arrows 53, when the micro-mirrors 52 are disposed in the first position, and reflects the focused light away from the bulk lens 34 when the micro-mirrors 52 are disposed in the second position, as indicated by arrows 56. This "digital" mode of operation of the micro-mirrors advantageously eliminates the need for any type of feedback control for each of the micro-mirrors. The micro-mirrors are either "on" or "off" (i.e., first position or second position, respectively), and therefore, can be controlled by simple digital logic circuits.

FIG. 2 further illustrates the outline of the optical channels 14 of the optical input signal 12, which are dispersed off the diffraction gratings 30 and focused by lens 34, onto the array of micro-mirrors 52 of the micro-mirror device 50. The optical channels have an elliptical cross-section to project the beam over a predetermined number of micro-mirrors 52.

Figure 5:
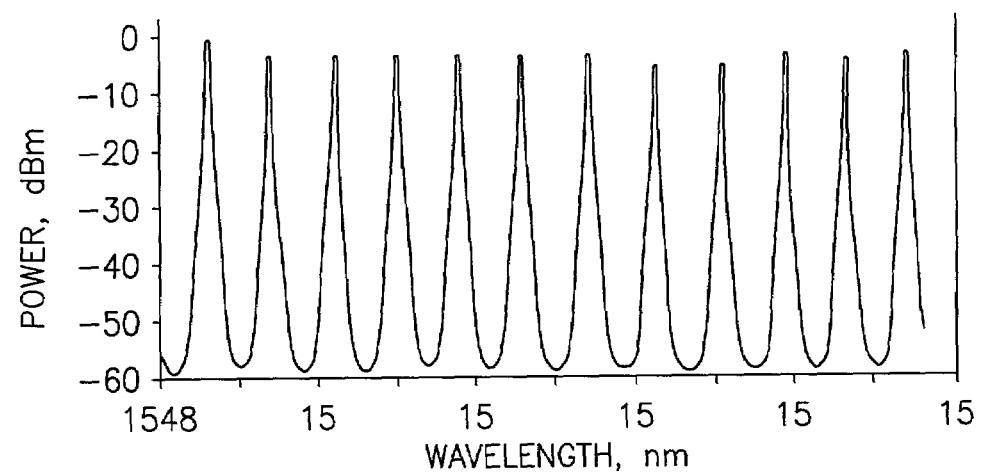
FIG. 5 is a plot of an input optical signal having 50 GHz spacing.
Figure 6:
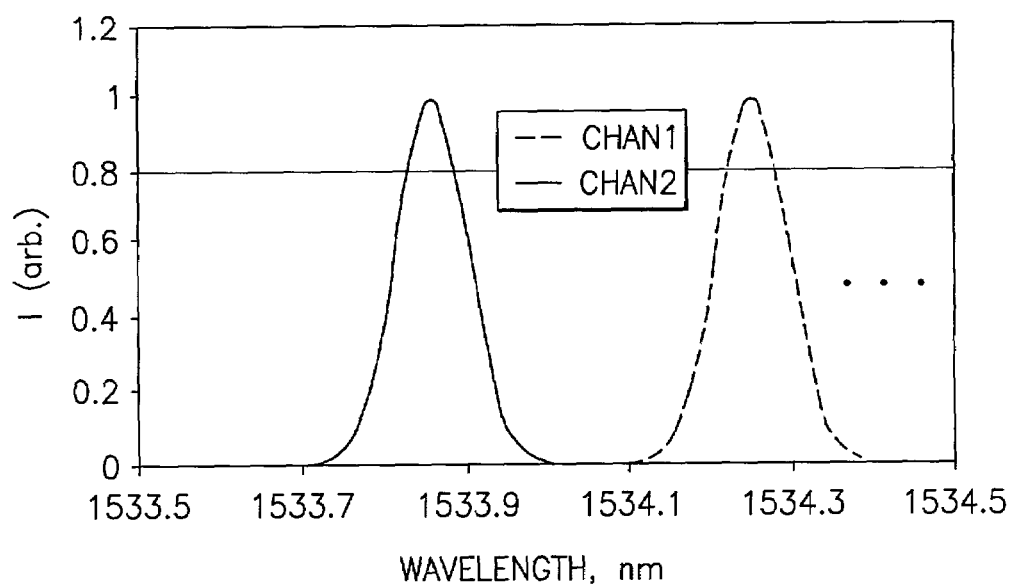
FIG. 6 is a plot of the power of the optical channels imaged onto the micromirror device, wherein the optical channels of a WDM input light are substantially dispersed onto the micro-mirror device as shown in FIG. 2, in accordance with the present invention.

As shown in FIG. 5, the channels 14 of the optical input signal 12 are spaced apart a predetermined distance (e.g., 100 GHz, 50 GHz or 25 GHz spacing) in a non-overlapping manner. Referring to FIG. 6, the optics of the optical filter 10 spread the input signal 12 spectrally over a greater array of the micromirror device such that spacing between the center wavelengths of the channels is increased. Specifically, the grating 30 and the Fourier lens 34 defined the spacing between the optical channels imaged onto the micromirror device. Further, the optics of the optical filter 10 spread spectrally the width of each individual channel that is imaged onto the micromirror device 36. Specifically, the width of the optical beam of each channel imaged onto the micromirror device 36 is defined by the collimating lens 26 and the Fourier lens 34.

One will appreciate though that the diffraction grating 30 and Fourier lens 34 may be designed to reflect and focus any optical channel or group of optical channels with any desired cross-sectional geometry, such as elliptical, circular, rectangular, square, polygonal, etc. Regardless of the cross-sectional geometry selected, the cross-sectional area of the channels 14 should illuminate a plurality of micro-mirrors 52.

Figure 8:
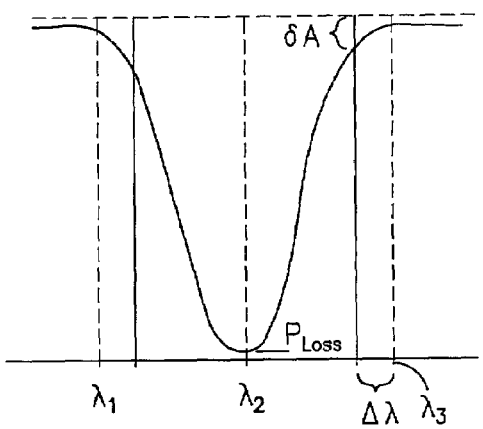
FIG. 8 is a plot of attenuation curve when a single channel is dropped from the optical input signal of the optical filter of FIG. 2.
Figure 7:
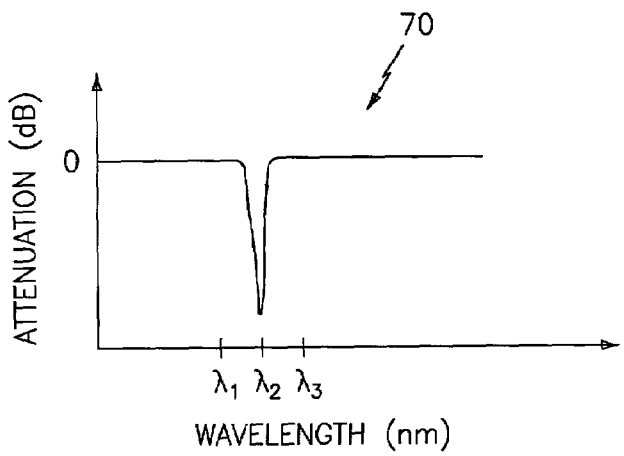
FIG. 7 is a graphical representation of a transmission filter function of an optical filter, wherein the optical channels of a WDM input light are substantially dispersed onto the micro-mirror device as shown in FIG. 2, in accordance with the present invention.

As shown in FIGS. 2 and 6, the optical channels 14 are dispersed and have an elliptical cross-section, such that the optical channels do not substantially overlap spectrally when focused onto the spatial light modulator 36. For example, as shown in FIG. 6, the optical channels 14 are sufficiently separated such that when a channel is substantially attenuated or dropped (e.g. approximately 30 dB power loss) the adjacent channels are attenuated less than approximately 0.1% for unmodulated signals and less than approximately 0.2% for a modulated signal. In other words, as shown in FIGS. 7 and 8, the optical channels are substantially separated and non-overlapping when an optical channel is attenuated or dropped ($P_{Loss}$) such that the power of the adjacent channel drops less than a predetermined level ($\delta A$) at a predetermined delta ($\Delta f$) from the center frequency (or wavelength) of the adjacent channels. For example, for a 50 GHz WDM input signal wherein an optical channel at $\lambda_2$ is attenuated ($P_{Loss}$) greater than 30 dB, the loss ($\delta A$) at adjacent channels is approximately less than 0.2 dB at the channel center +/−10 GHz.

While the cross-sectional area and geometry of the optical channels 14 described and shown hereinbefore are uniform from channel to channel, one will recognize that the cross-sectional area and geometry may vary from channel to channel. Further, one will appreciate that while the spacing between the channels is shown to be uniform, the spacings therebetween may vary. For example, one grouping of channels may be spaced to correspond to a 100 GHz spacing, and another group of channels that are spaced to correspond to a 50 GHz spacing.

To attenuate an optical channel 14, for example, such as that centered at wavelength $\lambda_2$, a predetermined number of micro-mirrors 34 disposed in the area illuminated by the optical channel at $\lambda_2$ are tilted to reflect a portion of the light of the optical channel away from the return path 53. One will appreciate that each portion or pixel of light, which is reflected away from the return path, attenuates the optical channel by a percentage defined by the number of micro-mirrors 34 illuminated by the optical channel at $\lambda_2$. For example assuming each optical channel 14 illuminates 300 micro-mirrors; each micro-mirror is representative of approximately 0.3% attenuation (or approximately 0.01 to 0.02 dB) of the optical signal when the micro-mirror is tilted away. The above example assumes that the intensity of the light of each optical channel is uniform over the entire cross-section of the beam of light. One will appreciate that the intensity spatial profile of the beam of the optical channel may be Gaussian, as shown in FIG. 6, and therefore, the beam intensity illuminating the pixels at the edges (wings) of the beams of the optical channels 14 is less than the center portion of the beams, which advantageously increases the resolution of the selectable attenuation of the optical channel or band.

FIG. 7 is representative of an optical filter function 70 of the optical filter 10, wherein a number of the micro-mirrors 52 illuminated by the optical channel 14 at $\lambda_2$ are tilted away 56 from the return path, and the micro-mirrors of the other optical channels at wavelengths at $\lambda_1, \lambda_3, -\lambda_N$ are flat (i.e., first position) to reflect the light back along the return path 53. Effectively, the optical channel 14 at $\lambda_2$ is dropped from the input light 12. As described hereinabove, the attenuation of the optical channel at $\lambda_2$ may be adjusted by tilting a predetermined number of micro-mirrors to drop a corresponding amount of light to achieve the desired level of loss.

While the micro-mirrors 52 may switch discretely from the first position to the second position, as described hereinabove. The present invention contemplates moving the micro-mirrors continuously (in an "analog" mode) or in discrete incremental steps between the first position and second position. In these modes of operation, the micro-mirrors can be tilted in a continuous range of angles or a plurality of discrete steps (>2 positions). The greater range of angles of each individual micro-mirror provides the added benefit of much more attenuation resolution than in the two, position digital mode described hereinbefore. In the "analog" mode, each micro-mirror 52 can be tilted slightly allowing fully continuous attenuation of the return beam.

Figure 9A:
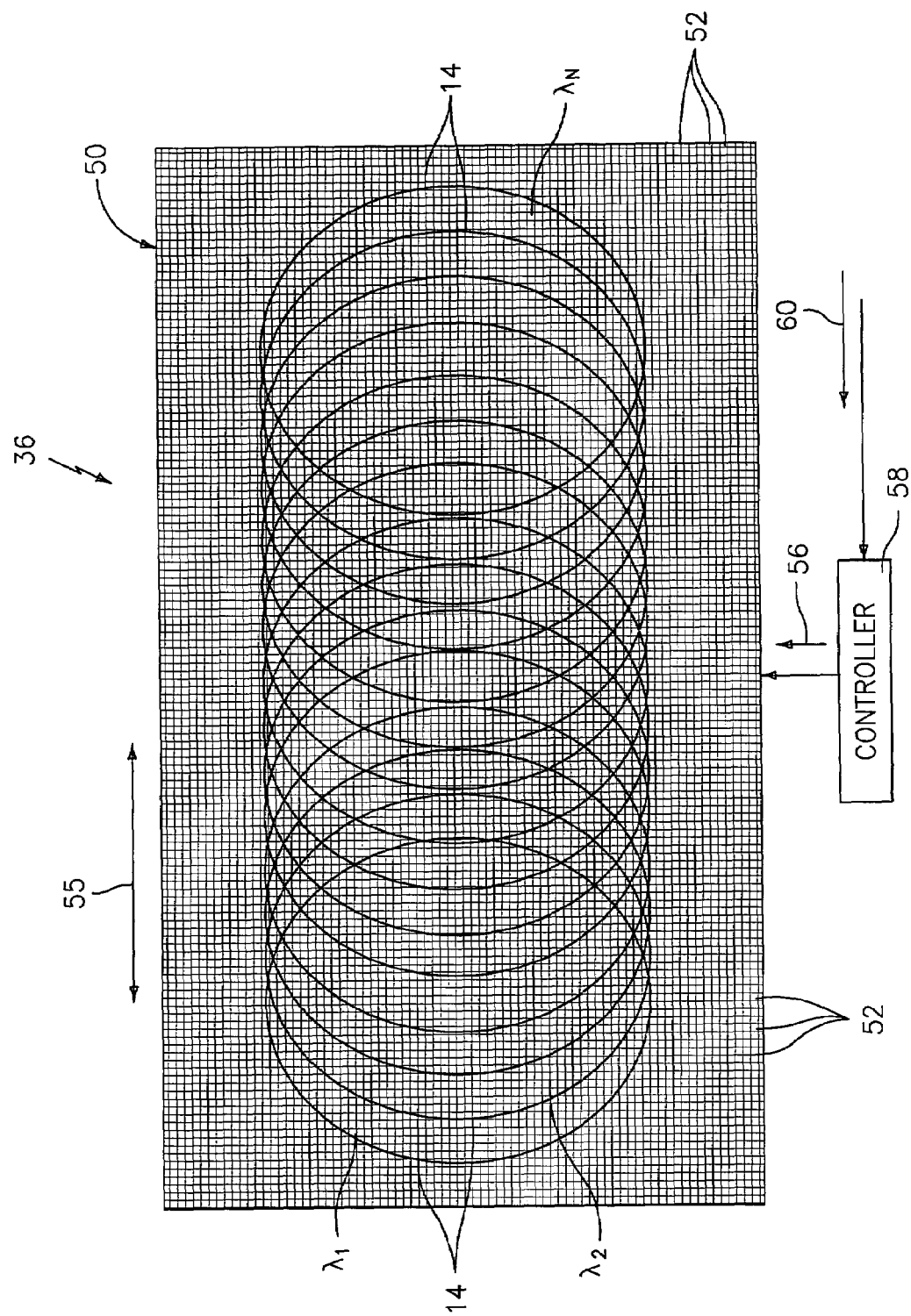
FIGS. 9a–c are block diagrams of a spatial light modulator of another embodiment of an optical filter having a micro-mirror device, wherein the optical channels of a WDM input light are overlappingly dispersed onto the micro-mirror device in various degrees of overlap, in accordance with the present invention.
Figure 9B:
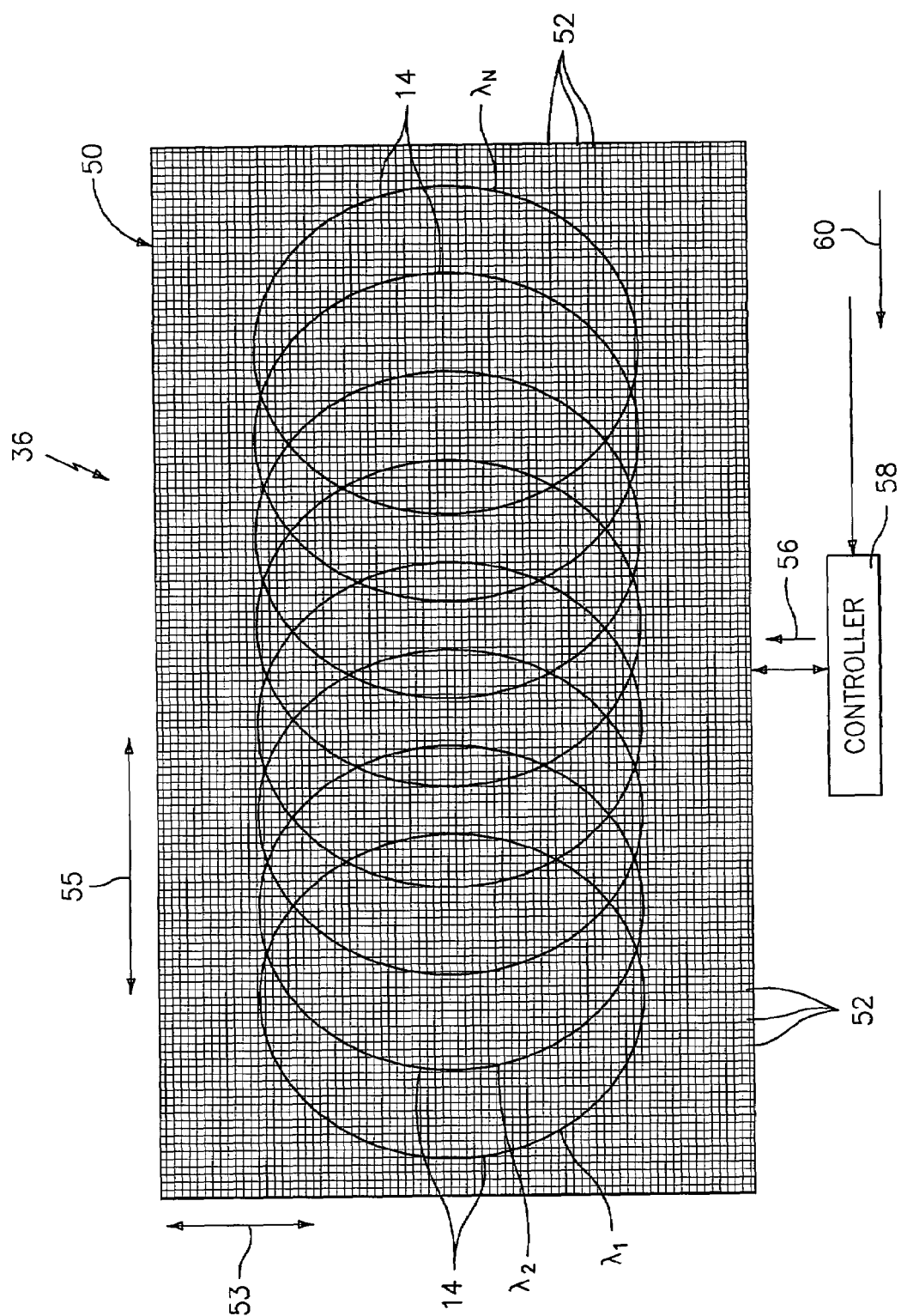
Figure 9C:
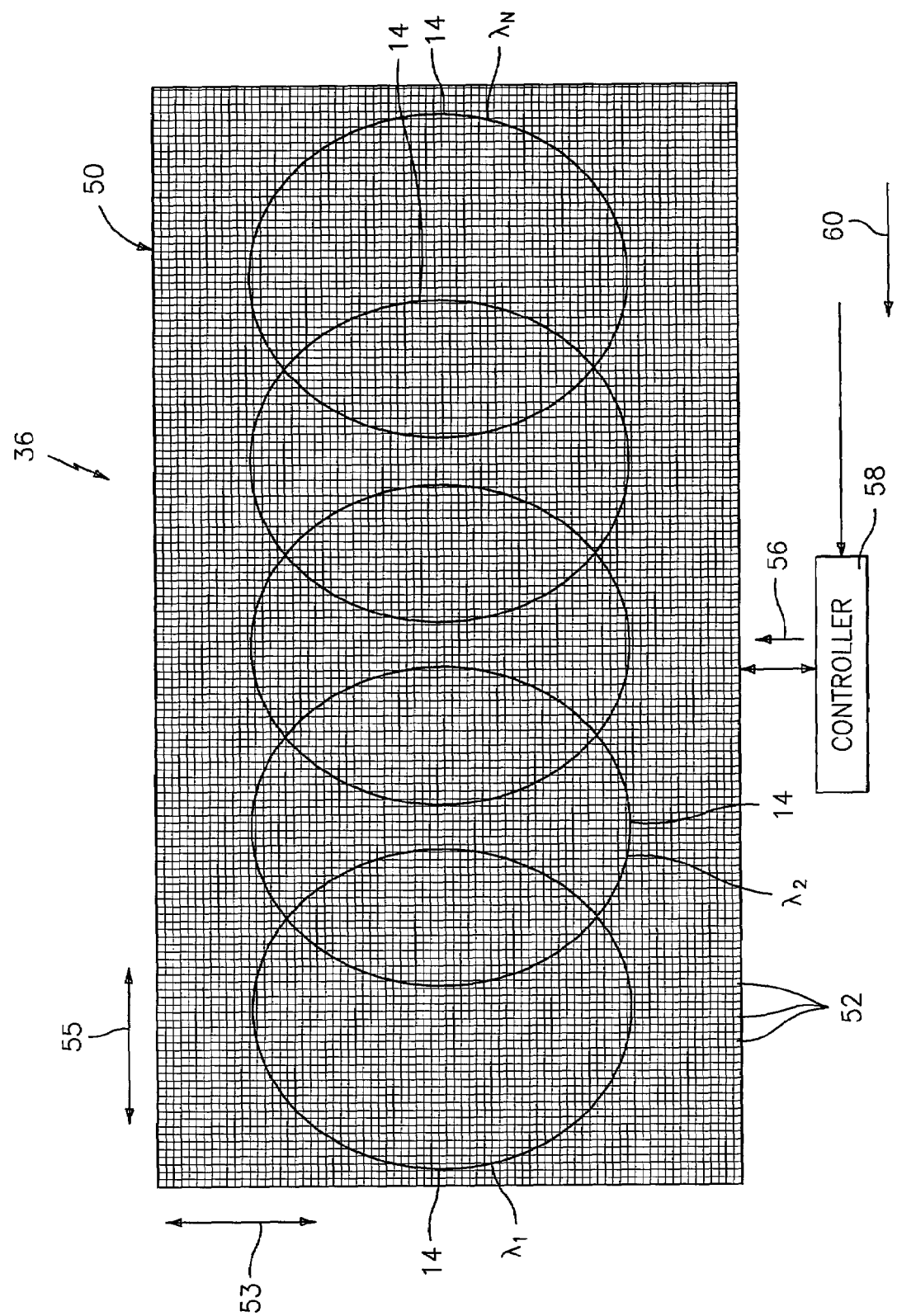

In FIGS. 9*a–c*, another embodiment of an optical filter is shown, which is similar to the optical filter 10 shown in FIGS. 1–3, except the diffraction grating 30 disperses the optical channels 14 of the input light 12 onto the micromirror device 50, such that the optical channels are not substantially separated, as defined hereinbefore, but overlapped, and have a generally circular cross-section. FIG. 9*a* shows an embodiment wherein the optics (i.e., collimating lens 26 and bulk lens 34) spread or disperse the input light onto the micromirror device such that the optical channels substantially overlap. FIGS. 9*b* and 9*c* show embodiments with varying degrees of overlap of the optical channels imaged onto the micromirror device. While present invention describes the optical channels having a generally circular cross-section, one will appreciate the cross-section may be elliptical or other geometric shape.

Figure 10:
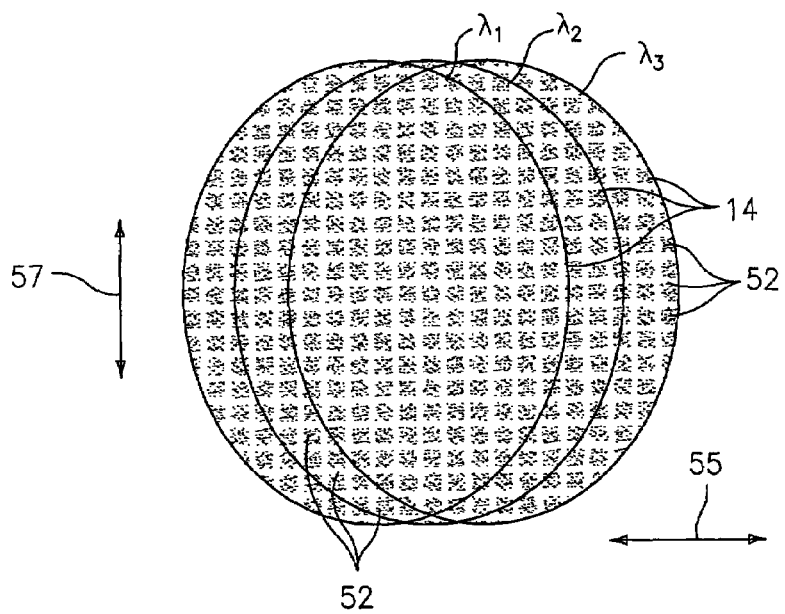
FIG. 10 is an expanded pictorial representation of an illuminated portion of the micro-mirror device of FIG. 9a, that shows the intensity distribution for three overlapping optical channels of the WDM input light, in accordance with the present invention.
Figure 11:
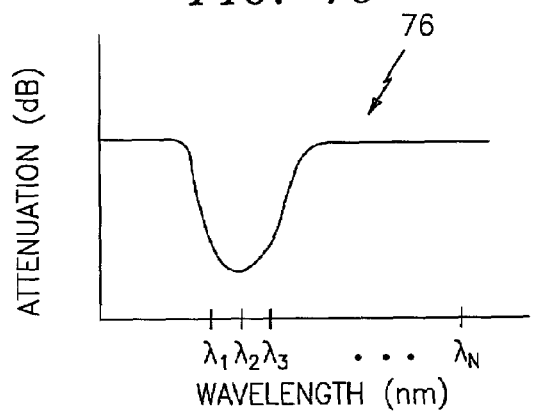
FIG. 11 is a graphical representation of a transmission filter function of an optical filter, wherein the optical channels of a WDM input light are overlappingly dispersed onto the micro-mirror device as shown in FIG. 6, in accordance with the present invention.

FIG. 10 shows the intensity distribution for three 50-GHz separated optical ITU channels of FIG. 9. The position in the spectral domain of the attenuation is determined by actuating micro-mirrors 52 in a specific spectral region of the device along the spectral direction 55. Variable attenuation in a given spectral band is achieved by actuating micro-mirrors primarily along the spatial direction 57 at the preselected spectral position. As described hereinbefore, the number of micro-mirrors 52 that are tilted determines the attenuation of the optical channel 14 or spectral band. One will note, however, that some of the micro-mirrors reflect light of more than one optical channel or band, and therefore when such a micro-mirror is tilted away from the return path, each corresponding optical channel is attenuated by a predetermined amount. Consequently, if, for example, a substantial number of the micro-mirrors 52 illuminated by the optical channel 14 at $\lambda_2$ are titled away from the return path, not only will the optical channel at $\lambda_2$ be fully attenuated, but also a substantial portion of the adjacent optical channels (i.e., at $\lambda_1, \lambda_3$) will be attenuated, as shown in FIG. 11. FIG. 11 shows the optical filter function 76 of the optical filter of FIG. 9, wherein a substantial number of the micro-mirrors 52 that are illuminated by the optical channel at $\lambda_2$ are tilted away from the return path. Advantageously, the overlapping of the optical channels 14 on the micro-mirror device 50 provides for a smooth attenuation transition between optical channels or bands.

In another exemplary embodiment, a DGEF 80 is provided in FIGS. 12*a* and 12*b* that is substantially similar to the DGEF 10 of FIGS. 1 and 2, and therefore, common components have the same reference numeral. The DGEF 80 replaces the circulator 28 of FIG. 1 with a second pigtail 82. The pigtail 82 has a glass capillary tube 84 attached to one end of the pigtail. The pigtail 82 receives the optical channels reflected from the micro-mirror device 50 (FIG. 10) back along a return optical path 53. Note that in FIG. 12*a* pigtails 82 and 24 in one embodiment (in reality) are coplanar in the top view and are shown as separate in the view for illustration purposes. Specifically, pigtail 82 receives the compensated optical channels 14 (FIG. 10) reflected back along the return optical path 53, which are reflected back from the spatial light modulator 36. Lens 34 of the embodiment shown is a cylindrical lens to separate the source path 32 and the return path 55 and thereby accommodates the separate source and receive pigtails 27,82. In another embodiment the pigtail 22, the light dispersive element 30 and/or the spatial light modulator 36 are tilted or positioned to offset the reflected path 53 such that the reflected light is focused on the second pigtail 82. The true separation of the source path 28, 32 and the return path 53 is best shown in FIG. 12*b*.

Figure 13:
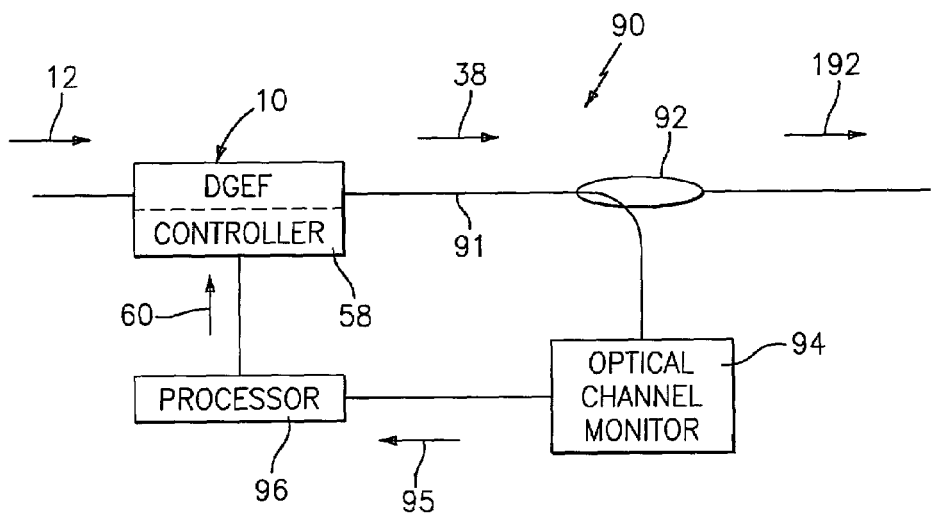
FIG. 13 is a block diagram of a closed-loop DGEF system in accordance with the present invention.

Referring to FIG. 13, a closed-loop system 90 is provided wherein an input signal 12 is provided to the DGEF 10, which selectively attenuates the optical channels 14 or wavelength bands to equalize the power of the input signal over a desired spectrum, and outputs an equalized output signal 38 at an optical fiber 91. An optical coupler 92 taps off a portion of the equalized output signal 38 of the DGEF 10 to an optical channel monitor (OCM) or optical signal analyzer (OSA) 94. The channel monitor 94 provides a sense signal 95, which is indicative of at least the power or gain of each optical channel 14 or wavelength band. In response to the sense signal 95, a processor 96 generates and provides the control signal 60 to controller/interface board 58 which in turn commands the micro-mirror device 50 (see FIG. 2) to flip the appropriate micro-mirrors 52 to attenuate (e.g. flatten or equalize) the input signal 12, as will be described in greater detail hereinafter.

The micro-mirror device 50 of FIGS. 1 and 2 may be similar to the Digital Micromirror Device™ (DMD™) manufactured by Texas Instruments and described in the white paper entitled "Digital Light Processing™ for High-Brightness, High-Resolution Applications", white paper entitled "Lifetime Estimates and Unique Failure Mechanisms of the Digital Micromirror Device (DMD)", and news release dated September 1994 entitled "Digital Micromirror Display Delivering On Promises of 'Brighter' Future for Imaging Applications", which are incorporated herein by reference.

Figure 14:
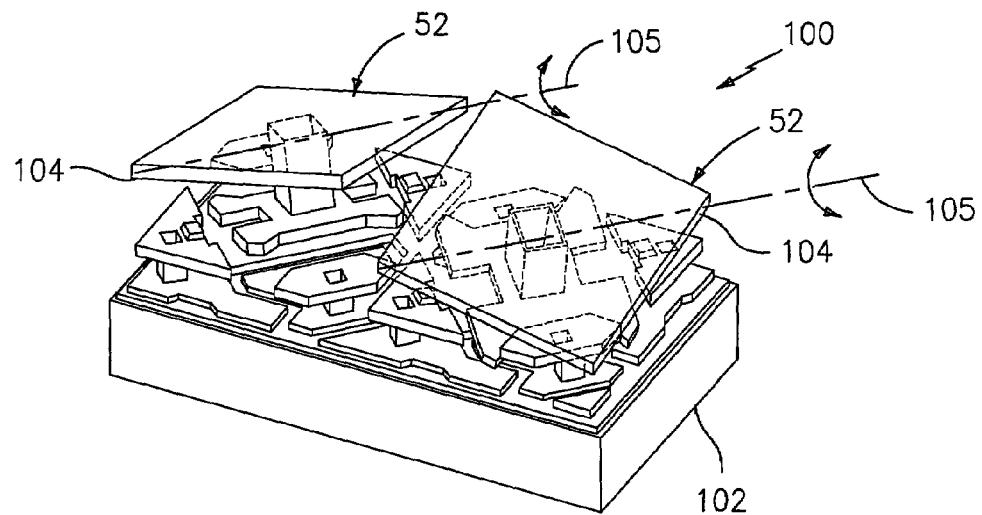
FIG. 14 is a perspective view of a portion of a known micro-mirror device.
Figure 15:
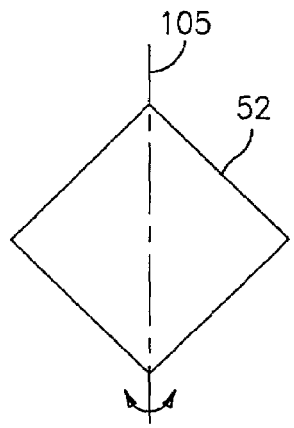
FIG. 15 is a plan view of a micro-mirror of the micro-mirror device of FIG. 14.

FIG. 14 illustrates a pair of micro-mirrors 52 of such a micromirror device 100 manufactured by Texas Instruments, namely a digital micromirror device (DMD™). The micromirror device 100 is monolithically fabricated by CMOS-like processes over a CMOS memory 102. Each micro-mirror 52 includes an aluminum mirror 104, approximately 16 µm square, that can reflect light in one of two directions, depending on the state of the underlying memory cell 102. Rotation, flipping or tilting of the mirror 104 is accomplished through electrostatic attraction produced by voltage differences between the mirror and the underlying memory cell. With the memory cell 102 in the on (1) state, the mirror 104 rotates or tilts approximately +10 degrees. With the memory cell in the off (0) state, the mirror tilts approximately −10 degrees. As shown in FIGS. 14 and 15, the micro-mirrors 72 flip about an axis 105.

Figure 16:
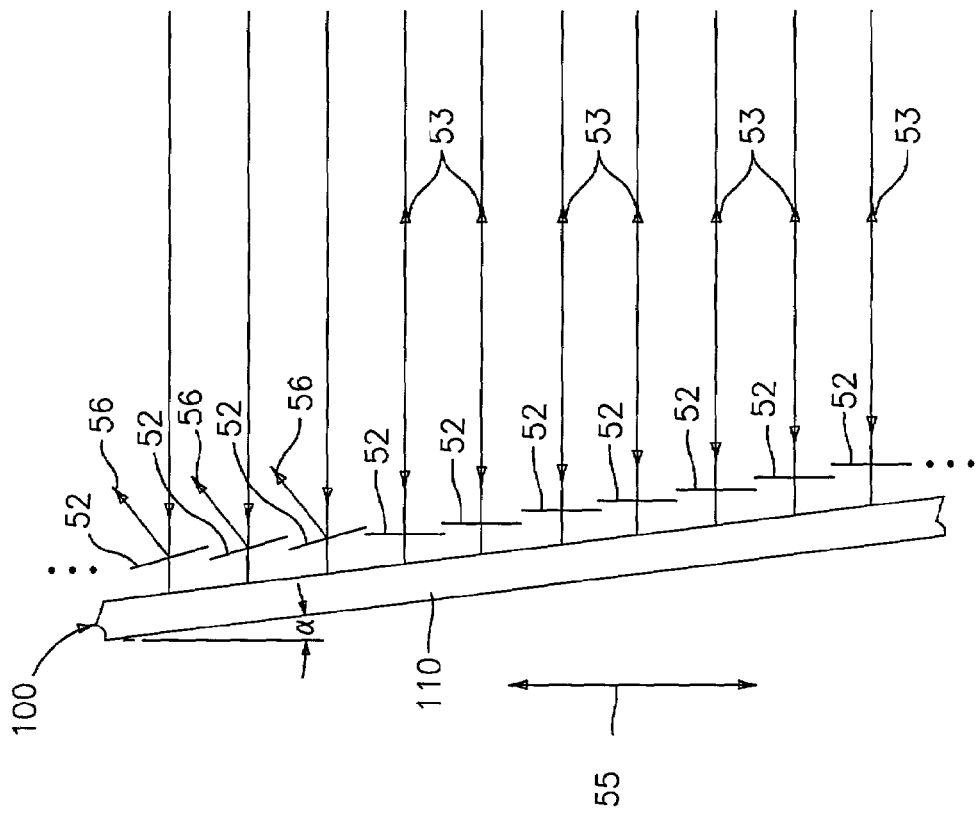
FIG. 16 is a pictorial cross-sectional view of the micro-mirror device of the spatial light modulator of FIG. 14 disposed at a predetermined angle in accordance with the present invention.

FIG. 16 illustrates the orientation of a micro-mirror device 100 similar to that shown in FIG. 14, wherein neither the on or off state of the micro-mirrors 52 is parallel to the base or substrate 110, as shown in FIG. 3. Consequently, the base 110 of the micro-mirror device 100 is mounted at a non-orthogonal angle a relative to the collimated light 32 (see FIG. 1) to position the micro-mirrors 52, which are disposed at the first position, perpendicular to the collimated light, so that the reflected light off the micro-mirrors in the first position reflect substantially back through the return path, as indicated by arrows 53. Consequently, the tilt angle of the mirror between the horizontal position and the first position (e.g., 10 degrees) is approximately equal to the angle α of the micro-mirror device.

Figure 17:
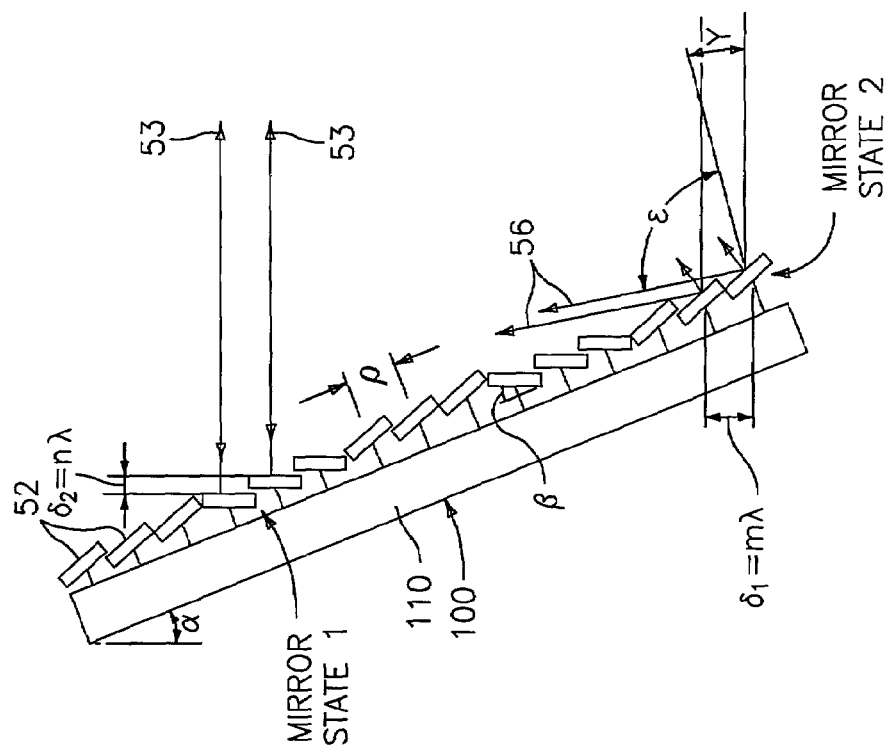
FIG. 17 is a pictorial cross-sectional view of the micro-mirror device of the spatial light modulator of FIG. 14 disposed at a predetermined angle in accordance with the present invention.

In using the micro-mirror array device 100, it is important that the reflection from each micro-mirror 72 adds coherently in the far-field, so the angle α to which the micro-mirror device 100 is tilted has a very strong influence on the overall efficiency of the device. FIG. 17 illustrates the phase condition of the micro-mirrors in both states (i.e., State 1, State 2) for efficient reflection in either condition.

In an exemplary embodiment of the micro-mirror device 100, the effective pixel pitch p is about 19.4 μm, so for a mirror tilt angle β of 9.2 degrees, the array is effectively blazed for Littrow operation in the n=+2 order for the position indicated as Mirror State 1 in FIG. 17 (i.e., first position for a wavelength of about 1.55 μm). For Mirror State 2, the incident angle γ on the micro-mirror device 100 is now 9.2 degrees and the exit angle ε from the array is 27.6 degrees. Using these numbers, the micro-mirror device is nearly blazed for fourth-order for mirrors in Mirror State 2.

Figure 18:
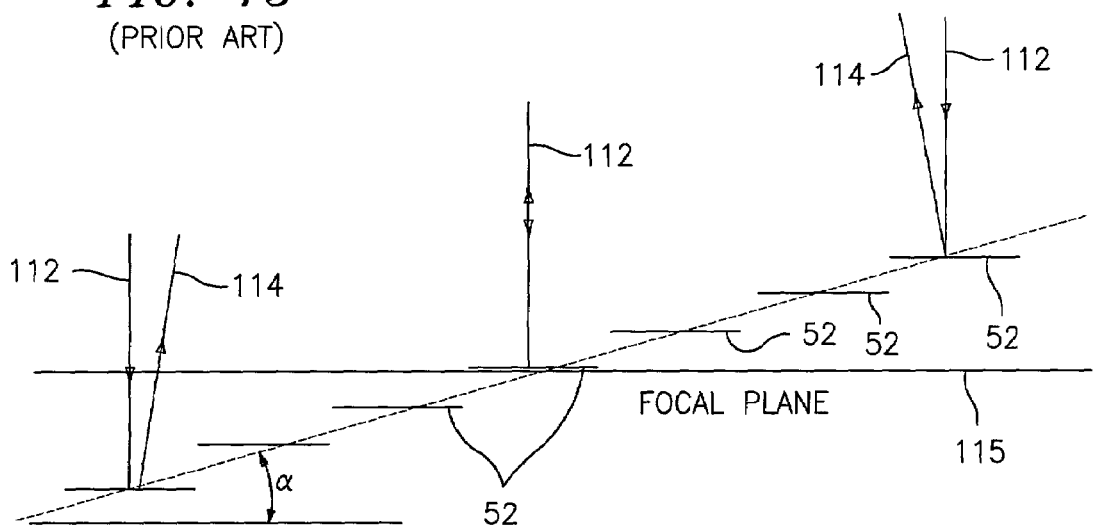
FIG. 18 is a graphical representation of the micro-mirror device of FIG. 17 in accordance with the present invention.

FIG. 18 graphically illustrates the micro-mirror device 100 wherein the micro-mirrors 52 are disposed in the retro-reflective operation (i.e., first position), such that the incident light reflects back along the return path 53 (see. FIG. 1). For retro-reflective operation, the micro-mirror device 100 acts as a blazed grating held in a "Littrow" configuration, as shown in FIG. 1, with the mount angle (α) equal to the mirror tilt "β" or blaze angle (e.g., 9.2 degrees). The grating equation (i.e., $\sin \theta_i + \sin \theta_m = m\lambda/d$) provides a relationship between the light beam angle of incidence ($\theta_i$) angle of reflection, ($\theta_m$) the pitch (d) of the micro-mirror array; the mirror tilt; and the wavelength of the incident light (λ). Introducing the micro-mirror device 100 at the focal plane 115 implements the critical device feature of providing separately addressable groups of mirrors to reflect different wavelength components of the beam. Because of the above reflection characteristics of the micro-mirror device 100, with the micro-mirror 100 in the focal plane 115, the beam is reflected as from a curved concave (or convexed) mirror surface. Consequently, when the micro-mirror device is oriented to retro-reflect at a wavelength hitting near the mirror center, wavelengths away from the center are reflected toward the beam center (FIG. 1) as if the beam were reflected from a curved concave mirror. In other words, the micro-mirror device 100 reflects the incident light 112 reflecting off the central portion of the array of micro-mirrors directly back along the incident angle of the light, while the incident light 112 reflecting off the micro-mirrors disposed further away from the central portion of the array progressively direct the light inward at increasing angles of reflection, as indicated by arrows 114.

FIGS. 19a and 19b illustrate a technique to compensate for this diffraction effect introduced by the micromirror array, described hereinbefore. FIG. 19a illustrates the case where a grating order causes the shorter wavelength light to hit a part of the micromirror array 100 that is closer than the section illuminated by the longer wavelengths. In this case the Fourier lens 34 is placed at a distance "d" from the grating 30 that is shorter than focal length "f" of the Fourier lens. For example, the distance "d" may be approximately 71 mm and the focal length may be approximately 82 mm. It may be advantageous to use this configuration if package size is limited, as this configuration minimizes the overall length of the optical train.

FIG. 19b illustrates the case where the grating order causes the longer wavelengths to hit a part of the micromirror array 100 that is closer than the section illuminated by the shorter wavelengths. In this case the Fourier lens is placed a distance "d" from the grating 30 that is longer than focal length "f" of the Fourier lens 34. This configuration may be advantageous to minimize the overall area illuminated by the dispersed spectrum on the micromirror array.

Figure 20:
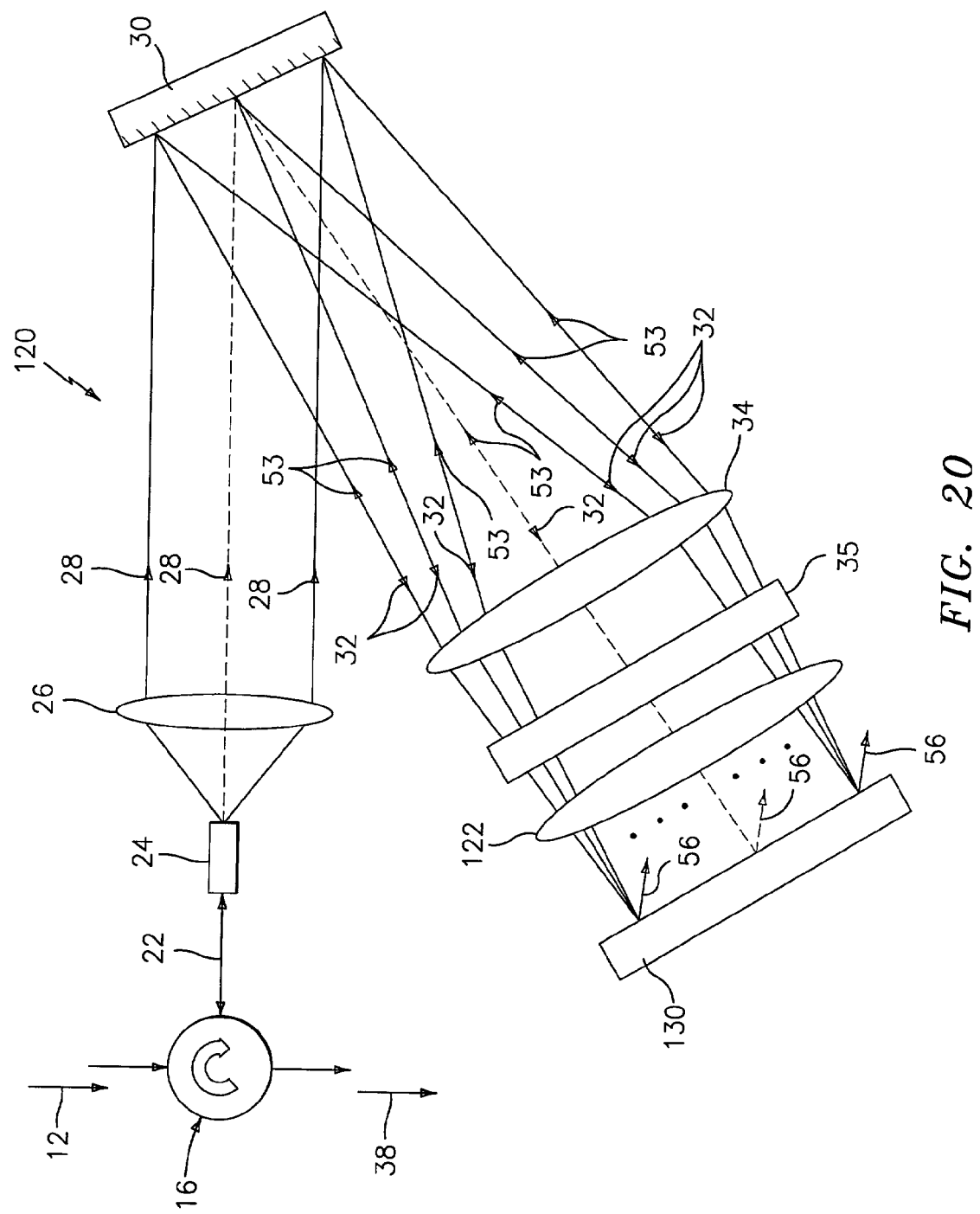
FIG. 20 is a block diagram of another embodiment of an optical filter including a spatial light modulator in accordance with the present invention.

Alternatively, the effective curvature of the micro-mirror device 100 may be compensated for using a "field correction" lens 122. In an exemplary embodiment shown in FIG. 20, the DGEF 120 is similar to the DGEF 10 of FIG. 1, and therefore similar components have the same reference numeral. The DGEF 120 includes a field correction lens 122 disposed optically between the λ/4 wave plate 35 and the spatial light modulator 130. The "field correction" lens 122 respectively compensates for the attenuated channels reflecting off the spatial light modulator 130.

As described hereinbefore, the micro-mirrors 52 of the micro-mirror device 100 flip about a diagonal axis 105 as shown in FIGS. 12 and 18. In an exemplary embodiment of the present invention shown in FIG. 18, the optical input channels 14 are focused on the micro-mirror device 100 such that the long axis 124 of the elliptical channels 14 is parallel to the tilt axis 105 of the micro-mirrors. This configuration is achieved by rotating the micro-mirror device 100 by 45 degrees compared to the configuration shown in FIG. 2. Focusing the optical channels in this orientation maximizes the ability to control the attenuation step and chromatic dispersion. By limiting the width of the projection on the mirrors in the spectral dimension the path length difference from one wavelength to another is minimized and thereby minimizes the chromatic dispersion. Alternatively, the elliptical channels 14 may be focused such that the long axis 124 of the channels is perpendicular to tilt axis 105 of the micro-mirrors. Further, one will appreciate that the orientation of the tilt axis 105 with respect to the long axis 124 may be any angle.

Figure 21:
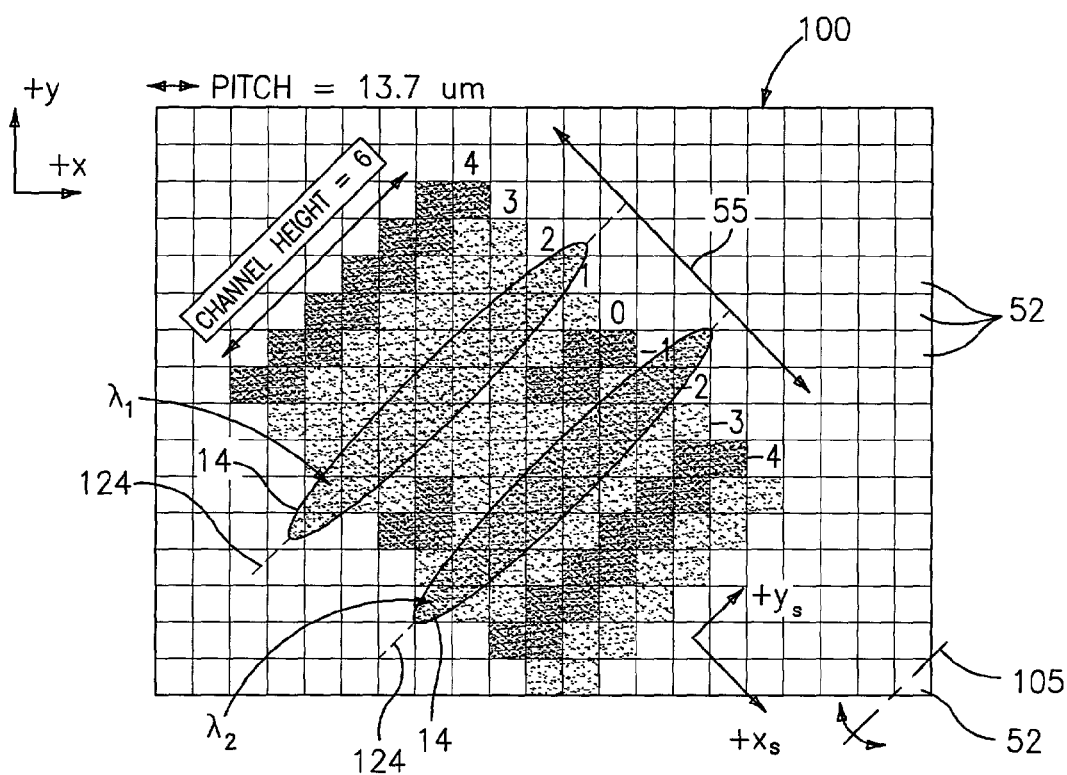
FIG. 21 is a block diagram of the micro-mirror device of FIG. 14 having a micro-mirror device, wherein the optical channels of a WDM input light are substantially dispersed onto the micro-mirror device, in accordance with the present invention.

In an exemplary embodiment shown in FIG. 21, the micro-mirror device 100 is divided into a set of adjacent "sections" that are a specified number of micro-mirrors 52 (or pixels) wide by a specified number of micro-mirrors high. The "Section Height" is defined as the number of corner-to-corner pixels in the spatial direction. The "Section Width" of the sections is defined as the number of interlaced pixels of each section. As shown, the section width and section height for each section are two (2) and six (6), respectively.

An "Attenuation Step" is defined as the number of pixels turned off within a selected section. The maximum attenuation step value is the product of the Section Width and Section Height, and therefore the maximum attenuation step of each section is 12 (i.e., 2*6).

Each section is numbered outward from zero with sections to the left of section 0 being positive and the sections to the right of section 0 being negative. The section 0 is at the spatial center of the section pattern. The origin of the entire pattern is the upper left hand corner of section 0. As shown in FIG. 21 for example, section −3 is shown at maximum attenuation step of 12, and section 0 is shown having an attenuation step of 7. All other sections have an attenuation step of zero (0). Sections 3 and 4 are shaded to illustrate the pattern of the sections on the micro-mirror device 100. Optical channels 14 centered at $\lambda_1$, $\lambda_2$ substantially reflect a selected section.

The attenuation algorithm receives input indicative of the power of the optical channels 14 or wavelengths over the selected spectrum of the WDM signal. After eliminating channels that are not powered (i.e. the power level is below some predetermined threshold level) the algorithm compares the gain profile of the WDM signal and determines a set of attenuations versus wavelength. The attenuation algorithm takes the set of attenuations versus wavelength $\{\lambda_i, \lambda_i\}$ and turn them into a list of section "Attenuation Step" versus Section Number. The algorithm then commands the micro-mirror device 100 to flip the appropriate micro-mirrors 52.

Specifically, the amount of power coupled back to the fundamental mode in the fiber after the collimator can be shown to be $$P_C(\lambda) = |\int I(\rho;\lambda) D(\rho) d^2\rho|^2 \quad (1)$$

where $I(\rho;\lambda)$ is the intensity pattern of the beam on the micro-mirror device 100 for a given wavelength, $D(\rho)$ is the complex spatial pattern of "on" pixels on the micro-mirror device 100, and $\rho = x_s \hat{x}_s + y_s \hat{y}_s$ is the transverse spatial coordinate vector. The function D has constant phase if the micro-mirror device 100 lies in a true Fourier plane (effective focal plane) of the system and optical aberrations and focusing errors are small compared to wavelength.

Due to the diffraction grating 30, the wavelength dependence of $I(\rho)$ can be expressed as $I(\rho) = I_x(x_s - \beta\lambda) I_y(y_s)$ where $I_x$ and $I_y$ are the beam shapes in the $x_s$ and $y_s$ direction respectively, and $\beta$ is a calibration coefficient.

The spatial pattern on the micro-mirror device 100 can be expressed as a sum of spatially distinct sections $$D(\rho) = \sum_{i=1}^{N} S(x_s - \gamma\lambda_i) R(y_s; h_i) \quad (2)$$

where $S(x_s)$ is a function of the effective "shape" of the section of the micro-mirror device 100 in the spectral direction (for example they are triangular due to the "diamond" shape of the micro-mirrors 52 when using a suitably oriented DMD device), and R(y) is approximated as a "rectangle" function that is unity for $|y_s| < h$ and zero otherwise. Collecting the above results, one obtains $$\sqrt{Pc(\lambda)} = \sum_{i=1}^{N} M(\lambda, \lambda_i) L_M(h_i) \quad (3)$$

where the matrix M is essentially the instrument response function convolved with the pixel shape function S. Experimentally, this function is known to be Gaussian to good approximation.

The reflected power off Section j at the peak $\lambda_j (L_M(h_j))$ can be calculated with a couple of assumptions. Assuming the beam is spatially separable and the beam has a Gaussian shape in the spatial dimension $y_s$, $$L_M(h_j) \approx 1 - C \left[ \text{erf}\left(\frac{H}{w_y}\right) - \text{erf}\left(\frac{H - hj}{w_y}\right) \right] \quad (4)$$

where $h_j$ is the physical height of the "off" pixels for the j'th section on the micro-mirror device 100, H is the physical height of the sections of the micro-mirror device 100, C is called the "spectral overlap", which is a single semi-empirical parameter which describes the spectral beam shape and pixel shape details, and $w_y$ is the Gaussian 1/e HW of the beam in the spatial direction. Note that the "Attenuation Step" AS is related to the parameter $AS = w^* h_j / p$, where p is the length of an individual pixel and w is the width (in number of pixels) of the section of the micro-mirror device 100.

Although this model allows one to predict what a filter will look like at a given Attenuation step for a given Section Number, a different problem is usually faced. Typically one is supplied with a set of $\{\lambda_1, A_1\}$, where $A_1 = 10 \log_{10}(P_C(\lambda_{C1}))$ and there is a need to solve for the h vector. Note that the command wavelengths $\lambda_{C1}$ (which typically lie on the ITU grid) probably don't correspond to sections $\lambda_i$ of the micro-mirror device 100.

To do this we use the following procedure. First the matrix M is approximated as a Gaussian. The loss at an arbitrary wavelength can be approximated from Equation (3) as $$\sqrt{Pc(\lambda)} = \sum_{j=1}^{N} L_M(h_j) N_j \exp\left[-\left(\frac{\lambda - \lambda_j}{w_j}\right)^2\right] \quad (5)$$

where $N_j$ is a normalization constant. The parameters (center wavelength and width) of each section are determined empirically.

One turns the A (usually in dB) into linear loss vector L. L is sampled onto the set of wavelengths defined by the sections to get $L_{si} = \sqrt{P_C(\lambda_i)}$. Equation (5) defines a sparse matrix operator equation that can be inverted using standard techniques to yield the $L_M$ solution vector. The Attenuation Step is then found from a look up table of Attenuation Step for a given linear attenuation $L_{Mi}$ as calculated from Equation (4).

Note that using the above method the operator matrix M is inverted a single time. The same inverted matrix can be used to calculate the solution $L_M$ given a new $L_s$ vector.

Two complications are worth noting. First, in order for the above technique to be stable some assumptions are made about $L_s$, namely, that the function $L_s(\lambda)$ is "frequency limited" (here frequency refers to the rate of change of the amplitude of the filter from one point in the spectrum to another.) Since this is not necessarily the case, a regularization filter is applied to the input vector L to explicitly frequency limit the function $L_s$. The regularization filter is implemented as a Gaussian convolution filter with a frequency limit set to about 1.25 the spectral resolution of the system. This introduces some error into the calculation if filter features are requested that are on the order of the spectral resolution of the system.

To mitigate the error introduced by the regularization filter, a second iterative procedure is applied to the resultant h vector to bring the filter values into agreement at the commanded wavelengths. Given the vector h, the resulting attenuation values $L_c$ are calculated at the command wavelengths. The difference between the commanded attenuations L and the calculated attenuations $L_c^p$ for the p-th iteration is then "fed back" into a new "command" vector $L_c^{p+1}$. Note that $L_c^0 = L$ calculated from the inverse of the filter operator matrix and the regularized input data.

Mathematically, this process is $$L_c^{p+1} = L_c^p - \Delta L_c \quad (6a)$$

$$\Delta L_c = L - L_c^p \quad (6b)$$

After the maximum value of $L_c^{p+1}$ is below a given "critical ripple", the ripple reaches a minimum, or a maximum number of iterations is performed, the loop is stopped.

Note that the above procedure tends to cause the filter to "ring" through the command points if features are requested that are close to the resolution limit of the system. A more sophisticated algorithm would keep track of not only the attenuation value at a given command wavelength but also the curvature of the filter (i.e. dispersion) in order to calculate the "best" filter given a constraint on dispersion as well as amplitude. One simple modification would be to sample not only on the command wavelengths but also at two neighboring points on either side of the command wavelength and require the curvature defined by those three points to be beneath a critical value as well as the loss being close to all three points.

Figure 22:
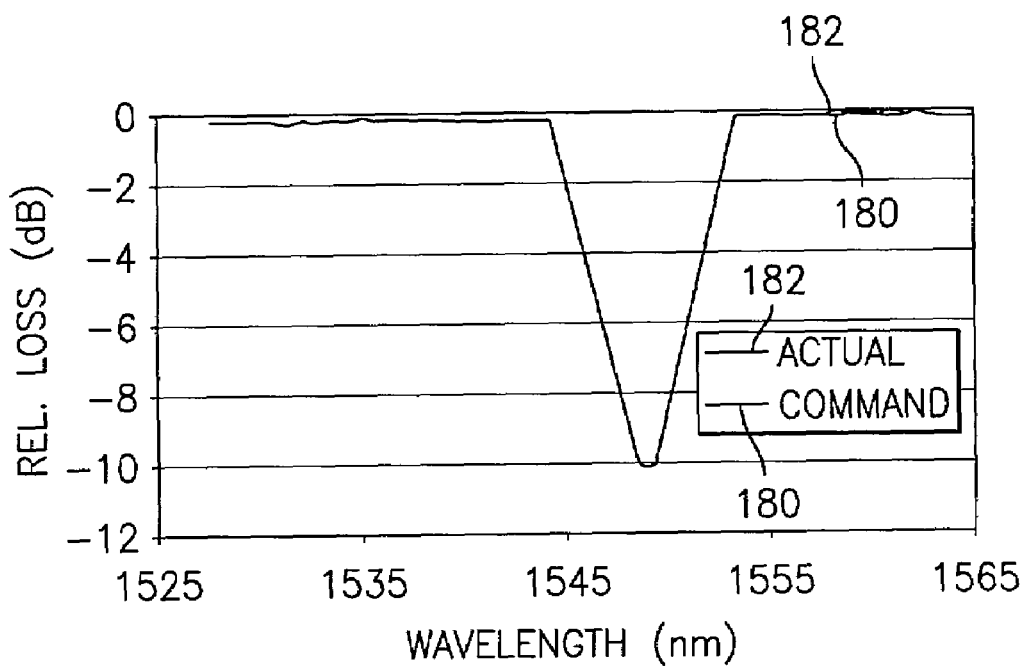
FIG. 22 is a plot showing the commanded gain profile and the resulting gain profile of an optical filter in accordance with the present invention.
Figure 23:
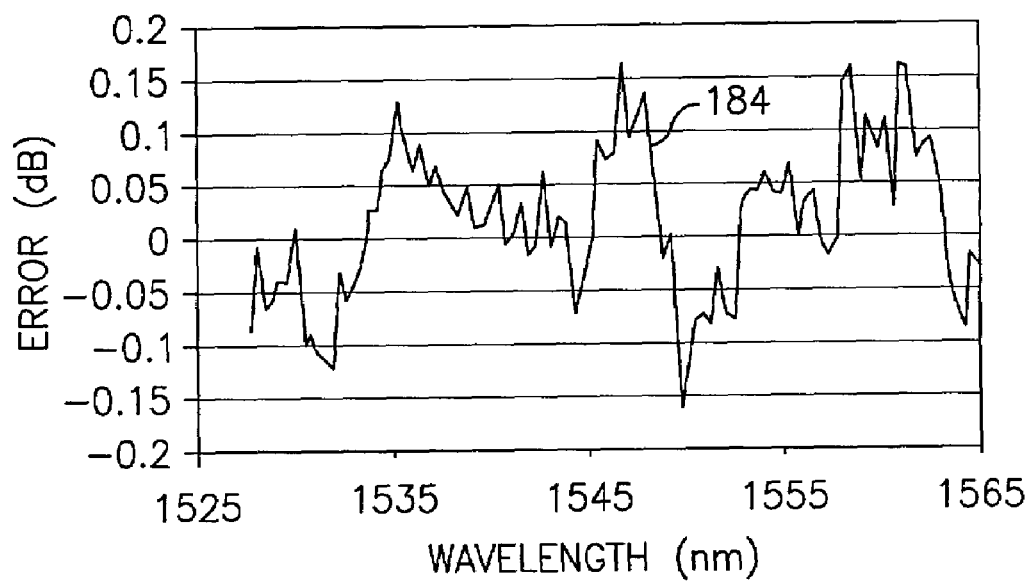
FIG. 23 is a plot showing the error the commanded gain profile and the resulting gain profile of an optical filter of FIG. 22.

FIGS. 22–25 show data of a DGEF similar to that shown in FIG. 1 having a micro-mirror device 100, as described hereinbefore, whereby the flipping of the micro-mirrors is controlled by the above described gain equalizing algorithm. FIG. 22 compares a desired or commanded filter profile 180, having 10 dB loss at a selected wavelength with the slopes of the function being 2.5 dB/nm, to the actual filter profile 182 provided by the DGEF. FIG. 23 shows the error 184 in dB between the commanded filter profile 180 and the actual filter profile 182 of FIG. 22.

Figure 24:
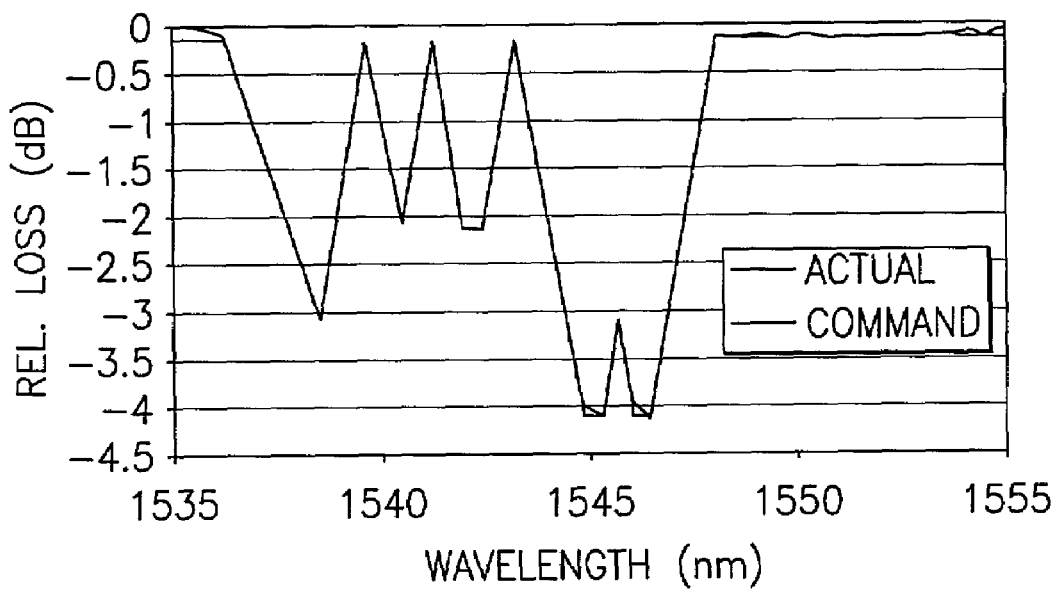
FIG. 24 is a plot showing the commanded gain profile and the resulting gain profile of an optical filter in accordance with the present invention.
Figure 25:
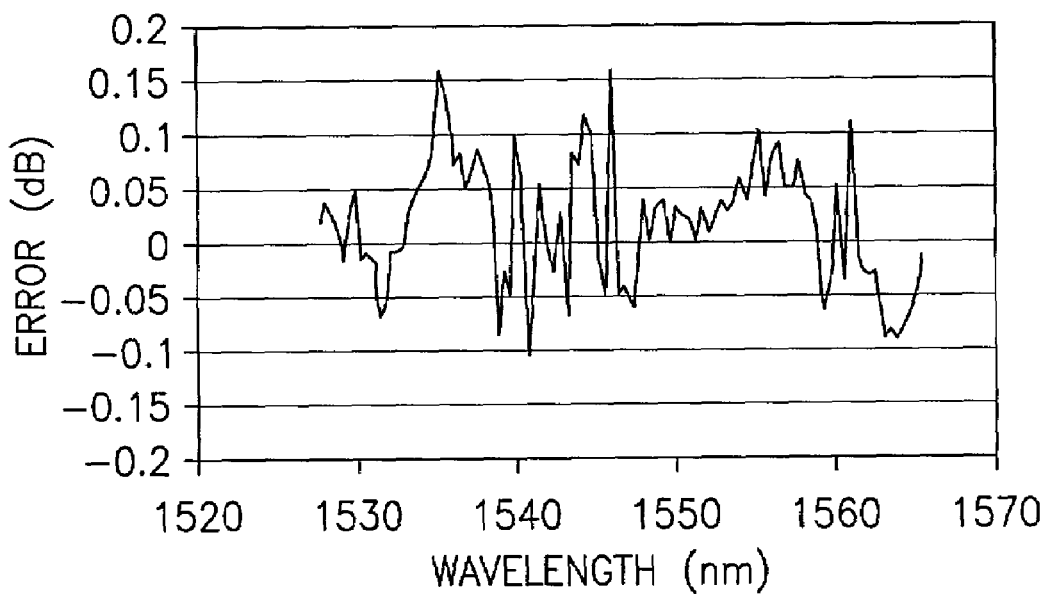
FIG. 25 is a plot showing the error the commanded gain profile and the resulting gain profile of an optical filter of FIG. 24.

FIG. 24 compares a commanded filter profile 186, having a more complex function than that shown in FIG. 22, to the actual filter profile 188 provided by the DGEF. FIG. 25 shows the error 190 in dB between the commanded filter profile 186 and the actual filter profile 188 of FIG. 22.

Figure 26:
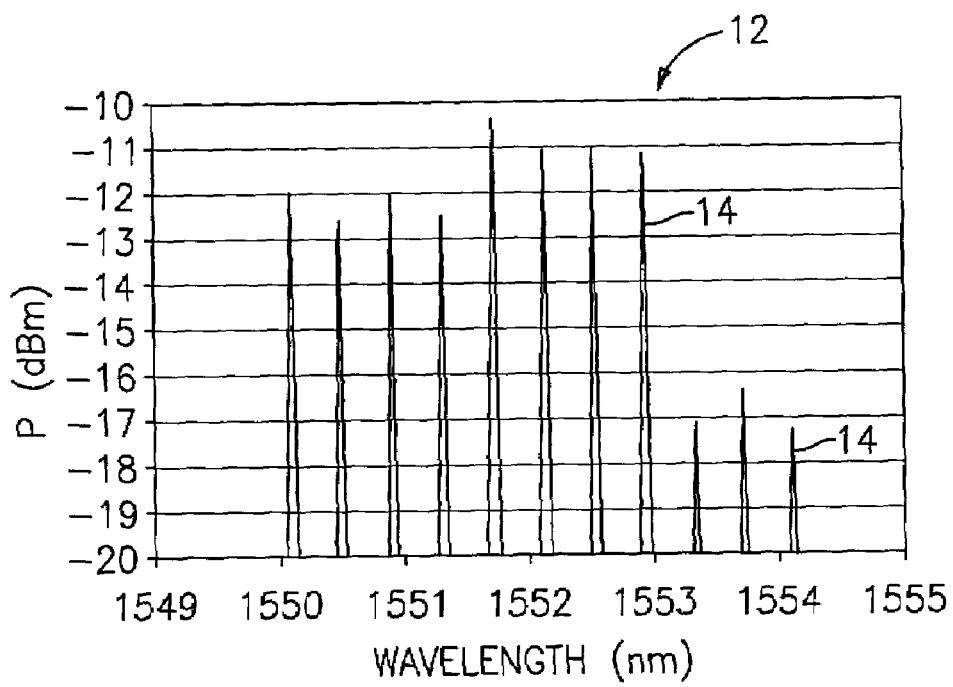
FIG. 26 is a plot showing a WDM input signal having a plurality of unequalized optical channels provided to a closed-loop DGEF system in accordance with the present invention.
Figure 27:
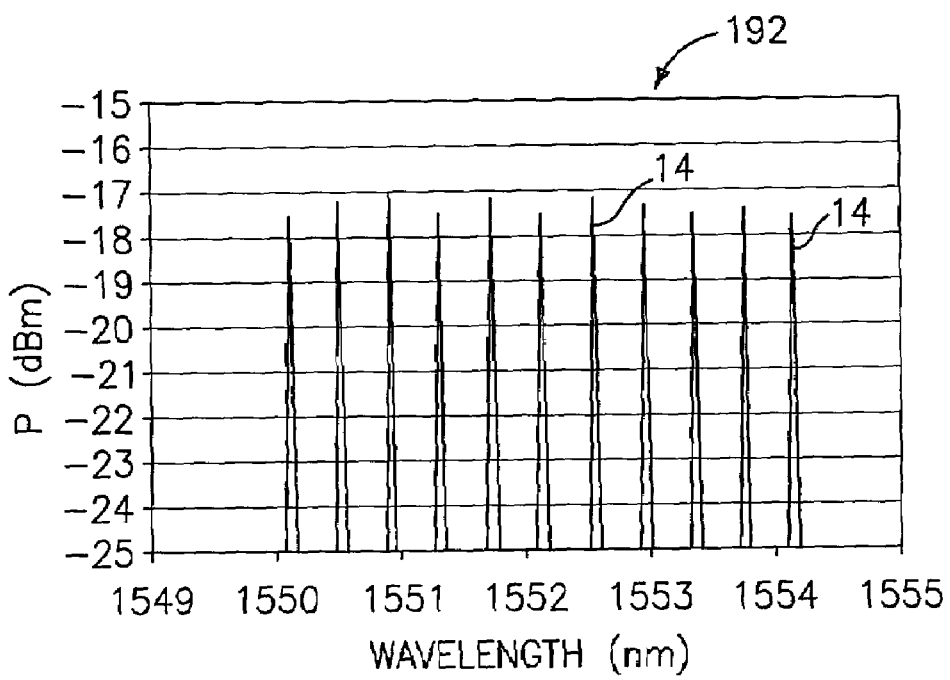
FIG. 27 is a plot showing the equalized output signal of the closed-loop DGEF system having an input signal shown in FIG. 26.

FIGS. 26 and 27 show data representing the input signal 12 and equalized output signal 192, respectively, of a closed-loop DGEF system 90 (similar to that in FIG. 13), which includes a DGEF similar to that shown in FIG. 1 having a micro-mirror device 100, as described hereinbefore, whereby the flipping of the micro-mirrors is controlled by the above described gain equalizing algorithm. FIG. 26 shows a 50 GHz WDM signal 12 having unequalized optical channels. FIG. 27 shows the resulting equalized output signal 192 of the DGEF system 90, whereby the error between each of the gain of each of the optical signals 14 is between +/−0.2 dB.

In the operation of an embodiment of the micro-mirror device 100 manufactured by Texas Instruments, described hereinbefore, all of the micro-mirrors 52 of the device 100 releases when any of the micro-mirrors are flipped from one position to the other. In other words, each of the mirrors will momentarily tilt towards the horizontal position (or "flat" position) upon a position change of any of the micro-mirrors. Consequently, this momentary tilt of the micro-mirrors 52 creates a ringing or flickering of the light reflecting off the micro-mirrors. To reduce or eliminate the effect of the ringing of the light during the transition of the micro-mirrors 52, the light may be focused tightly on the micro-mirror device 100. FIGS. 28 and 29 illustrate the effect of the ringing of micro-mirrors during their transition. Both FIGS. 28 and 29 show an incident light beam 210, 212, respectively, reflecting off a mirror surface at different focal lengths. The light beam 210 of FIG. 28 has a relatively short focal length, and therefore has a relatively wide beam width. When the micro-mirror surface 214 momentarily tilts or rings a predetermined angle τ, the reflected beam 216, shown in dashed lines, reflects off the mirror surface at the angle τ. The shaded portion 218 is illustrative of the lost light due to the momentary ringing, which represents a relatively small portion of the incident light 210. In contrast, the light beam 212 of FIG. 29 has a relatively long focal length, and therefore has a relatively narrow beam width. When the micro-mirror surface 214 momentarily tilts or rings a predetermined angle τ, the reflected beam 220, shown in dashed lines, reflects off the mirror surface at the angle τ. The shaded portion 222 is illustrative of the lost light due to the momentary ringing, which represents a greater portion of the incident light 212, than the lost light of the incident light. Consequently, the sensitivity of the momentary tilt of the micro-mirrors is minimized by tightly focusing the optical channels on the micro-mirror device 100. Advantageously, tightly focusing of the optical channels also reduces the tilt sensitivity of the micro-mirror device due to other factors, such as thermal changes, shock and vibration.

FIG. 30 illustrates another embodiment of DGEF 230 in accordance with the present invention, which is similar to the DGEF of FIG. 1, and therefore like components have the same reference numerals. Unlike the DGEF of FIG. 1, the DGEF 230 flip the micro-mirrors 52 of the spatial light modulator 36 to direct the equalized output signal 38 away from the return path 53 to thereby direct the output signal along optical path 56. The output signal 38 passes through a complimentary set of optics, such as a second bulk lens 234, a second λ/4 wave plate 235, a second diffraction grating 236, and a second collimating lens 238 to a second pigtail 240. Conversely, the attenuated portion of the light is reflected back through return path 53 to pigtail 22. An optical isolator 242 is provided at the input of the DGEF 230 to prevent this light from returning to the optical network.

While the present invention has been described as a DGEF, one will recognize that each of embodiments described hereinbefore are not limited to equalizing the optical channels 14 or wavelengths over a desired spectrum of an WDM input signal 12, but may be used to provided any desired filter profile resulting in any desired output attenuation profile.

Figure 31:
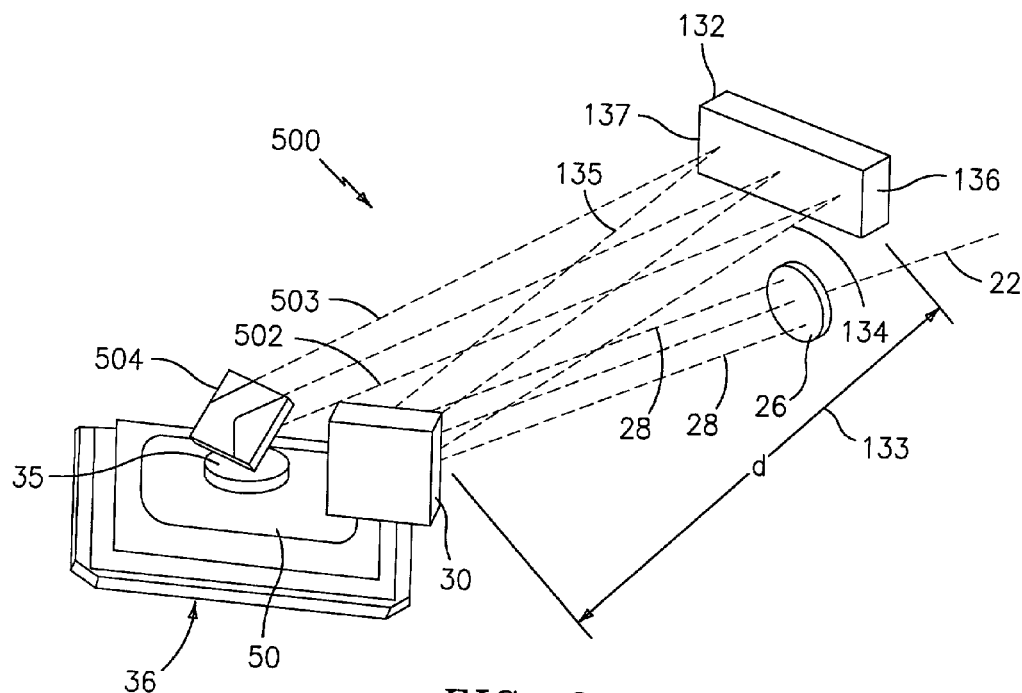
FIG. 31 is an elemental illustration of the optical filter of FIG. 1 in accordance with the present invention.

Referring to FIG. 31 there is shown by way of example an embodiment of the invention described herein above and generally referred to as DGEF 500 like components have the same reference numerals. In the schematic of the embodiment shown light enters DGEF 500 via pigtail or fiber 22 and passes through collimating lens 26. The collimated input beam 28 is incident on a wavelength dispersion element 30 (e.g., a diffraction grating), which disperses spectrally the optical channels of the collimated input beam by diffracting or dispersing the light from the light dispersion element. The curved reflector lens 132 (e.g., cylindrical lens or Fourier lens) projects and separates optical channels or bands of channels 134, 135 onto micro-mirror device 36 as described herein above. Curved reflector lens 132 is positioned a nominal distance "d" 133 from the diffraction grating where d is less than the focal distance of the curved lens. The light 502, 503 reflected off of curved lens 132 is projected onto turning mirror 504 and directed through λ/4 wave plate 35 and onto micro-mirrors 50 of DMD chip 36. The λ/4 wave plate 35 is positioned between curved lens 34 and the DMD 36 to minimize polarization dependent loss (PDL) by compensating for the polarization response of the diffraction grating 30.

Figure 32:
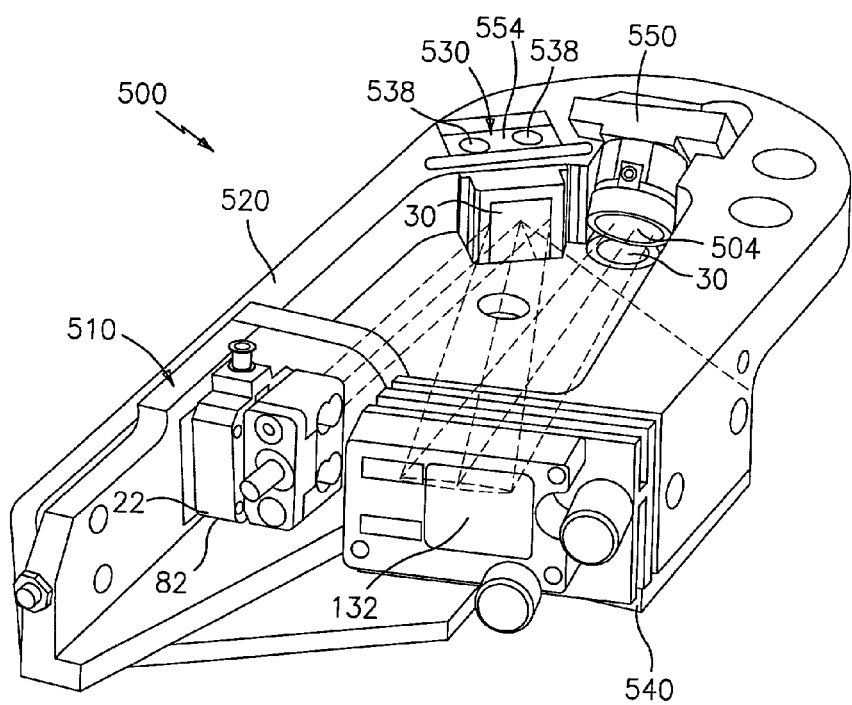
FIG. 32 is a perspective illustration of an embodiment of an optical filter in accordance with the present invention.
Figure 33:
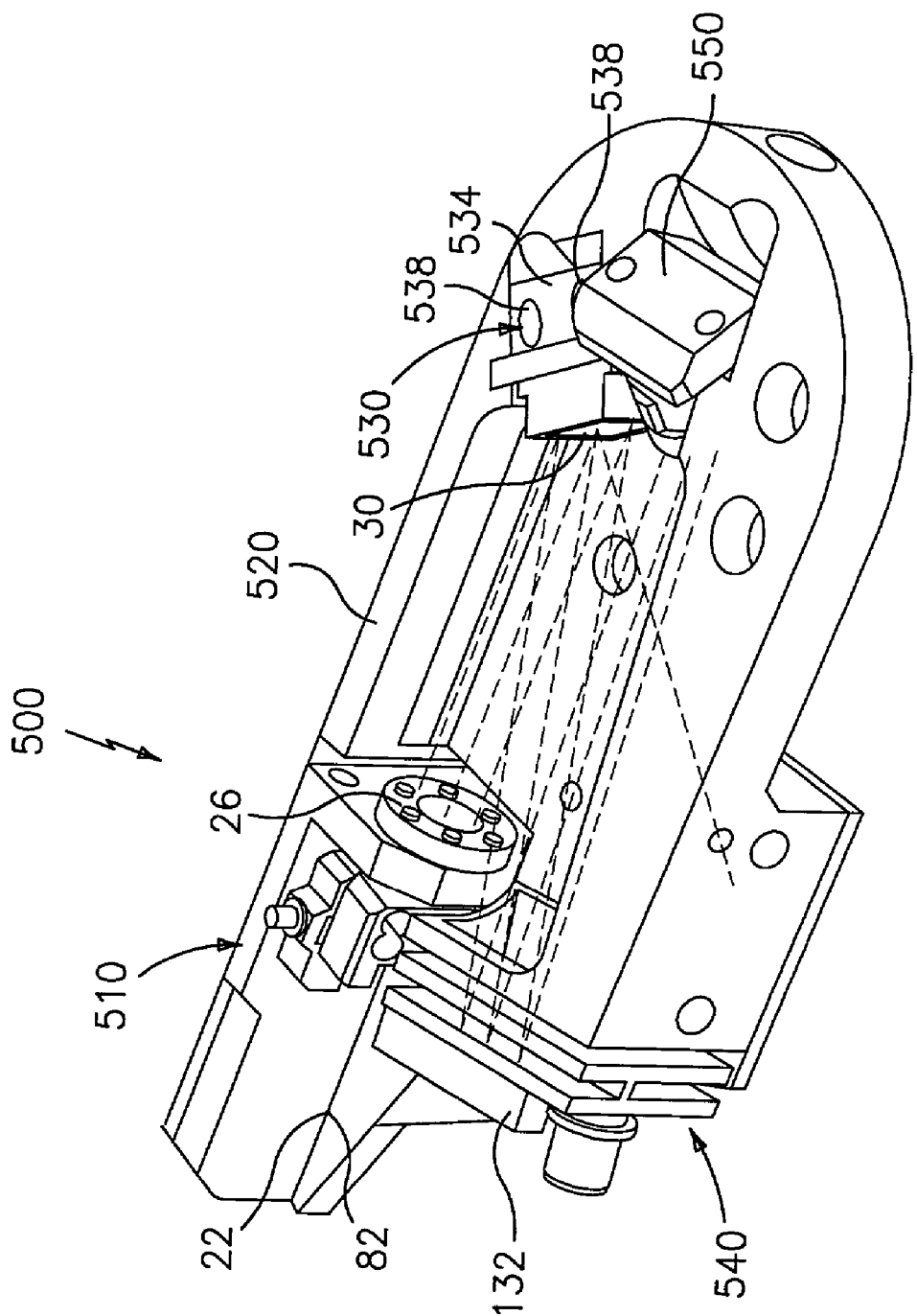
FIG. 33 is an alternative perspective view of the optical filter of FIG. 32.

An example of a practical embodiment of DGEF 500 is best shown with reference to FIGS. 32, 33. In describing this particular embodiment element by element along the optical path DGEF 500 includes an input fiber 22 and output fiber 82 are combined with collimator lens 26 into a Beam Generating Module (BGM) 510 adjustably mounted within chassis 520. Diffraction grating 30 is disposed within adjustable mount 530 and is further mounted within chassis 520. Curved mirror or Fourier lens 132 is mounted to chassis 520 on adjustable mount 540. Turning mirror 504 is similarly mounted in an adjustable mirror mount 550 within chassis 520 directly above λ/4 wave plate 35, which is rotatably mounted within the chassis as well. Chassis 520 is comprised of an aluminum alloy material. One will appreciated that the various elements of DGEF require precise machining and/or adjustability to provide for optical alignment and channel equalization performance across a wide temperature and vibration, among other elements, operating environment.

Figure 34:
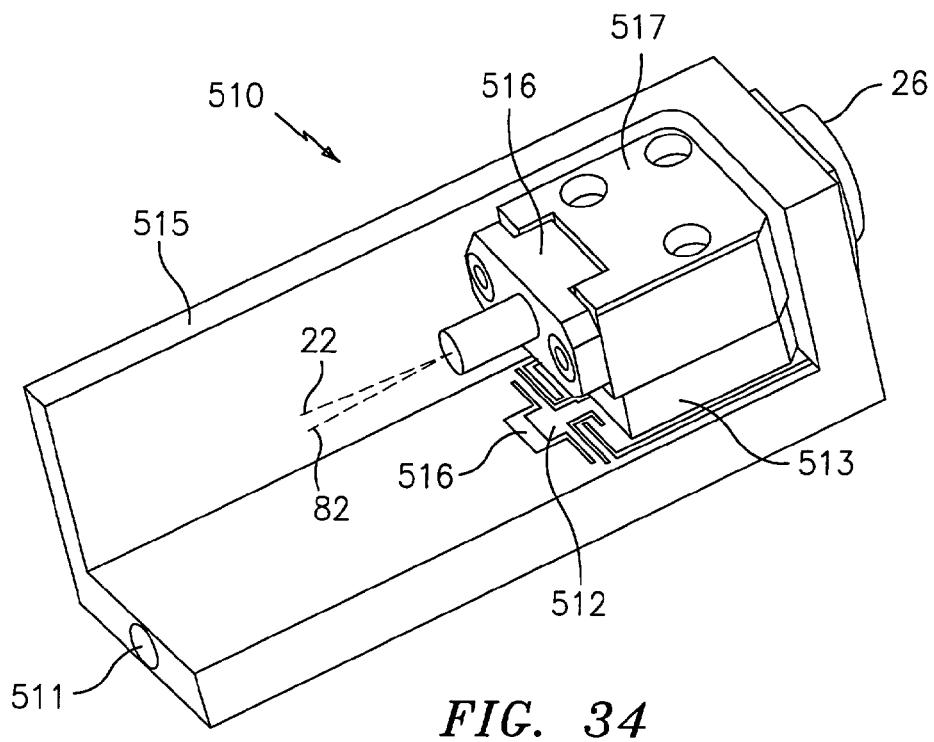
FIG. 34 is a perspective illustration of an embodiment of a beam generation module (BGM) in accordance with the present invention.
Figure 35:
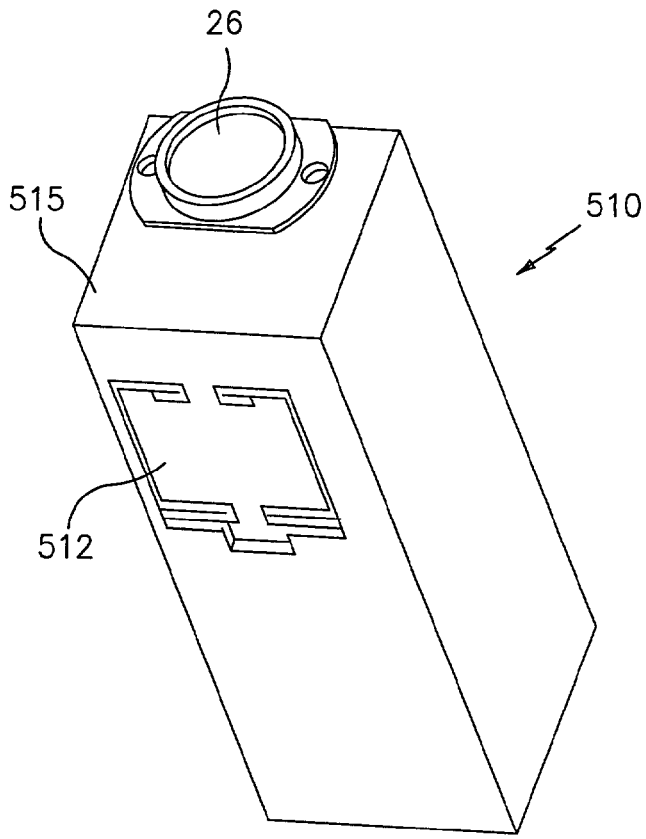
FIG. 35 is an alternative perspective view of the beam generation module of FIG. 34.

Referring to FIGS. 34 and 35 there is shown in detail the Beam Generation Module (BGM) 510 of the present invention. BGM 510 is responsible for alignment and focus of the input beam and is comprised of basic mount 515 made of a titanium alloy and includes a fine thread drive 511 for fine focus adjustment a flexure portion 512 for further focusing and a flexure block 513 for transverse and longitudinal fiber alignment functions. Also included in the BGM is a dual fiber holder ball clamp 516 for holding fibers 22, 82 attached to mounting block 517 which is further attached to flexure block 513. The BGM further includes an aluminum, temperature compensation rod 518 positioned within the flexure portion 512 to compensate for thermal growth that may otherwise degrade optical alignment.

Figure 36:
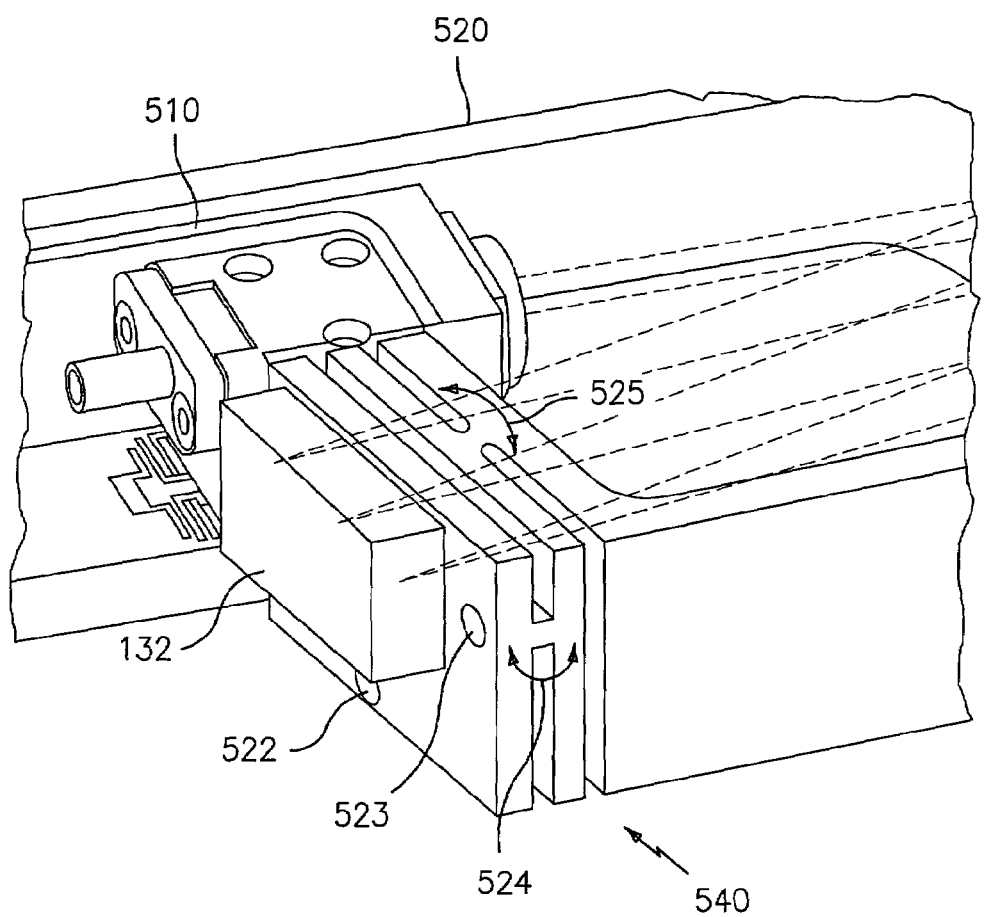
FIG. 36 is a perspective illustration of an embodiment of a curved mirror mount in accordance with the present invention.

Referring to FIG. 36 there is shown in detail the curved mirror mount 540 of chassis 520. The chassis 520 is comprised of an aluminum alloy material and mirror mount 540 is machined therein and provides two axis adjustment of the curved lens 132. One will appreciate that the rotation of a screw 526, 527 (FIG. 40) within threaded holes 522, 523 effects alignment along axes 524, 525 respectively.

Figure 37:
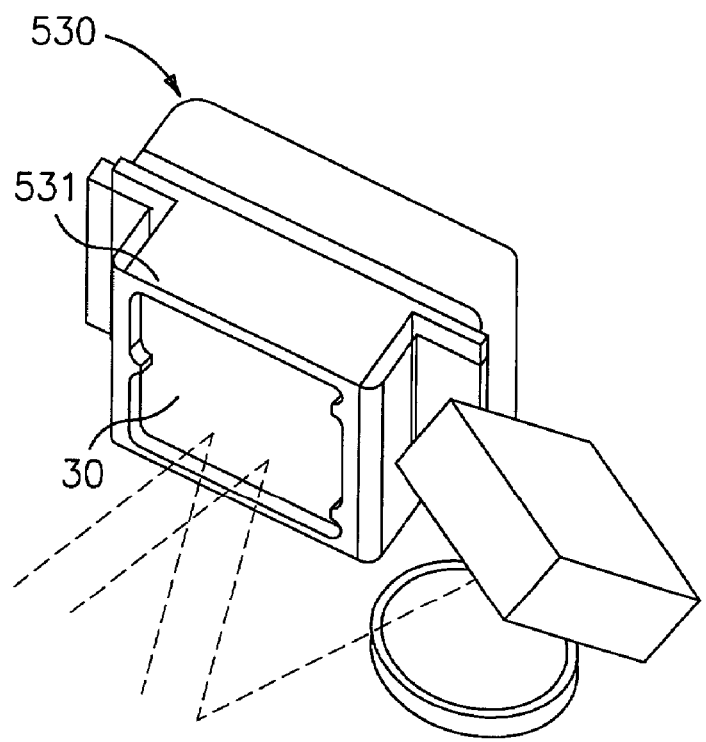
FIG. 37 is a perspective illustration of an embodiment of a diffraction grating mount in accordance with the present invention.
Figure 38:
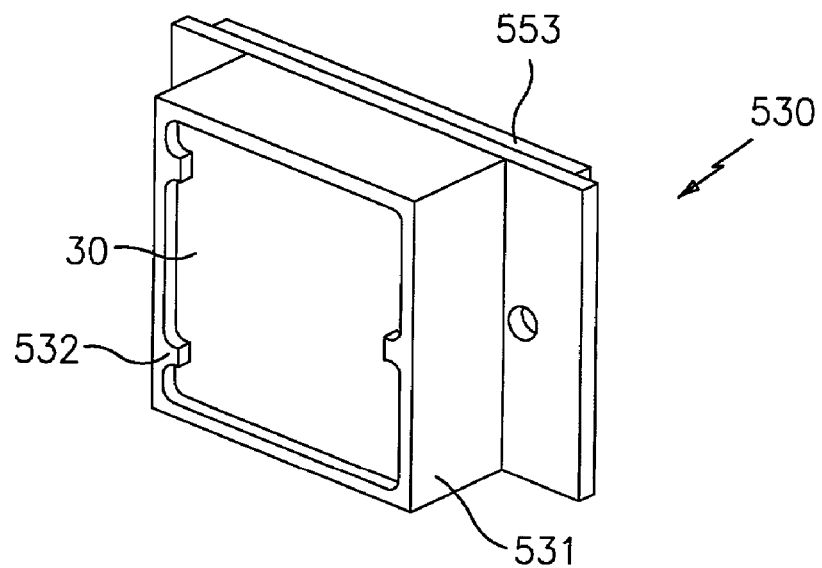
FIG. 38 is an alternative perspective view of the diffraction grating mount of FIG. 37.

Referring to FIGS. 37 and 38 there is shown in detail the diffraction grating mount 530 including frame 531, front 532, backing plate 533 and clamp 534 (FIG. 27). The various parts of diffraction grating mount 530, specifically the three ball mounts 535, 536, 537 of front 532 cooperate to fixedly position the diffraction grating 30 without undue optical distortion from mounting stresses. The frame 531, front 532 and backing plate 533 are comprised of a stainless steel alloy and clamp 34 is comprised of an aluminum alloy. Clamp 34 further includes slots 538 for optically aligning the diffraction grating 30 within the chassis.

Figure 39:
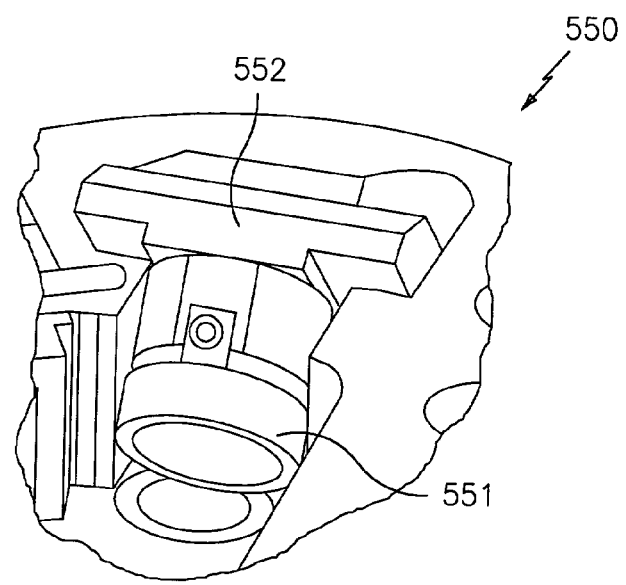
FIG. 39 is a perspective illustration of an embodiment of a turning mirror mount in accordance with the present invention.

Referring next to FIG. 39 there is shown in detail the adjustable turning mirror mount 550 including ring 551 and mount 552 which cooperate to fixedly position the turning mirror 504 without undue optical distortion from mounting stresses. The ring 551 is comprised of an aluminum alloy and the mount is comprised of titanium, front 532 and backing plate 533 are comprised of a stainless steel alloy and clamp 34 is comprised of. Clamp 34 further includes slots 538 for optically aligning the diffraction grating 30 within the chassis.

Figure 41:
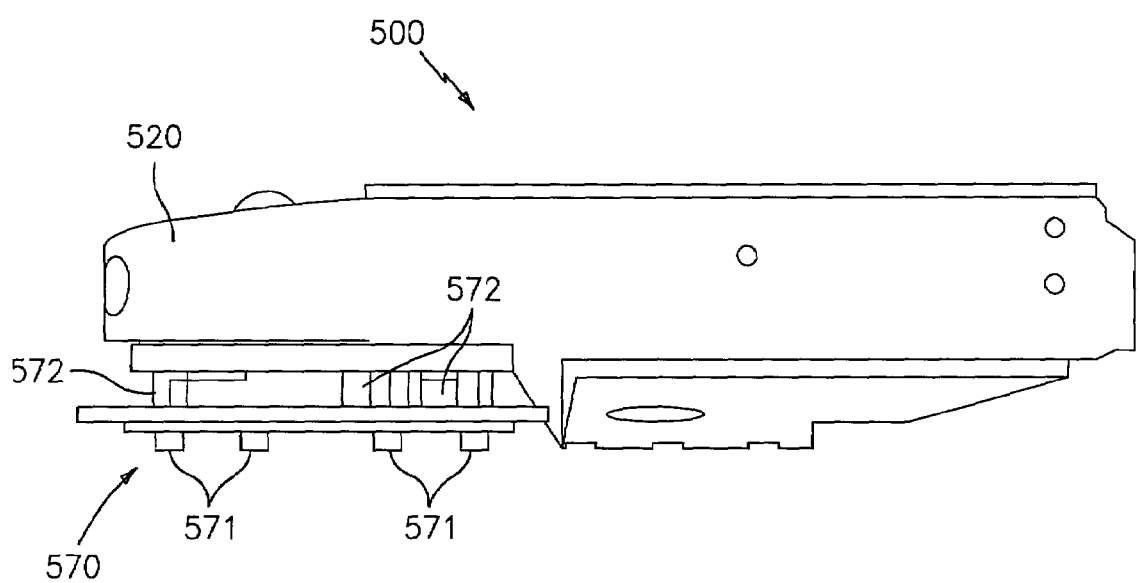
FIG. 41 is an alternative perspective view of the optical filter of FIG. 37.
Figure 40:
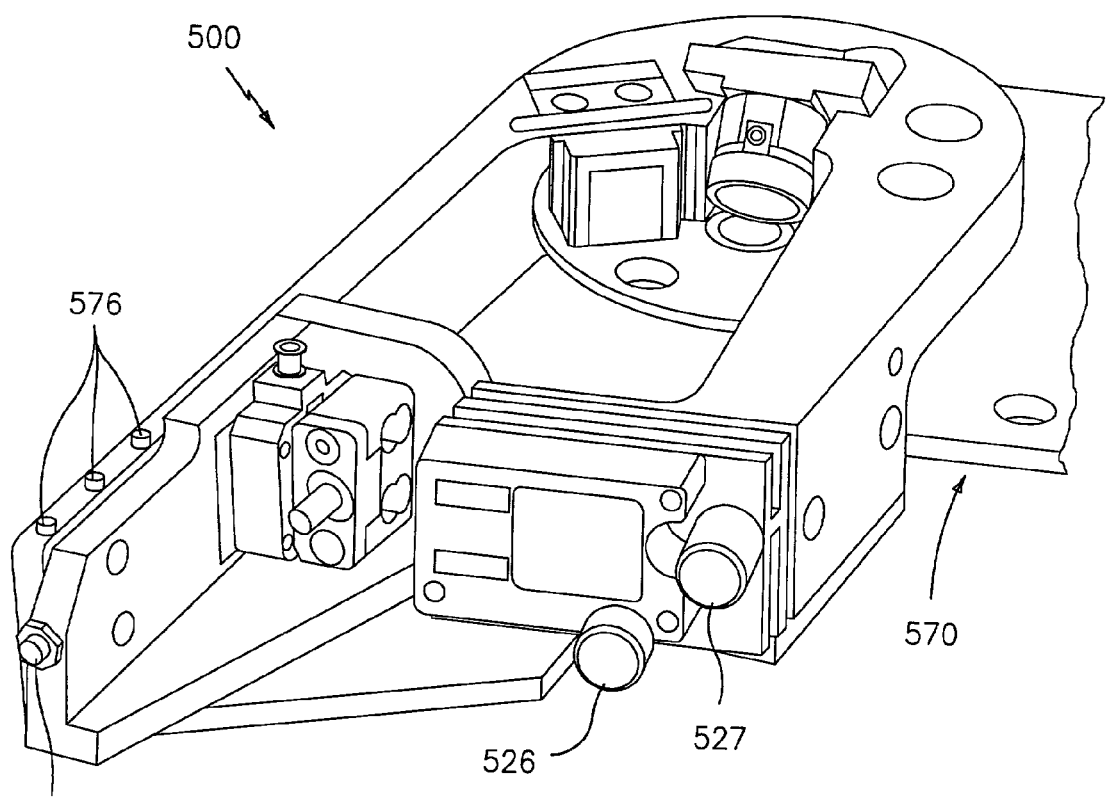
FIG. 40 is a perspective illustration of an embodiment of an optical filter including a DMD chip and board assembly in accordance with the present invention.

Referring next FIGS. 40 and 41 there is shown the relationship and attachment of the DMD chip and board assembly 570 to the chassis 520 of DGEF 500. The assembly 570 is mounted to the chassis 520 via bolts 571 into threaded holes in the chassis including standoffs 572 mounted therebetween. DGEF 500 further includes completion plate 575 mounted to chassis 520. Completion plate 575 stiffens the overall structure of the DGEF enhancing the optical stability thereof. In addition, one mode of adjustment of BGE 515 is accomplished by flexing the chassis 520 including the BGM relative to the bulk diffraction grating and then fixing the position thereof by tightening bolts within slots 576 of completion plate 575.

Figure 42:
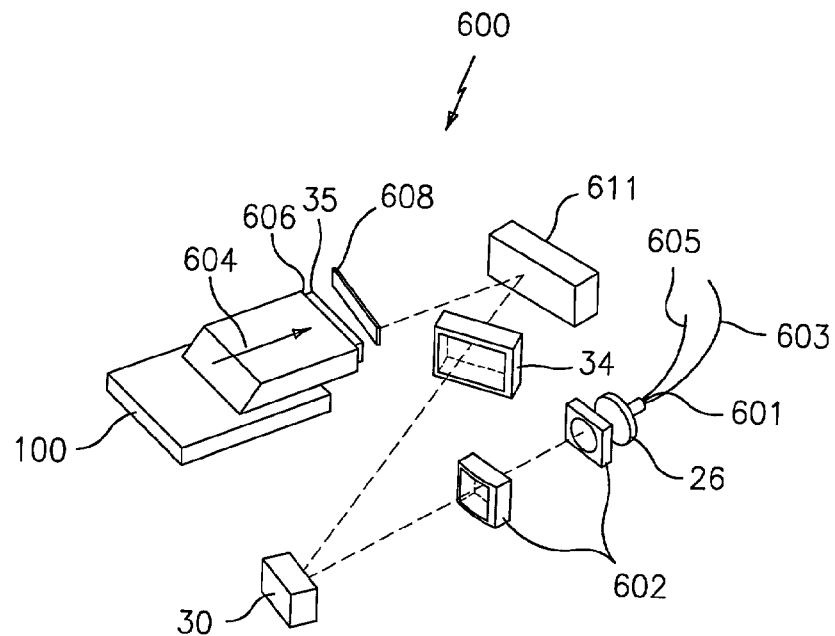
FIG. 42 is a perspective view of the optical components of another embodiment of an optical filter embodying the present invention.

FIG. 42 illustrates a schematic diagram of another embodiment of a dynamic optical filter 600 that provides improved sensitivity to tilt, alignment, shock, temperature variations and packaging profile. Similar to the filters described hereinbefore, the filter 600 includes a dual fiber pigtail 601 (circulator free operation), a collimating lens 26, a bulk diffraction grating 30, a Fourier lens 34, a λ/4 wave plate 35 and a spatial light modulator 100 (similar to that shown in FIG. 14). The dual fiber pigtail includes a transmit fiber 603 and a receive fiber 605.

As shown, the filter 600 further includes a telescope 602 having a pair of cylindrical lens that are spaced a desired focal length. The telescope functions as a spatial beam expander that expands the input beam (approximately two times) in the spectral plane to spread the collimated beam onto a greater number of lines of the diffraction grating. The telescope may be calibrated to provide the desired degree of beam expansion. The telescope advantageously provides the proper optical resolution, permits the package thickness to be relatively small, and adds design flexibility.

Additionally, the optical filter 600 includes a chisel prism 604 ("CP") that decreases the sensitivity of the optical filter to angular tilts of the optics. The insensitivity to tilt provides a more rugged and robust device to shock vibration and temperature changes. Further, the chisel prism provides greater tolerance in the alignment and assembly of the optical filter, as well as reduces the packaging profile of the filter. To compensate for phase delay associated with each of the total internal reflection ("TIR") of the reflective surfaces of the prism (which will be described in greater detail hereinafter), a λ/9 wave plate 606 is optically disposed between the prism 604 and the λ/4 wave plate 35. An optical wedge or lens 608 is optically disposed between the λ/4 wave plate 35 and the diffraction grating 30 for directing the output beam from the micro-mirror device 100 to the receive pigtail 605 of the dual fiber pigtail 601. The wedge compensates for pigtail and prism tolerances.

A folding mirror 611 is disposed optically between the Fourier lens and the λ/4 wave plate 35 to reduce the packaging size of the optical filter 600.

Figure 43:
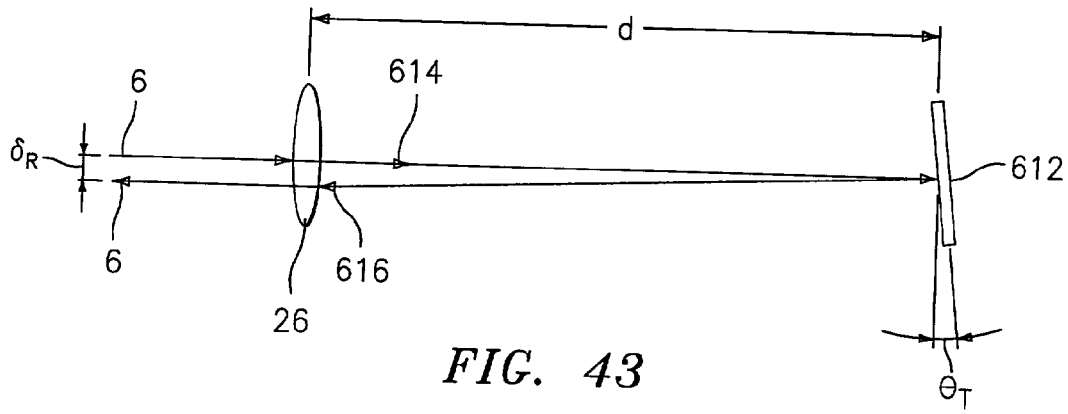
FIG. 43 is a simplified side elevation view of a collimating lens and spatial light modulator of an optical filter, in accordance with the present invention.

As suggested hereinbefore, a recurring problem in optics is the ability to send a collimated beam out to a reflective object and return it in manner that is insensitive to the exact angular placement of the reflective object. Because the beam is collimated and spread out over a relatively large number of micromirrors, any overall tilt of the array causes the returned beam to "miss" the receive pigtail. FIG. 43 illustrates the basic problem, which shows only the relevant portion of the optical system of the DGEF 600 and leaves out the grating 30 and Fourier lens 34 for clarity purposes. As shown, a point source or transmit fiber 603 (such as radiation emitted from a single-mode optical fiber) is collimated with the lens 26 and reflected off a remote object. In this case the object is a simple mirror 612 (or micromirror device 100). If the mirror 612 is not aligned very carefully with respect to the collimated beam 614, the return beam 616 will miss the receive pigtail 605. The receive pigtail 605 in FIG. 43 is the same as the transmit fiber 603, but of course the receiver can be a separate fiber behind the collimating lens 26, or another lens/fiber combination located essentially anywhere in space.

To illustrate just how sensitive the returned power is to reflector alignment in FIG. 43, consider the following example. Assume the collimating lens 26 has a focal length of 10 mm, the light emitted from the fiber 603 has a Gaussian radius of 5 um at a wavelength of 1.55 um. The radius of the collimated beam 614 is then approximately 1 mm, which provides a beam divergence of the collimated beam of about 0.5 milliradian. Displacing one end of a 2 mm reflector 612 by a mere 1 um would induce more than 4 dB of excess insertion loss from a displacement $\delta_R$ at the receiver 614 of about 5 um.

In the above example, the tilt sensitivity is directly related to the divergence angle of the collimated beam 614. By custom tailoring the reflective assembly, the reflected beam can have a predetermined pointing difference from the incident beam, allowing the use of a separate transmit and receiver fiber 603,605 before the collimating lens 26.

One possible way to reduce the tilt sensitivity of the reflector 612 would be to focus on the reflector. This has several inherent draw-backs, however. First, the size of the beam 614 is generally quite small on the reflector 612, which may be disadvantageous when the beam footprint must span many pixels of a spatial light modulator. Second, since the beam 614 comes to a focus, the beam size on the reflector 612 changes quickly as the reflector is moved with respect to the collimating lens (distance "d" in FIG. 43.)

Figure 44:
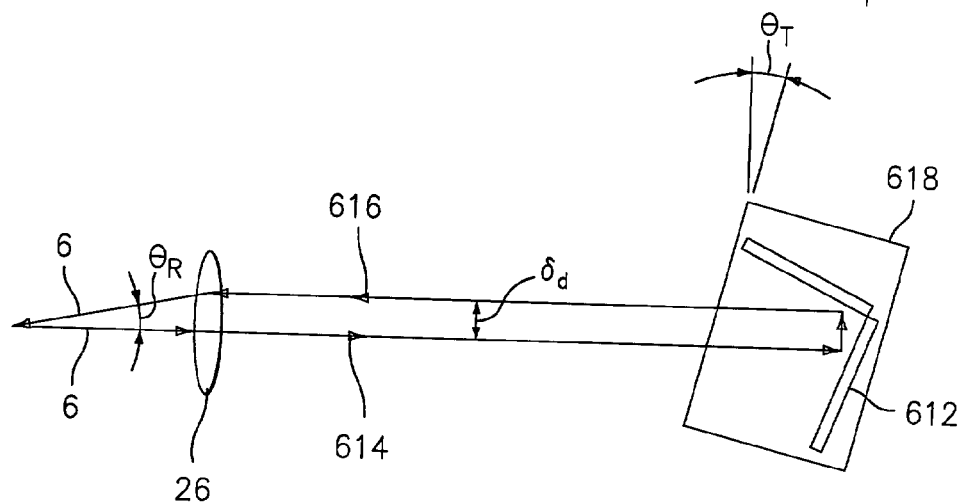
FIG. 44 is a simplified side elevation view of a collimating lens and spatial light modulator assembly of an optical filter, in accordance with the present invention.

In the above example, the main optical problem is that the tilt error of the mirror 612 causes a deviation in the reflected angle of the light from the input path. There are other combinations of surfaces that do not lead to this condition. It is well known from classical optical design that certain combinations of reflective surfaces stabilize the reflected beam angle with respect to angular placement of the reflector. Examples are corner-cubes (which stabilize both pitch and yaw angular errors) and dihedral prisms (which stabilize only one angular axis.). FIG. 44 illustrates a dihedral reflective assembly 618.

These "retro-reflective assemblies" work on basically the same principal: All the surfaces of the objects are stable relative to one another, but the overall assembly of the surfaces may be tilted without causing a deviation in reflected angle of the beam that is large compared to the divergence angle of the input beam. Tilting the assembly causes primarily an overall displacement ($\delta_d$) of the reflected beam, which causes a change in angle into the receiver $\theta_R$ as shown in FIG. 44. In many cases the beam is inherently quite small at the receiver so the received power is relatively robust to angular changes $\theta_R$.

A "well engineered" design must trade off the far-field beam size (large beam sizes allow for large physical $\delta_d$ but put high tolerances on the stability of the reflective assembly 618) and focal length and focal distance of the collimating lens 26. Conversely, small collimated beam sizes reduce the tolerances on the lens focal distance and relative stability of the retro-reflective object surfaces 618, but lead to larger angular errors $\delta_R$ (and hence larger power losses) as a function of assembly tilt $\theta_1$.

It is also well known that retro-reflective assemblies may be comprised of sets of mirrors attached to a stable subframe. In the case where angular stabilization is only needed for one angular axis, an even number of surfaces is used in the reflective assembly.

The optical filter 600 has a retro-reflective assembly 616 having an even number of reflective surfaces to provide angular stability. The retro-reflective assembly includes the chisel prism 604 and the micro-mirror device 100, which provides one of the reflective surfaces of the retro-reflective optical assembly 616. One advantage of this configuration is to remove the tilt sensitivity of the optical system (which may comprise many elements besides a simple collimating lens 26) leading up to the retro-reflective spatial light modulator 100 assembly. This configuration allows large beam sizes on the spatial light modulator without the severe angular alignment sensitivities that would normally be seen.

Figure 45:
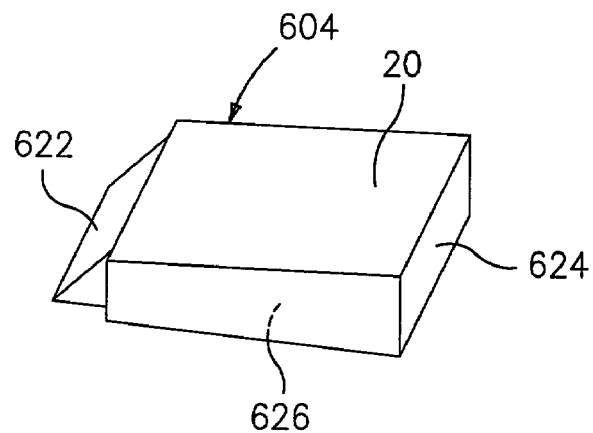
FIG. 45 is a perspective view of the chisel prism of the optical filter of FIG. 42.

FIG. 45 shows a perspective view of an embodiment of the chisel-shaped prism 604 that is use in combination with a spatial light modulator 100, such as a spatial light modulator manufactured by Texas Instruments (referenced hereinbefore and similar to that in FIG. 14) to provide the retro-reflection assembly. The prism 604 has two total internally reflecting (TIR) surfaces (the top surface 620 and back surface 622), and two transmissive surfaces (the front surface 624 and the bottom surface 626). The micro-mirror device 100 is placed normal to the bottom surface 626, as best shown in FIGS. 45 and 47.

Figure 47:
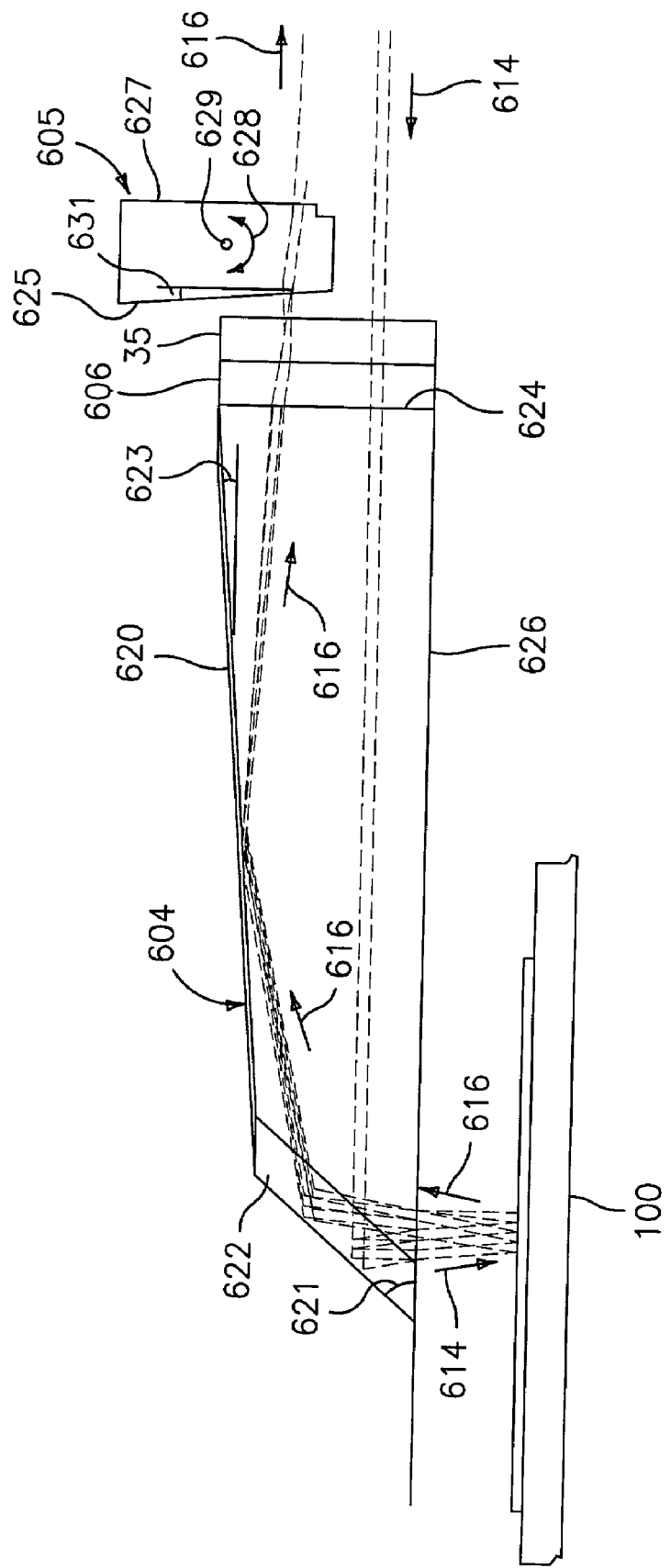
FIG. 47 is side elevational view of a portion of the optical channel filter of FIG. 46.

FIG. 47 shows a practical embodiment of a tilt-insensitve reflective assembly 616 comprising the specially shaped prism 604 (referred as a "chisel prism") and a micro-mirror device 100. Unlike an ordinary 45 degree total internal reflection (TIR) prism, in one embodiment the back surface of the prism is cut at approximately a 48 degree angle 621 relative to the bottom surface 626. The top surface is cut at a 4 degree angle 623 relative to the bottom surface to cause the light to reflect off the top surface via total internal reflection. The front surface 620 is cut at a 90 degree angle relative to the bottom surface. The retro-reflection assembly therefore provides a total of 4 surface reflections in the optical assembly (two TIRs off the back surface 622, one TIR off the micromirror device 100, and one TIR off the top surface 620.)

In order to remove the manufacturing tolerances of the prism angles, a second small prism (or wedge), having a front surface 625 cut at a shallow angle 631 (e.g., as 10 degrees) with respect to a back surface 627, is used. Slight tilting or pivoting about a pivot point 629 of the compensation wedge 608 causes the beam to be pointed in the correct direction for focusing on the receive pigtail 603.

The combination of the retro-reflective assembly 616 and compensation wedge 608 allows for practical fabrication of optical devices that spread a beam out over a significant area and therefore onto a plurality of micromirrors, while keeping the optical system robust to tilt errors introduced by vibration or thermal variations.

Referring to FIG. 47, the input light rays 614 first pass through the λ/4 wave plate 35 and the λ/9 wave plate 606. The input rays 612 reflect off the back surface 622 of the prism 604 to the micro-mirror device 100. The rays 616 then reflect off the micromirror device 100 back to the back surface 622 of the prism 620. The rays 616 then reflect off the top surface 620 for a total of 4 surfaces (an even number) and passes through the front surface 624 of the prism. The rays 616 then pass back through the λ/4 wave plate 35 and the λ/9 wave plate 606 to the wedge 608. The wedge redirects the output rays 616 to the receive pigtail 603 of the dual fiber pigtails 601 of FIGS. 42 and 45. As shown by arrows 626, the wedge 608 may be pivoted about its long axis 629 during assembly to slightly steer the output beam 616 to the receive pigtail 603 with minimal optical loss by removing manufacturing tolerances of the chisel prism.

Figure 46:
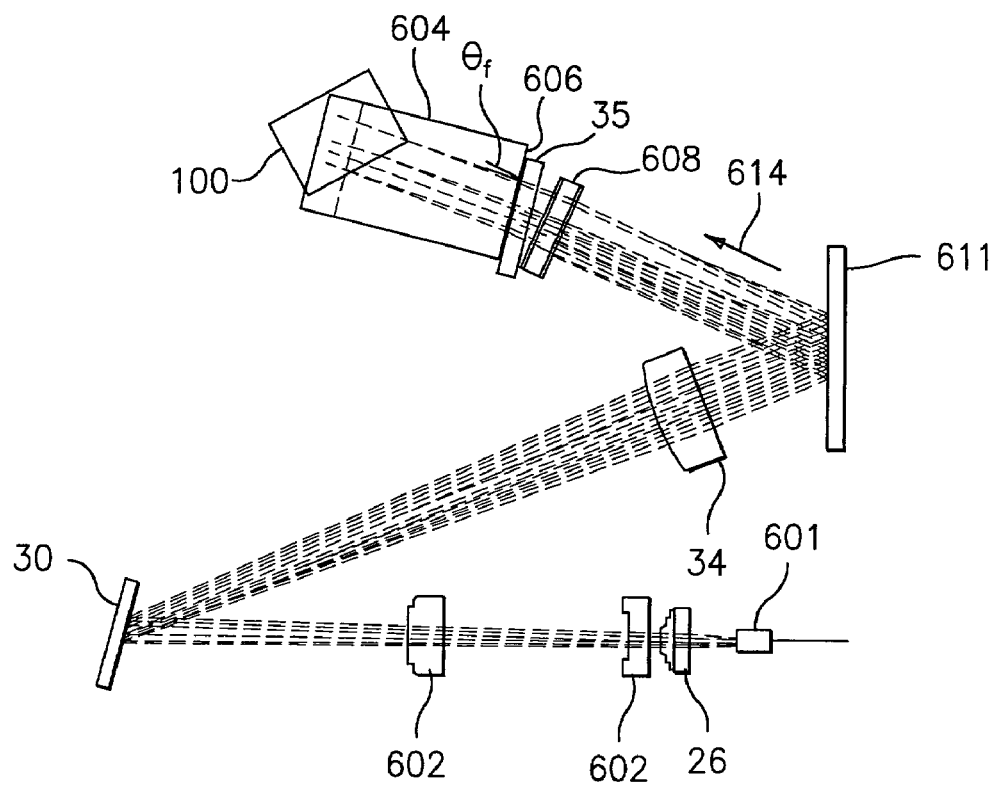
FIG. 46 is a top plan view of the optical channel filter of FIG. 39.

Referring to FIG. 46, the prism 604 (with wave plates 35,606 mounted thereto) and the micro-mirror device 100 are mounted or secured in fixed relations to each other. The prism and micro-mirror device are tilted a predetermined angle $\theta_p$ off the axis of the input beam 614 (e.g., approximately 9.2 degrees) to properly direct the input beam onto the micromirrors of the micromirror device, as described hereinbefore. The wedge 608 however is perpendicular to the axis of the input beam 614. Consequently, the receive pigtail 605 of the dual fiber pigtail 601 is rotated a predetermined angle (approximately 3 degrees) from a vertically aligned position with the transmit pigtail 603. Alternatively, the wedge may be rotated by the same predetermined angle as the prism and the micromirror device (e.g., approximately 9.2 degrees) from the axis of the input beam. As a result, the receive pigtail 605 of the dual pigtail assembly 601 may remain vertically aligned with transmit pigtail 603.

Figure 48:
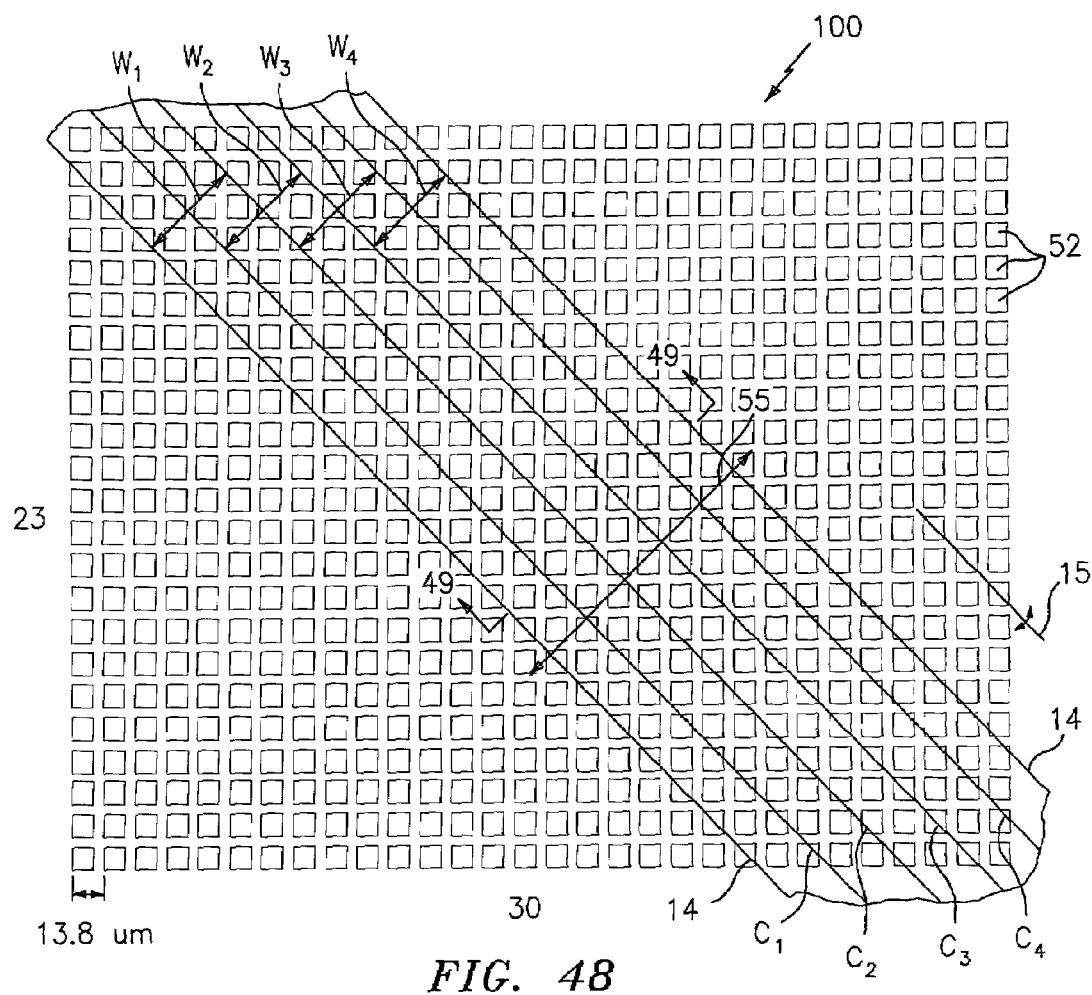
FIG. 48 is an illustration of the optical channel layout on the micromirror device in accordance with the present invention.

FIG. 48 illustrates to scale the channel layout and spacing of four optical channels of a WDM input signal onto the array of micromirrors of a micromirror device 100, similar to that described in FIGS. 14 and 21. The channels are substantially elliptical in shape and are disposed diagonally over the array of micromirrors. Note that only a intermediate portion of each of the optical channels is shown. The center of each channel is indicated by the axes $c_1$–$c_4$. In the example shown, the width of each channel $W_1$–$W_4$ is approximately equal and is approximately twice the spacing of the peaks of each of the optical channels. Consequently, the channels overlap spectrally. The left and right neighboring channels of any given channel have their $1/e^2$ intensity point at the center of the given channel, as best shown in FIG. 49.

In one embodiment, the pitch of the micromirrors is 13.8 um (or a diagonal pitch of 19.4 um). The diagonal pitch of 19.4 um, which is disposed in the spectral direction 55, corresponds to a spacing of the light at the input pigtail 603 of 300 pm. In other words, input light spaced by 300 pm (or 0.3 nm) disperses or separates the input light imaged onto the micromirror device 100 by 19.4 um. For example, for an input signal having 50 Ghz spacing set by the ITU grid, which has channel spacings of approximately 0.4 nm, the spacing of the channels imaged onto the micromirror device is approximately 25.9 um. Consequently, the spacing of the channels imaged on the micromirror device is approximately 13 um. This relationship between the spacing of the channels imaged on the micromirror device and the spacing of the light at the input pigtail 603 is set by the optical design.

Figure 49:
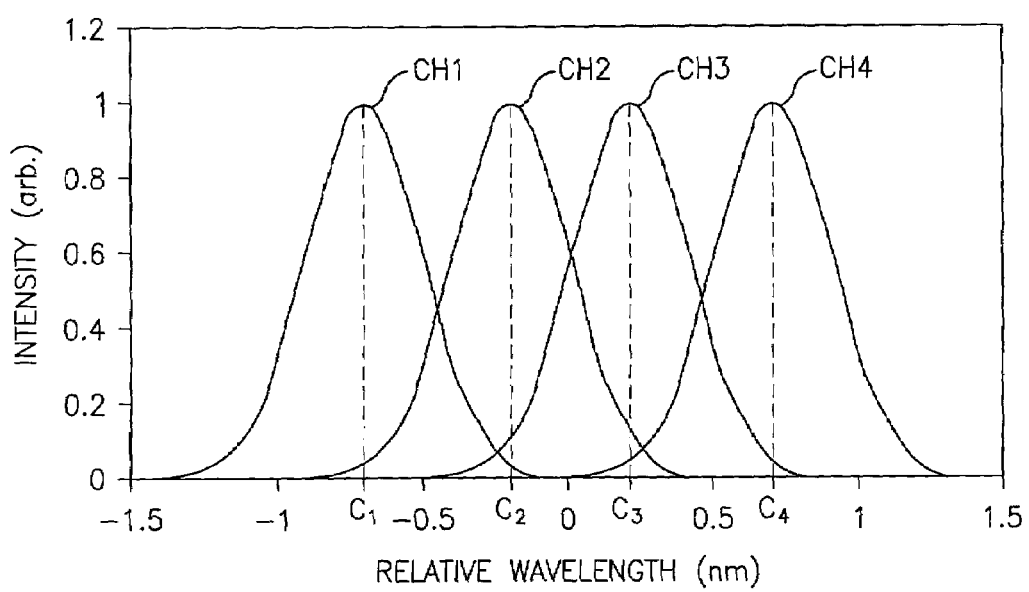
FIG. 49 is a plot of the intensity of the optical channels taken across the micromirror device of FIG. 46 along line 46—46.

FIG. 49 is a plot of the intensity of the optical channels of spectral channel layout of FIG. 48 taken along line 49–49 that illustrates four adjacent unmodulated channels on a 50 GHz (0.4 nm) spacing.

As described hereinbefore, the micromirror device 100 is rotated 45 degrees such that the pivot axis 51 is perpendicular to the spectral axis 55, as shown in FIG. 48. Alternatively, the micromirror device 100 may be rotated 45 degrees such that the pivot axis is parallel to the spectral axis 55. While this alternative is a possible embodiment of the present invention, this orientation causes substantial loss versus wavelength.

Figure 50:
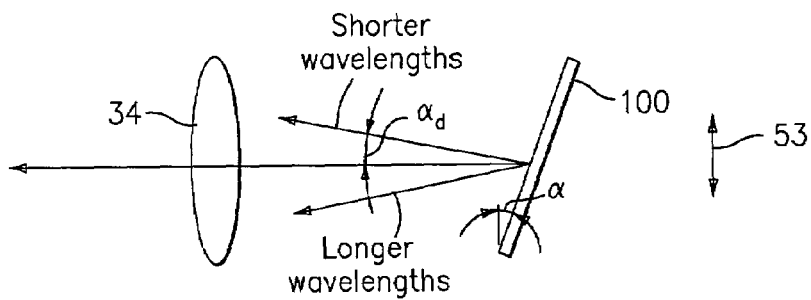
FIG. 50 is a graphical representation of the retro-reflection of the input light when the micromirrors flip about an axis perpendicular to the spectral axis.

FIG. 50 illustrates the cause of the substantial loss resulting from pivoting the micromirrors 52 parallel to the spectral direction 55. Consequently, the micromirror device 100 is tilted at a predetermined angle α (e.g. 10 degrees) in the spatial plane 53. As a result, a deviation angle $\alpha_d$ of the reflected light (i.e., shorter and longer wavelengths) is introduced that causes a wavelength dependant loss.

In contrast as shown in FIG. 50, the micromirrors 52 of the micromirror device 100 pivot perpendicular to the spectral direction 55. Consequently, the micromirror device 100 is tilted at a predetermined angle α (e.g., 10 degrees) in the spectral plane as best shown in FIGS. 1 and 50. As a result, as shown in FIG. 50, the deviation angle α of the reflected light (i.e., shorter and longer wavelengths) is substantially zero such that a simple focal length shift (as shown in FIGS. 19a, 19b) may be performed to compensate for the grating characteristics of the micromirror device.

Figure 51:
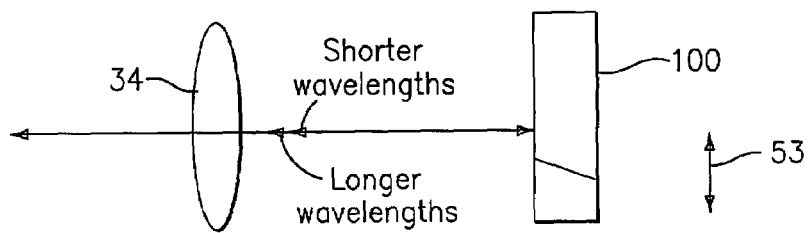
FIG. 51 is a graphical representation of the retro-reflection of the input light when the micromirrors flip about an axis parallel to the spectral axis.
Figure 52:
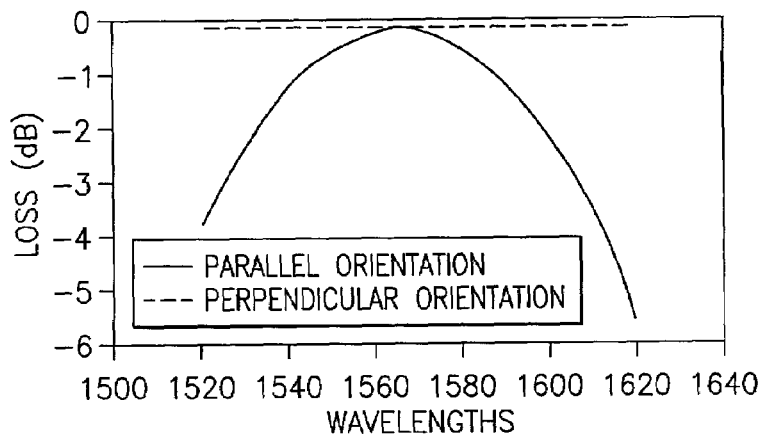
FIG. 52 is a plot comparing the power loss of the retro-reflected input signal versus wavelength, when the micromirrors flip about the axis parallel to the spectral axis and when the micromirrors flip about the axis perdendicular to the spectral axis.

FIG. 52 illustrates power loss versus wavelength of the embodiments described in FIGS. 50 and 51 across the "C" band and "L" band. The embodiment, wherein the micromirrors 52 have a pivot axis 52 perpendicular to the spectral direction 55, has minimal wavelength dependant loss, while the other embodiment, wherein the micromirrors have a pivot axis parallel to the spectral direction, has excessive wavelength dependant loss. Without some mitigation, the embodiment of FIG. 50 may preclude "C" band and "L" band operation.

Figure 53:
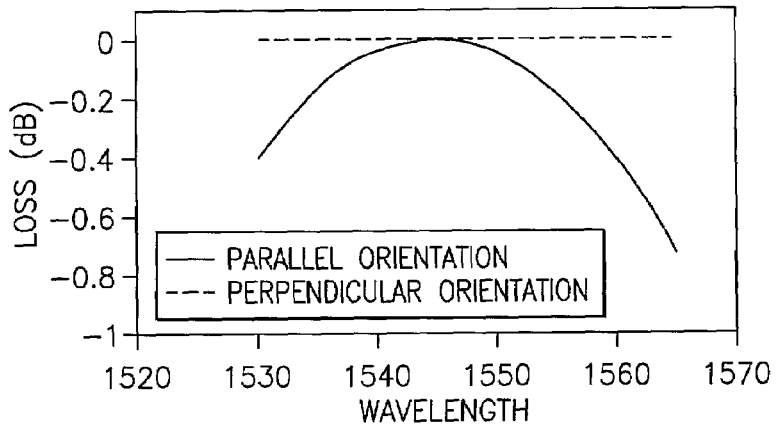
FIG. 53 is a plot comparing the power loss of the retro-reflected input signal versus wavelength, when the micromirrors flip about the axis parallel to the spectral axis and when the micromirrors flip about the axis perdendicular to the spectral axis.

FIG. 53 illustrates power loss versus wavelength of the embodiments described in FIGS. 50 and 51 across only the "C" band. Similar to that shown in FIG. 52, the parallel orientation of the pivot axis 52 shows significant wavelength dependant loss, while the perpendicular orientation shows minimal loss.

Figure 54:
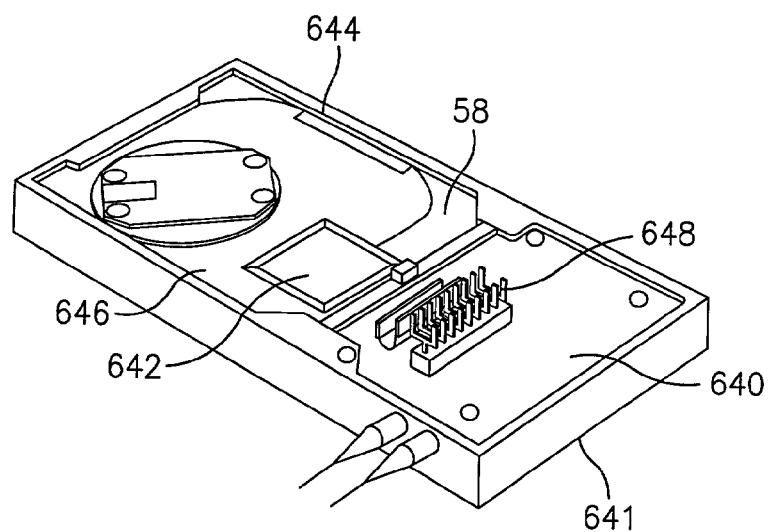
FIG. 54 is a perspective view an optical filter device similar to that shown in FIG. 42 in accordance with the present invention.
Figure 90:
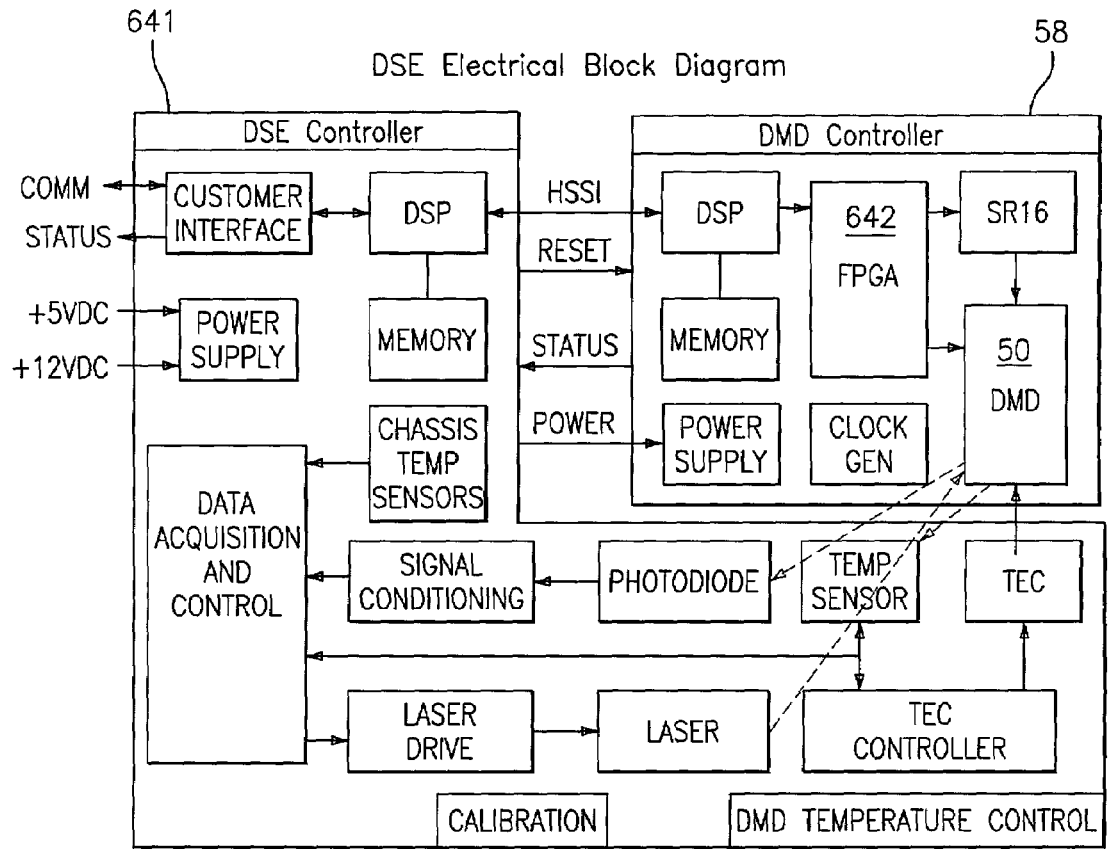
FIG. 90 is a block diagram of the electronics of the DGEF of FIG. 54 in accordance with the present invention.

FIGS. 54–63 illustrate the mechanical design of an optical filter 640, similar to the optical filter 600 described in FIGS. 42–49. FIG. 54 is a perspective view of the optical filter 640 that includes a DSE controller 641, a controller 58, a programmable gate array 642, a pair of optical couplers 644, an optical assembly 646, which includes the optics shown in FIG. 42. The processor communicates with the controller through an electrical connector 648. Referring to FIG. 90, the DSE controller 641 includes a data acquisition and control device for processing input from chassis temperature sensors and micromirror device (DMD) 50 temperature sensor. The data acquisition and control device further controls a thermoelectric device (TEC) to cool the micromirror device. The DSE controller further includes a laser for imaging a reference signal on the micromirror device and a photodiode for sensing the light reflecting back from the micromirror device, which provides and indication of movement of failure of the micromirror device. As shown, a programmable gate array (FPGA) controls the flipping of the micromirrors in response to an algorithm and input signal.

Figure 55:
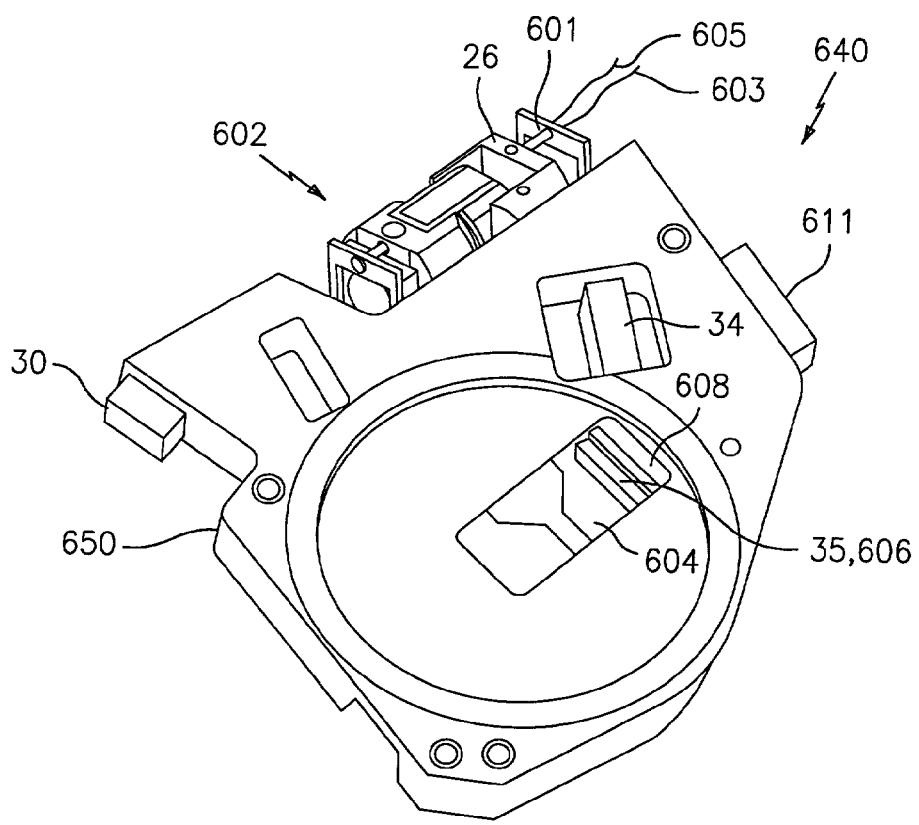
FIG. 55 is a perspective view of the optical chassis of the optical filter of FIG. 54.

FIG. 55 illustrates the optical assembly 640 includes the optics mounted to an optical chassis 650. The chassis includes a plurality of isolators to provide shock absorbers. The optics include a dual pigtail assembly 601, a collimating lens 26, a telescope 602 (e.g., cylindrical lens), a diffraction grating 30, a Fourier lens 34, a fold mirror 611, a wedge 608, a zero order wave plate 35,606, a chisel prism 604 and micromirror device 100 (not shown).

Figure 56:
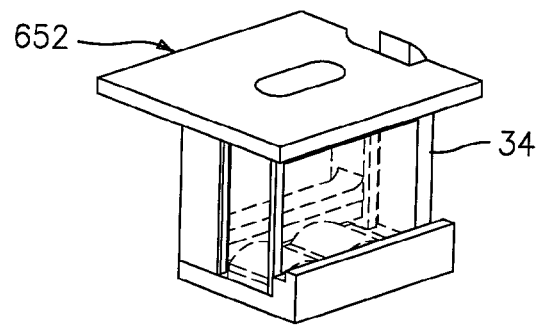
FIG. 56 is a perspective view of the Fourier lens and mount of the optical filter of FIG. 54.
Figure 57:
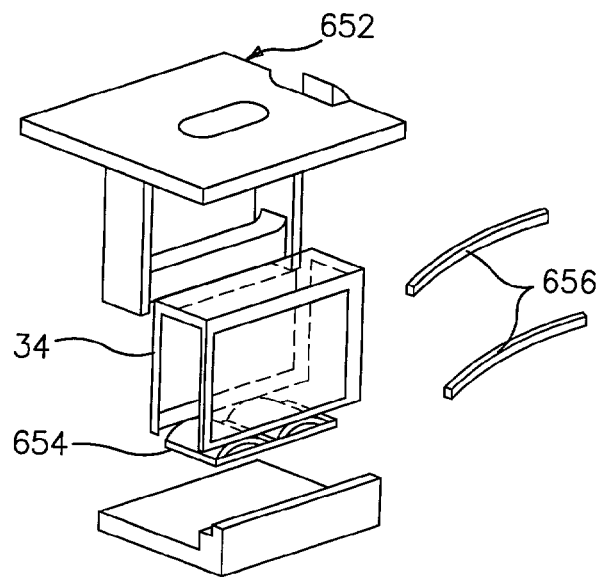
FIG. 57 is an exploded view perspective view of Fourier lens and mount of the optical filter of FIG. 54.

FIGS. 56 and 57 show the Fourier lens 34 and lens mount or retaining clip 652 that provides kinematic mounting of the Fourier lens. The mount includes a pair of finger stock springs 654 that urge the lens 34 upward against three posts disposed in the upper wall of the retaining spring 652. The mount further includes a pair of leaf springs 656 that urge the lens rearward against 3 posts or protrusions disposed in the rear wall of the clip. The mount is adjustable to the chassis to permit adjustment of the focal length before being welded thereto.

Figure 58:
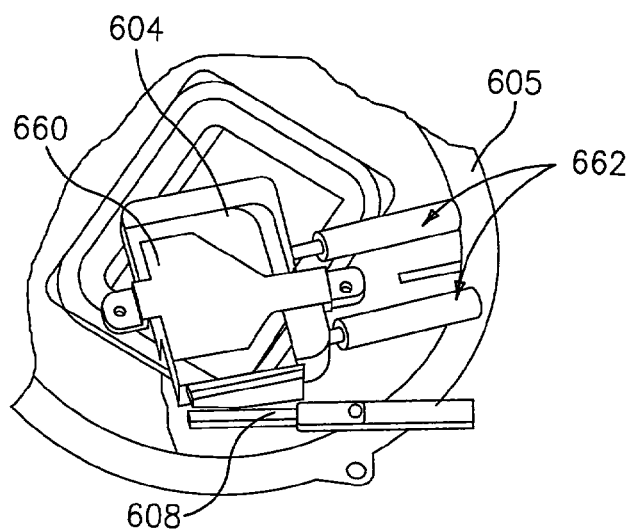
FIG. 58 is perspective view of a portion of the optical filter of FIG. 54.

FIG. 58 shows the mounting mechanism for mounting the chisel prism 604 and the wedge 608 to the optical chassis 605. The wedge is mounted to a rod the passes through a bore in the chassis. The rod permits the wedge to be rotated about its longitudinal axis during assembly to align the retro-reflected light to the receive pigtail 605 (not shown), whereinafter the rod is secured to the chassis, such as by welding. The prism is secured to the chassis by a 6 point mount that include a retaining clip 660 and a pair of plungers 662.

Figure 59:
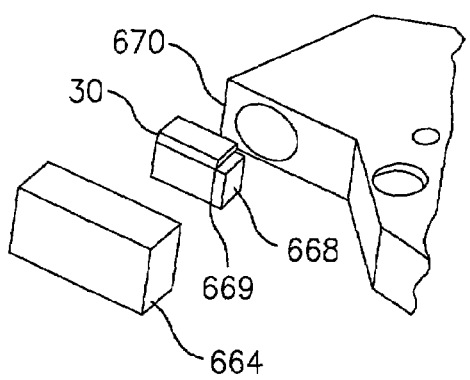
FIG. 59 is an exploded perspective view of a grating mount of the optical filter of FIG. 54.
Figure 60:
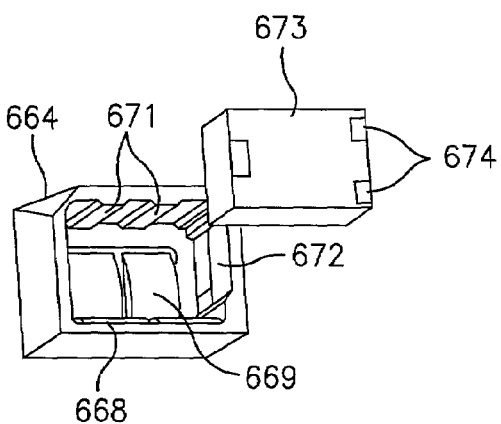
FIG. 60 is an exploded perspective view of the grating mount of FIG. 59.

FIGS. 59 and 60 show the diffraction grating 30 and grating mount 664 that provides kinematic mounting of the grating. The grating is disposed in the grating mount that includes two sets of finger stock springs 668,669 that urge grating against three tabs 670 disposed in the chassis and the protrusions 671 disposed in the upper wall of the mount 664. Further, a finger stock 672 is dispose in one side of the mount for urging the grating against the opposing side wall of the mount. The front surface 673 of the grating is ablated to remove the epoxy at 674 to provide a hard surface to engage the tabs 670 disposed in the chassis 605.

Figure 61:
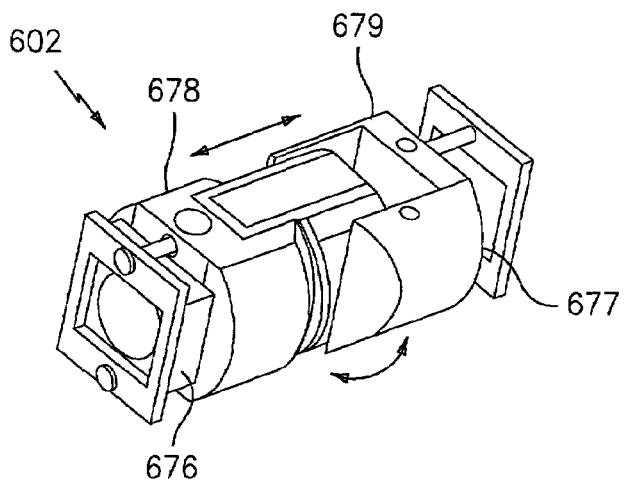
FIG. 61 is a perspective view of a telescope of the optical filter of FIG. 47.
Figure 62:
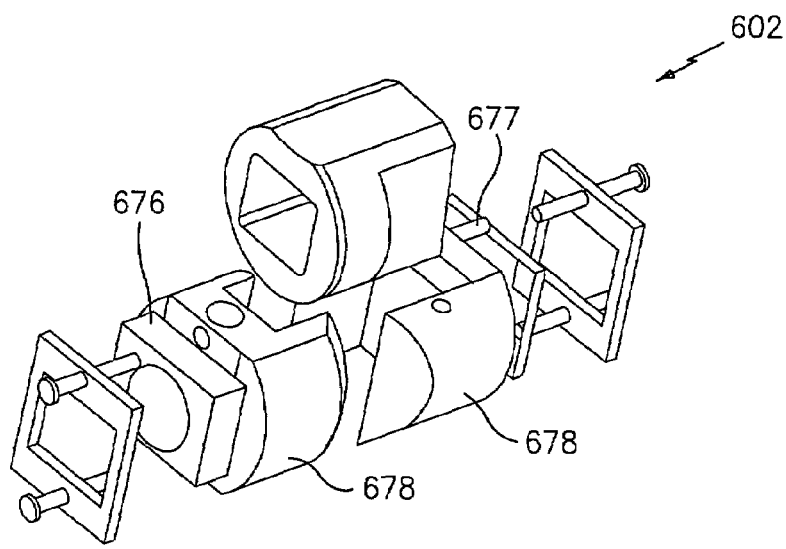
FIG. 62 is an exploded perspective view of the telescope of FIG. 54.

FIGS. 61 and 62 illustrate the telescope 602 that includes a pair of lens 676,677 mounted to a pair of submounts 678,679. An intermediate component permits the focal length of the pair of lens 676,677 and the rotational orientation therebetween to be adjusted off chassis. After being adjusted, the telescope can then be welded or otherwise secured to the chassis.

Figure 63:
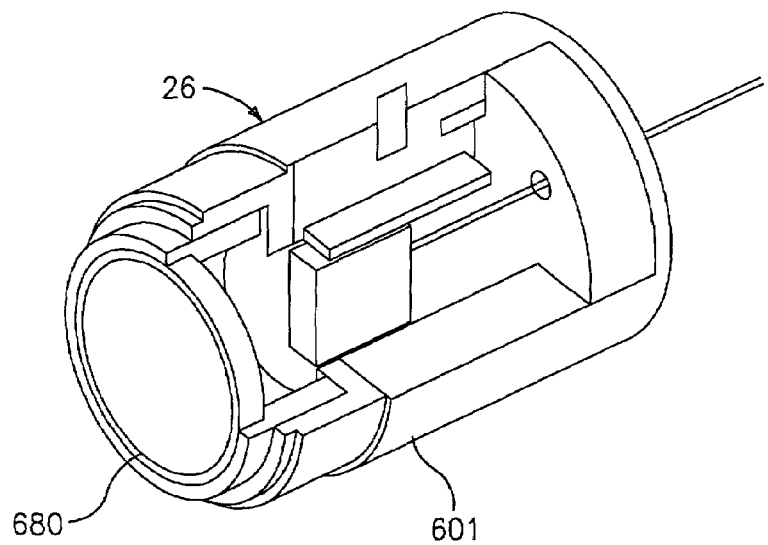
FIG. 63 is a perspective view of a collimating lens of FIG. 54.

FIG. 63 shows a cross-section view of the collimating lens 26 that includes the dual fiber pigtail assembly 601 disposed therein. Similar to the telescope 602, the lens portion 680 may be rotated relative to the pigtail assembly 601 and the focal length therebetween adjusted.

While the optical filter 10,600 embodying the present invention described hereinabove illustrate a single device using a set of optical components, it would be advantageous to provide an embodiment including a plurality of optical filters that uses a substantial number of common optical components, including the spatial light modulator. Such an embodiment includes a complementary set of input pigtails 17,27 spatially displaced from the first set of input pigtails, and a complementary output pigtail 82 spatially displaced from the first output pigtail. The light passing to and from the input and output pigtails propagate and reflect off the same optics.

Figure 64:
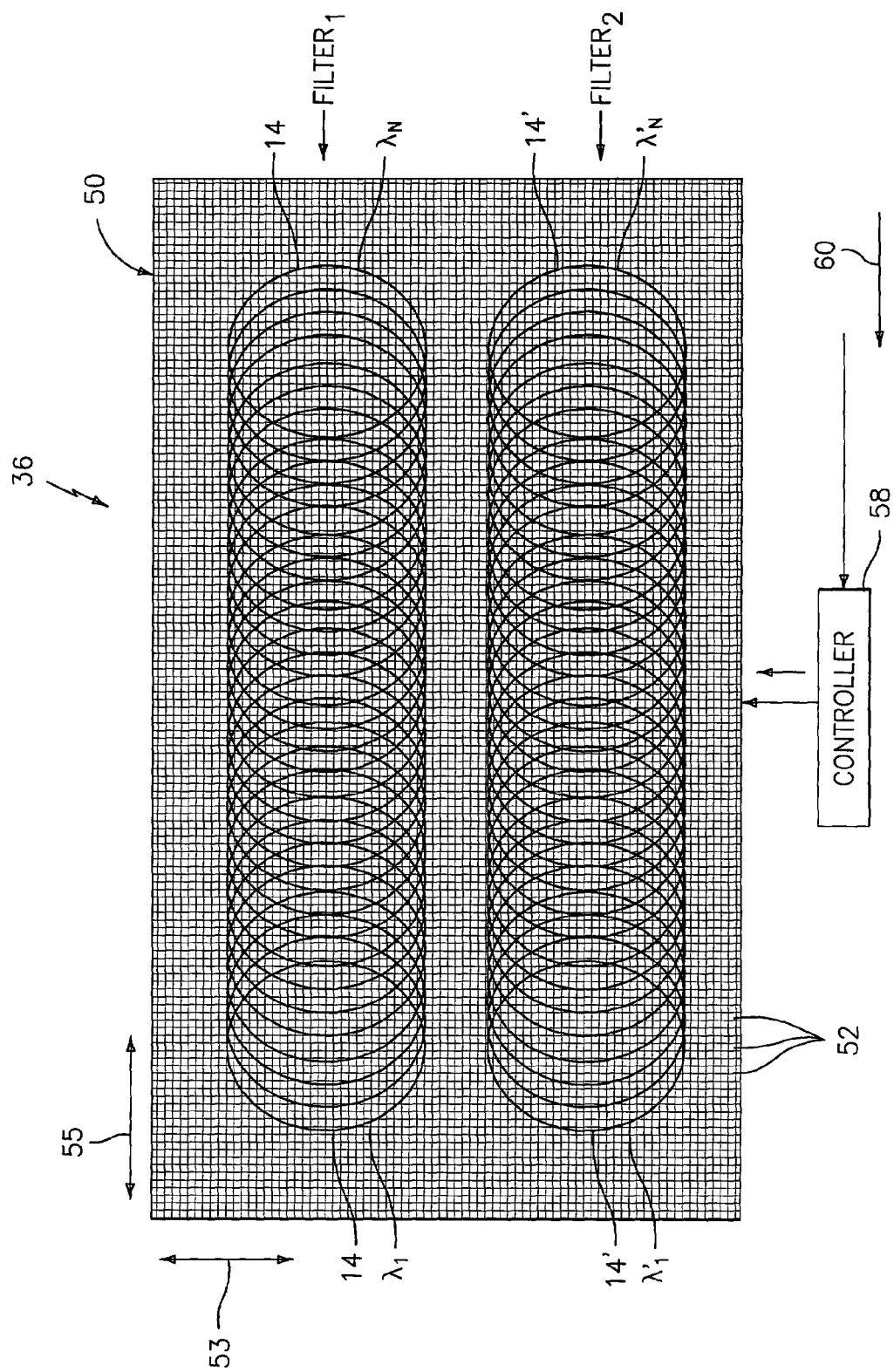
FIG. 64 is a block diagram of a spatial light modulator of an optical filter that includes a plurality of optical filters, wherein the optical channels are distinctly projected onto the micromirror device, in accordance with the present invention.

To provide a plurality of optical filters (Filter$_1$, Filter$_2$) using similar components, each optical filter uses a different portion of the micromirror device 36, as shown in FIG. 64, which is accomplished by displacing spatially the second set of input and output pigtails. As shown, the channels 14 of each filter is displaced a predetermined distance in the spatial axis 53. While a pair of optical filters is shown in FIG. 64, one will recognize that another embodiment of the present invention has N number of filters using substantially the same optical components, as described hereinabove.

Figure 65:
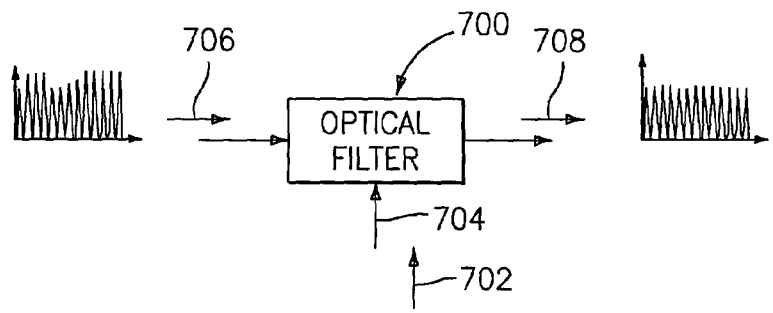
FIG. 65 is a block diagram of an embodiment of the optical filter functioning as a dynamic gain equalization filter in accordance with the present invention.
Figure 66:
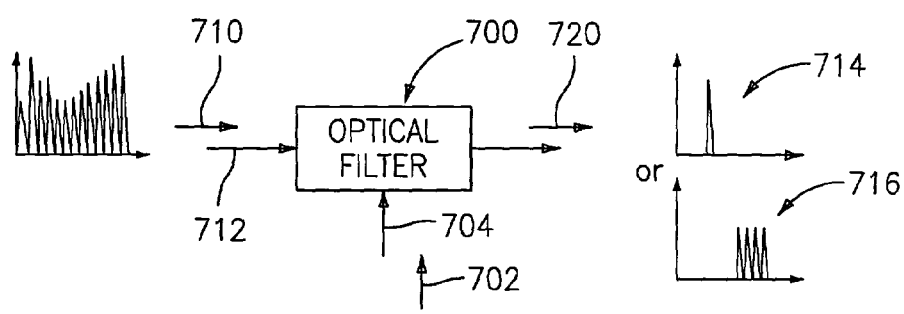
FIG. 66 is a block diagram of an embodiment of the optical filter functioning as a drop filter in accordance with the present invention.
Figure 67:
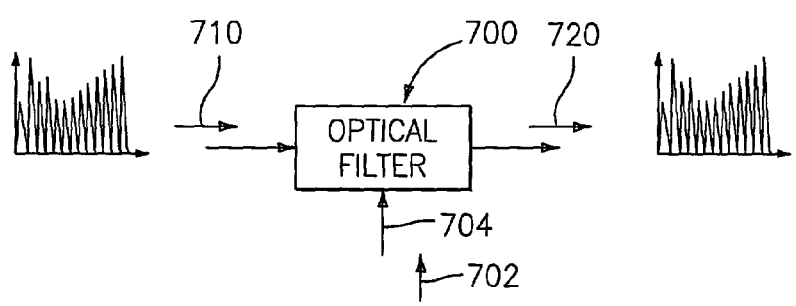
FIG. 67 is a block diagram of an embodiment of the optical filter functioning as an optical spectral analyzer in accordance with the present invention.

As shown in FIGS. 65–67, an optical filter, generally shown as 700, is programmable to selectively provide a desired filter function for filtering an optical WDM input signal 12 in network applications, for example. The flexible optical filter includes a micromirror device similar to the DGEF shown in FIGS. 1–64, which is described in great detail hereinafter. In fact the configuration of the flexible optical filter 700 is substantially the same as the DGEF described hereinafter. The digital signal processor (DSP) (see FIG. 77) of the controller 58 or DSE controller of optical filter 700 is programmable to provide any desirable filter function in response to control signal 702 at input 704. Alternatively, the DSP may be programmed to provide the desired filter function. The control signal is provided to the controller 58 (see FIG. 2) of the micromirror device 36. In response to the control signal 702, the controller 58 flips the appropriate mirror or mirrors 52 to provide the desired filter function.

For example as shown in FIG. 65, the optical filter 702 may selectively attenuate selected optical channel(s) of an input signal 706 to flatten or equalize each of the input channels to provide an equalized output signal 708, as described hereinafter in FIGS. 1–64.

As shown in FIG. 66, the optical filter 700 may be reconfigured to function as an optical drop device. A WDM input signal 710 is provided at the input port 712. In response to the control signal 702, the micromirrors 52 are flipped to redirect or drop a selected optical channel 714. In the alternative, the optical filter 710 may be configured to drop a band of optical channels 716. The present invention also contemplates dropping any combination of channels.

As shown in FIG. 67, the optical filter 700 may be reconfigured to function as an optical spectral analyzer (OSA) functioning in the scan mode. A WDM input signal 710 is provided at the input port 712. In response to the control signal 702, the micromirrors 52 are dynamically flipped to sequentially drop each of the input optical channels at the output port 720. The output may then be provided to an optical detector (not shown) to measure and determine various optical characteristics of the input signal. This configuration is also similar to the optical channel monitor (OCM) of copending U.S. Provisional Patent Application Ser. No. 60/325,066, which is incorporated herein by reference.

In this scanning mode one will also appreciate that as the filter function scans the spectrum of the input signal, the bandwidth may be varied to provide data to measure the optical signal-to-noise (OSNR) of the input signal or channels, as described in U.S. Provisional Patent Application Ser. No. 60/283,197, which is incorporated herein by reference. For instance, a filter function having a wide bandwidth is used to measure the power of an optical channel, while a filter function having a narrow bandwidth is used to measure the noise level between the optical channels.

One will also appreciate that the optical filter may also be commanded to flip the micromirrors 52 to provide a band-stop, bandpass or notch filter function.

Figure 68:
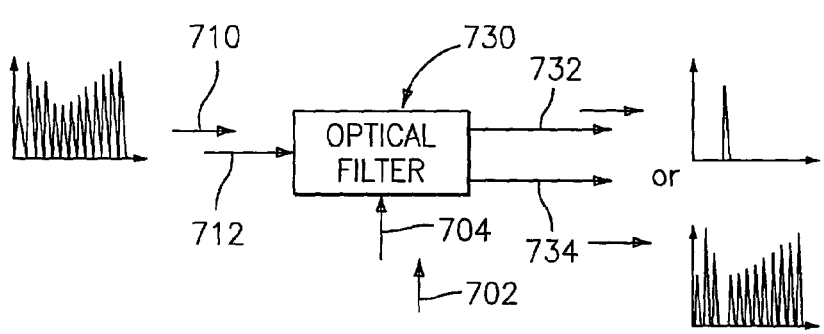
FIG. 68 is a block diagram of an embodiment of the optical filter functioning as a reconfigurable optical add/drop multiplexer in accordance with the present invention.

As shown in FIG. 68, the optical filter 730 provides a pair of output ports 732,733, which is similar to the reconfigurable optical add/drop multiplexer (ROADM) described in U.S. Provisional Patent Application Ser. No. 60/325,065, which is incorporated herein by reference. In response to the control signal 702, the optical filter 730 drops a channel or group of channels to one output port 732, and redirects the other output signals to the second port 734. One will appreciate that the two-port optical filter 730 may be configured to function as the optical filters in FIGS. 65–67.

Figure 69:
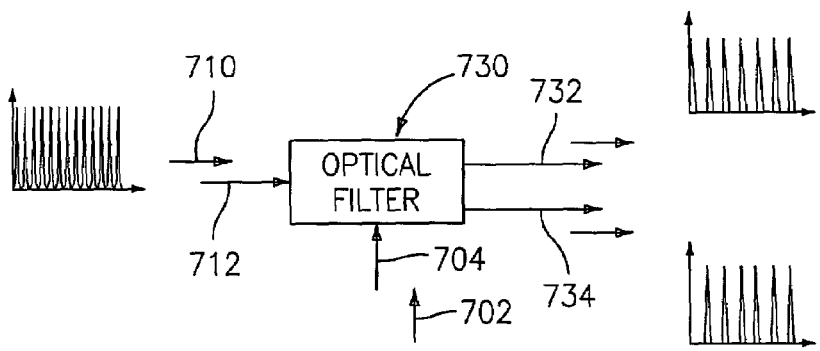
FIG. 69 is a block diagram of an embodiment of the optical filter functioning as an optical deinterleaver/interleaver device in accordance with the present invention.

As shown in FIG. 69, the optical filter 730 provides a pair of output ports 732,733, which is similar to the optical interleaver/deinterleaver (ROADM) described in U.S. Provisional Patent Application Ser. No. 30/325,064, which is incorporated herein by reference. In response to the control signal 702, the optical filter 730 drops all the odd channels one output port 732, and redirects all the even output signals to the second port 734. One will appreciate that the two-port optical filter 740 may be configured to function as the optical filters in FIGS. 65–67.

Figure 70:
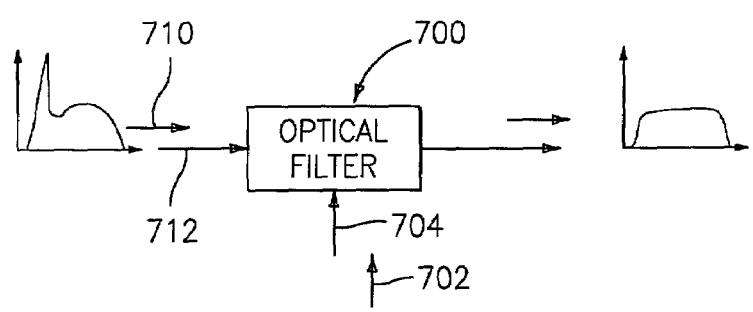
FIG. 70 is a block diagram of an embodiment of the optical filter functioning as a variable optical filter in accordance with the present invention.

The optical filter may be configured in response to the control signal to function in laboratory and/or development applications. In FIG. 70, the optical filter 700 may be programmed to function as an amplifier gain flattening filter.

Figure 71:
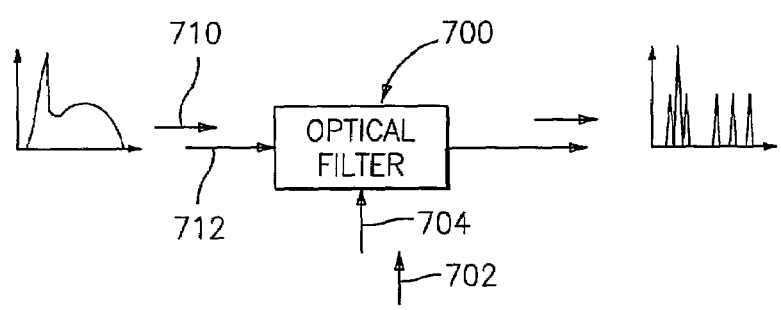
FIG. 71 is a block diagram of an embodiment of the optical filter functioning as a variable optical filter in accordance with the present invention.

In FIG. 71, the optical filter 700 may be configured to function as a variable optical source.

Figure 72:
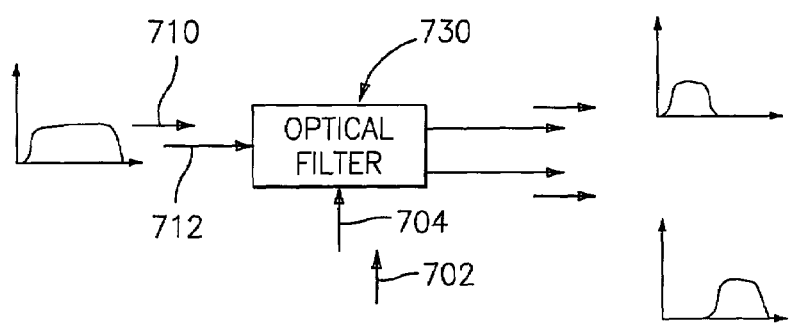
FIG. 72 is a block diagram of an embodiment of the optical filter functioning as a variable optical filter in accordance with the present invention.

In FIG. 72, the optical filter 720,730, having a pair of output ports 732,734, may function as a programmable edge filter.

The optical filters 700,720,730 may also be configured to provide a variable or selectable filter shape, such as sawtooth, ramp and square. The optical filters 720,730 may also be configured to tap off selected portions of the input signals at one output port and pass the remaining portions of the input signal through the second output port.

One will appreciate that the optical filter contemplated by the present invention enable innumerable filter functions to be programmed using the same hardware.

Figure 73:
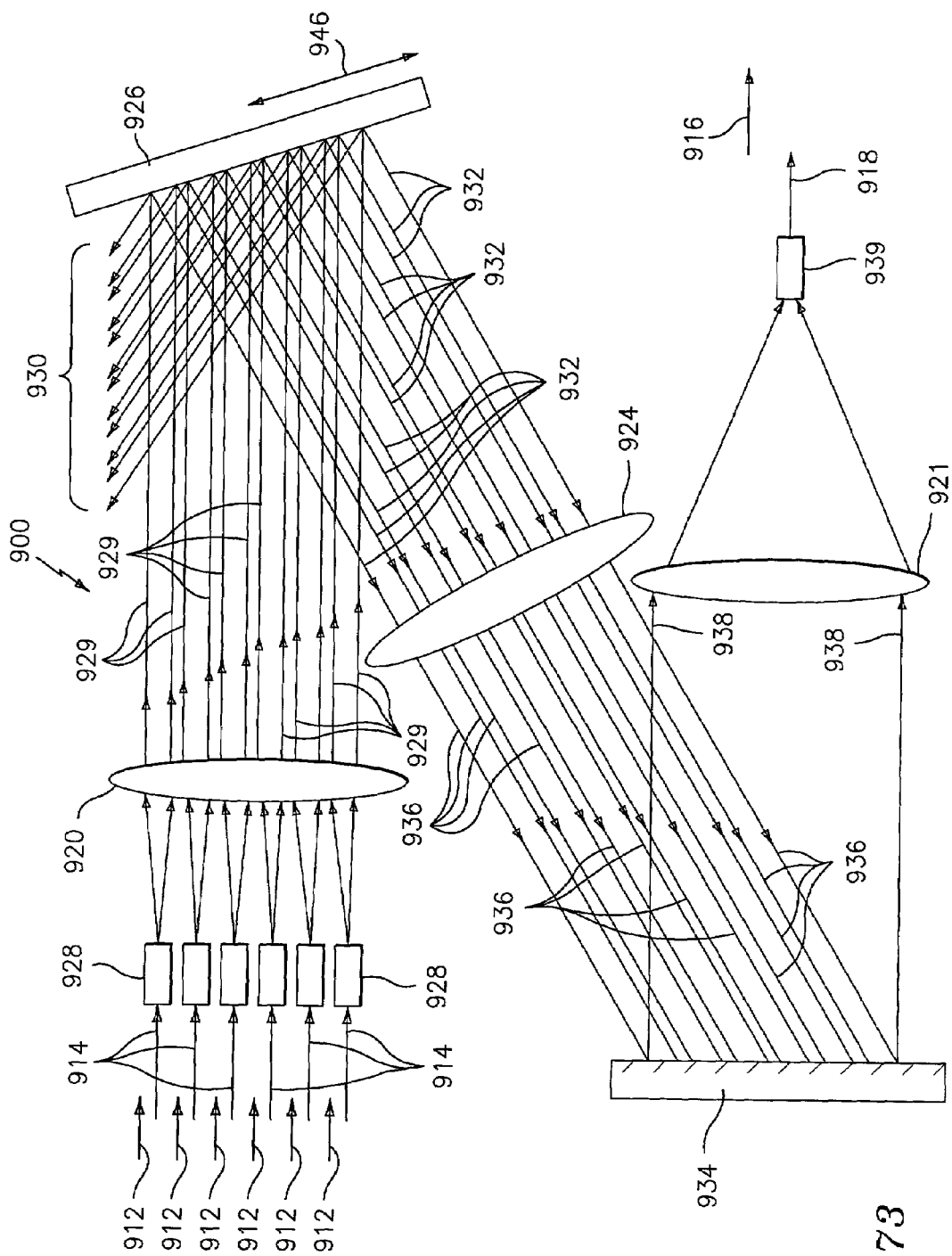
FIG. 73 is a top plan view of a block diagram of a reconfigurable variable optical attenuator multiplexer (VOA Mux) including a spatial light modulator in accordance with the present invention.
Figure 74:
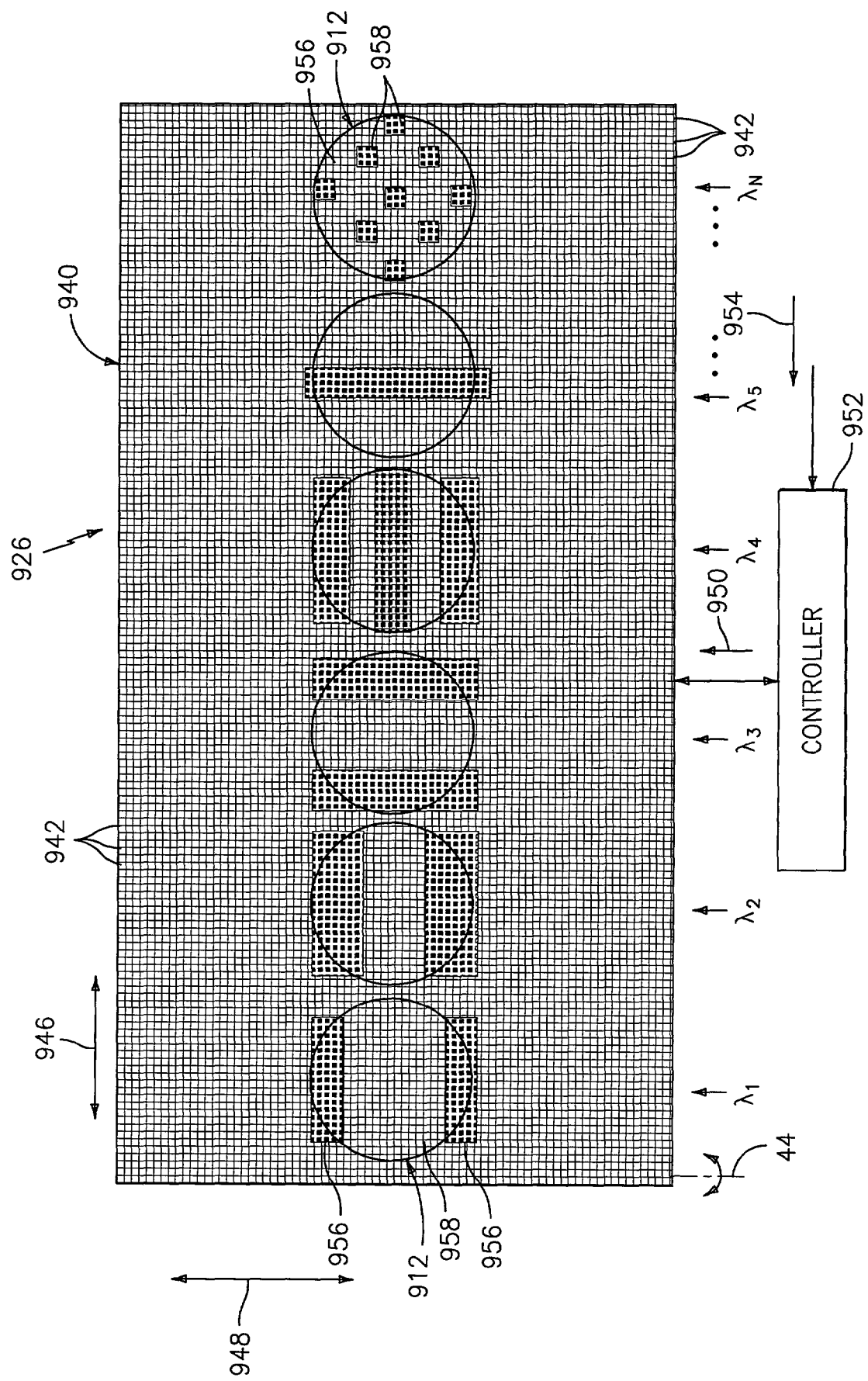
FIG. 74 is a block diagram of a spatial light modulator of the VOA Mux of FIG. 73 having a micromirror device, wherein the optical channels are distinctly projected onto the micromirror device, in accordance with the present invention.

FIGS. 73 and 74 show a variable optical attenuator multiplexer 900 (VOA Mux or Vmux) that selectively attenuates each of a plurality of optical channels 912 (i.e., wavelength bands of light) provided at respective input ports or pigtails 914, and combines the attenuated channels to provide an optical WDM output signal 916 at an output port or pigtail 918.

The VOA Mux 900 of FIGS. 73 and 74 further includes an imaging lens 920, a collimator 921, a light dispersive element 922, and a transform lens 924 for directing light to and from a spatial light modulator 926. The input pigtails 914 receive respective optical channels 912, centered at different channel wavelengths, from an optical network (not shown), for example. The optical channels are provided to each respective input pigtail 914 in either increasing or decreasing spectrally sequential order. A capillary tube 928, which may be formed of glass, is attached to one end of each input pigtail 914 such as by epoxying or collapsing the tube onto the input pigtails. Alternatively, each input pigtail 914 may be disposed within a single capillary tube 928.

Each optical channel 912 exits the respective input pigtail 914 (into free space) to the imaging lens 920, which images the optical channels 912 onto the spatial light modulator 926. The spatial light modulator 926 selectively attenuates each optical channel 912 by deflecting a portion of the incident radiation 929, as indicated by arrows 930, away from the optical output path, as indicated by arrows 932. Specifically, the spatial light modulator 926 reflects selected portions of each optical channel 912 (i.e., attenuated optical channels) along a first optical path 932 to the output pigtail 918, and deflects the remaining portion of each optical channel (i.e., attenuated portion) along a second path 930. The attenuated optical channels 936 pass through the transform lens 924 (e.g., Fourier lens), which focuses the attenuated channels onto the light dispersion element 922 (e.g., a diffraction grating or a prism). The light dispersion element combines the spectrally dispersed attenuated channels.

In one embodiment, the diffraction grating 922 comprises a blank of polished fused silica or glass with a reflective coating (such as evaporated gold or aluminum), wherein a plurality of grooves 934 (or lines) are etched, ruled or otherwise formed in the coating. The diffractive grating 922 has a predetermined number of lines, such as 600 lines/mm, 850 lines/mm and 1200 lines/mm. The resolution of the VOA Mux improves as the number of lines/mm in the grating increases. The diffraction grating 922 may be similar to those manufactured by Thermo RGL, part number 3325FS-660 and by Optometrics, part number 3-9601. Alternatively, the diffraction grating may be formed using holographic techniques, as is well known in the art. Further, the light dispersion element 922 may include a prism or optical splitter to combine the light as the light passes therethrough, or a prism having a reflective surface or coating on its backside to reflect the dispersed light.

The diffraction grating 922 directs the combined, attenuated channels 936 to the collimator 921, which focuses the combined attenuated channels to the output pigtail 918 to provide the WDM output signal 916. The collimator may be an aspherical lens, an achromatic lens, a doublet, a GRIN lens, a laser diode doublet or similar collimating lens. A capillary tube 939, which may be formed of glass, is attached to one end of the output pigtail 918 such as by epoxying or collapsing the tube onto the output pigtail.

As shown in FIG. 74, the spatial light modulator 926, comprises a micromirror device 940 having a two-dimensional array of micromirrors 942, which cover a surface of the micromirror device. The micromirrors effectively form a two-dimensional diffraction grating that is mounted in a retro-reflecting configuration, although other configurations are contemplated by the present invention. The micromirrors are generally square and typically 14–20 μm wide with 1 μm spaces between them. The micromirrors are shown positioned or flipped to provide the desired attenuation of each respective channel, which will be described in greater detail hereinafter. While the micromirrors are described as being generally square, one will appreciate that the mirrors may be circular, rectangular, triangular or any other geometric shape.

Figure 76:
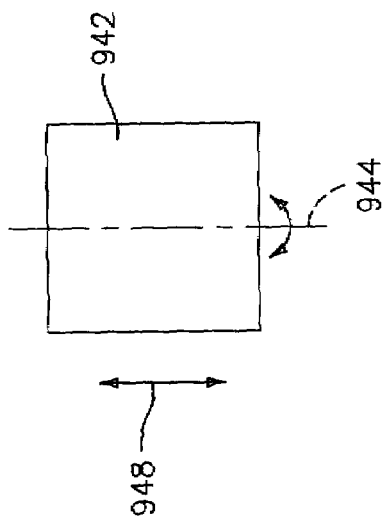
FIG. 76 is a plan view of a micromirror of the micromirror device of FIG. 74 in accordance with the present invention.
Figure 75:
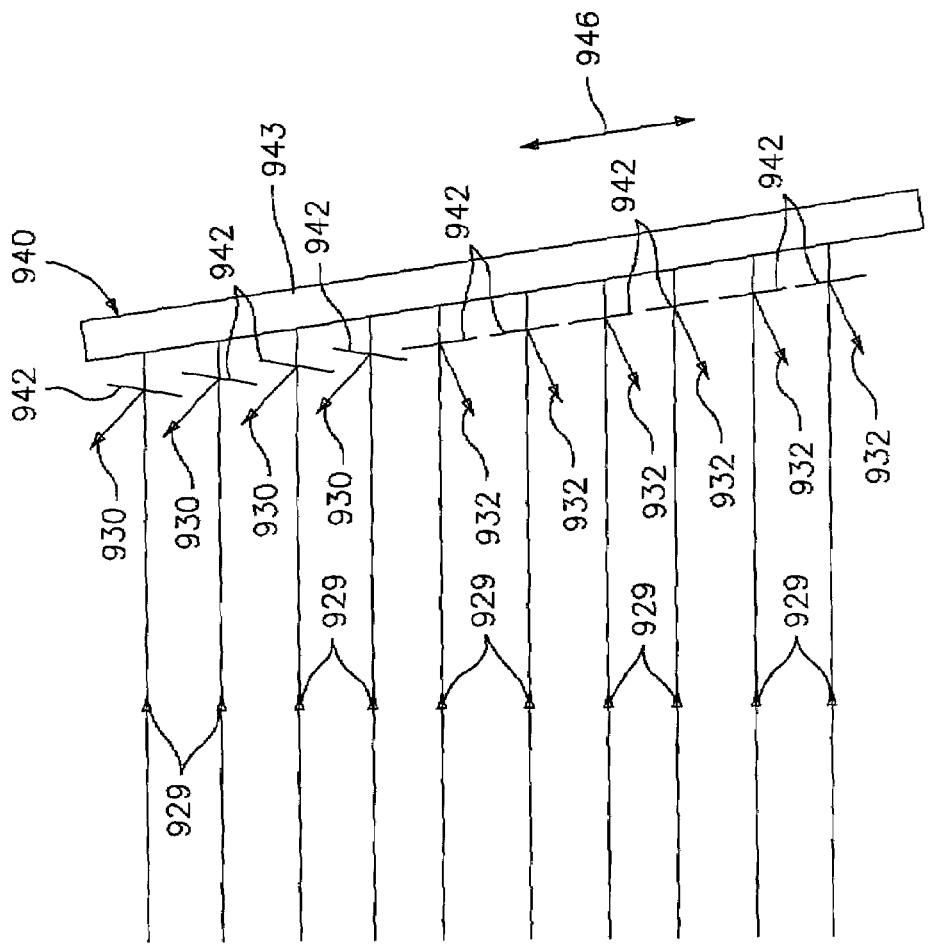
FIG. 75 is an expanded cross-sectional view of the micromirror device of FIG. 74 showing a partial row of micromirrors, in accordance with the present invention.

FIG. 75 illustrates a partial row of micromirrors 942 of the micromirror device 940. The micromirrors may operate in a "digital" manner. In other words, the micromirrors either lie flat (i.e., parallel to the substrate/base 943 of the micromirror device 940) in a first position and thus reflect light along the output path, as indicated by arrows 932. Or the micromirrors 942 can be tilted, flipped or rotated to a second position such that the micromirrors deflect light away from the output path 932 at a predetermined angle, as indicated by arrows 930. The micromirrors 942 flip about an axis 944 parallel to the spatial axis 948, as shown in FIG. 76. One will appreciate, however, that the micromirrors may flip about any axis, such as parallel to the spectral axis 946 or any desired angle therebetween, such as 45 degrees off the spatial axis.

Referring to FIG. 74, the micromirrors 942 are individually flipped between the first position and the second position in response to a control signal 950 provided by a controller 952 in accordance with an attenuation algorithm and an input command 954. The attenuation algorithm may provide a bit (or pixel) map or look-up table indicative of the state (flat or tilted) of each of the micromirrors 942 of the array to selectively attenuate the optical channels 912. Alternatively, each group of mirrors 942, which reflect a respective optical channel 912, may be individually controlled by flipping a group of micromirrors to attenuate each respective optical channel.

As best shown in FIGS. 73–75, the micromirror device 940 is oriented to reflect the attenuated channels through the transform lens 924 to the diffraction grating 922, as indicated by arrows 932, 936, when the micromirrors 942 are disposed in the first position, and deflects a portion of the incident light away from the transform lens 924 when the micromirrors are disposed in the second position, as indicated by arrows 930. This "digital" mode of operation of the micromirrors advantageously eliminates the need for any type of feedback control for each of the micromirrors. The micromirrors are either "on" or "off" (i.e., first position or second position, respectively), and therefore, can be controlled by simple digital logic circuits.

FIG. 74 further illustrates the outline of the optical channels 912, which are collimated and imaged by the imaging lens 920, onto the array of micromirrors 942 of the micromirror device 940. The optical channels 912 have a generally circular cross-section and are imaged at separate and distinct locations on the micromirror device 940, such that the optical channels do not substantially overlap spectrally when focused. The cross-sectional area of each optical channel is sufficient to image over a multitude of micromirrors 942. The diameter of the channels 912 is defined by the characteristics of the imaging lens 920 and the distance between the first collimator and the micromirror device 926. One will appreciate though that the input optics, which include the imaging lens 920, may be designed to reflect and focus any optical channel or group of optical channels with any desired cross-sectional geometry, such as elliptical, rectangular, square, polygonal, etc. Regardless of the cross-sectional geometry selected, the cross-sectional area of the channels 912 should illuminate a plurality of micromirrors 942.

To attenuate an optical channel 912, such as that centered at wavelength $\lambda_2$, for example, a predetermined number of micromirrors 942 disposed in the area illuminated by the optical channel at $\lambda_2$ are tilted to reflect a portion of the light of the optical channel away from the output path 932. Specifically, the dark shaded micromirrors 956 are tilted to the second position to deflect the incident light away, as indicated by arrows 930, and the white micromirrors 958 are tilted to the first position to reflect the incident light along the output path, as indicated by arrows 932. One will appreciate that each portion or pixel of light, which is reflected away from the output path 932, attenuates the optical channel 912 by a percentage defined by the reciprocal of the number of micromirrors 942 illuminated by the optical channel at $\lambda_2$. For example assuming each optical channel 912 illuminates 300 micromirrors 942, each micromirror is representative of approximately 0.3% attenuation (or approximately 0.01 to 0.02 dB) of the optical signal when the micromirror is tilted away. The above example assumes that the intensity of the light of each optical channel is uniform over the entire cross-section of the beam of light. One will appreciate that the intensity spatial profile of the beam of the optical channel may be Gaussian, and therefore, the beam intensity illuminating the pixels at the edges (wings) of the beams of the optical channels 912 is less than the center portion of the beams, which advantageously increases the resolution of the selectable attenuation of the optical channel or band.

FIG. 74 also illustrates various patterns 956 of flipped micromirrors 942 to attenuate the optical channels 912. The micromirrors may be simultaneously or sequentially flipped to generate the desired pattern. To vary the attenuation of the channels, the micromirrors are sequentially flipped to increase or reduce the dimensions of the attenuation patterns, similar to that described in U.S. patent applications, Ser. Nos. 60/281,079 and 60/311,002, which are incorporated herein by reference in their entirety. Further, the dimensions of the attenuation pattern 956 may be reduced or increased by flipping the micromirrors in any sequence, such as flipping sequentially the micromirrors of the attenuation pattern from the inner most micromirrors to the outermost micromirrors or visa versa. It is also contemplated that the attenuation pattern may move or shift about the micromirror device to vary the attenuation without changing the dimension of the attenuation pattern.

For example as shown at channels centered at $\lambda_1$–$\lambda_3$ of FIG. 74, the optical channels 912 are attenuated by deflecting two portions of the outer edges of the channels. In other embodiments, the optical channels 912 centered at $\lambda_1$, $\lambda_5$ and $\lambda_N$ illustrate attenuation patterns that attenuate various inner portions of the optical channels 912. While various patterns of attenuation are shown in FIG. 74, one will recognize that any number of patterns of flipped micromirrors 42 or sequence of flipping the micromirrors may be selected to attenuate the optical channels 912. Further, one will appreciate that the pattern or sequence of attenuating each optical channel may be uniform, or non-uniform; or symmetrical or non-symmetrical.

While the micromirrors 942 may switch discretely from the first position to the second position, as described hereinabove, the present invention contemplates that the micromirrors may move continuously (in an "analog" mode) or in a plurality of discrete steps between the first position and second position. In the "analog" mode of operation the micromirrors can be tilted in a continuous range of angles. The ability to control the angle of each individual micromirror 942 has the added benefit of much more attenuation resolution than in the digital control case. In the "digital" mode, the number of micromirrors underneath each channel determines the attenuation step resolution. In the "analog" mode, each micromirror 942 can be tilted slightly allowing fully continuous attenuation of the optical channel.

Figure 77:
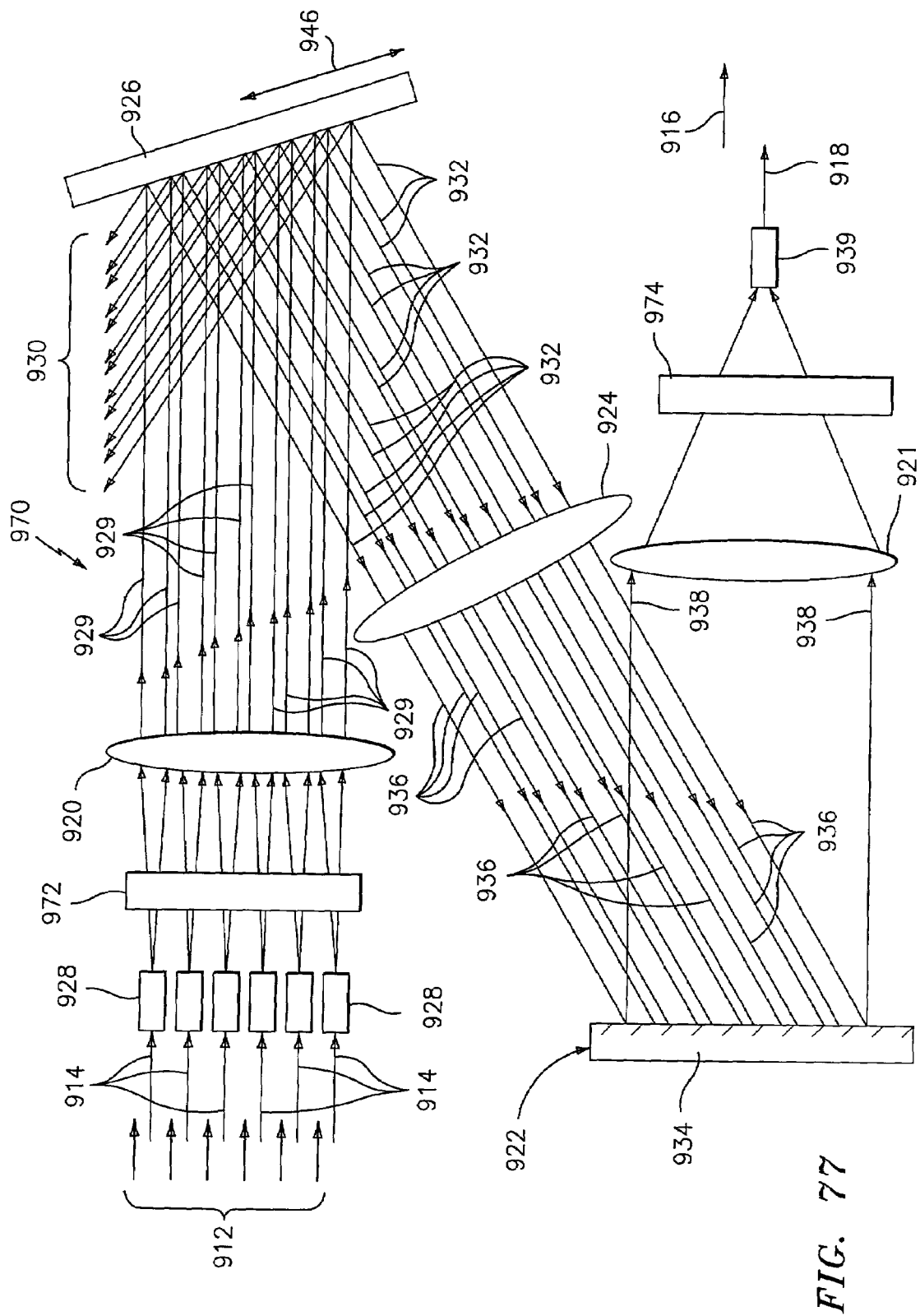
FIG. 77 is a block diagram of another embodiment of a VOA Mux including a spatial light modulator, in accordance with the present invention.

In another exemplary embodiment, a VOA Mux 970 is shown in FIG. 77 that is substantially similar to the VOA Mux 900 of FIG. 73, and therefore, common components have the same reference numeral. The VOA Mux 970 includes a first and second set of polarization optics 972,974 to compensate for or eliminate polarization dependent loss (PDL). The first set of polarization optics 972 is disposed optically between the input pigtails 914 and the imaging lens 920, and the second set of polarization optics is disposed optically between the collimator 921 and the output pigtail 918. The first set of polarization optics 972 includes a polarization splitter (not shown) for splitting each channel into its pair of polarized light beams 976,977 (see FIG. 78) and a rotator (not shown), such as a ½ wave plate, for rotating one of the polarized light beams 977 of each optical channel 912. The second set of polarization optics 974 includes a rotator (not shown), such as a ½ wave plate, for rotating the rotated, polarized light beams 977 of each channel 912, and a polarization splitter (not shown) for recombining the pair of polarized light beams 976,977 of each channel.

Figure 78:
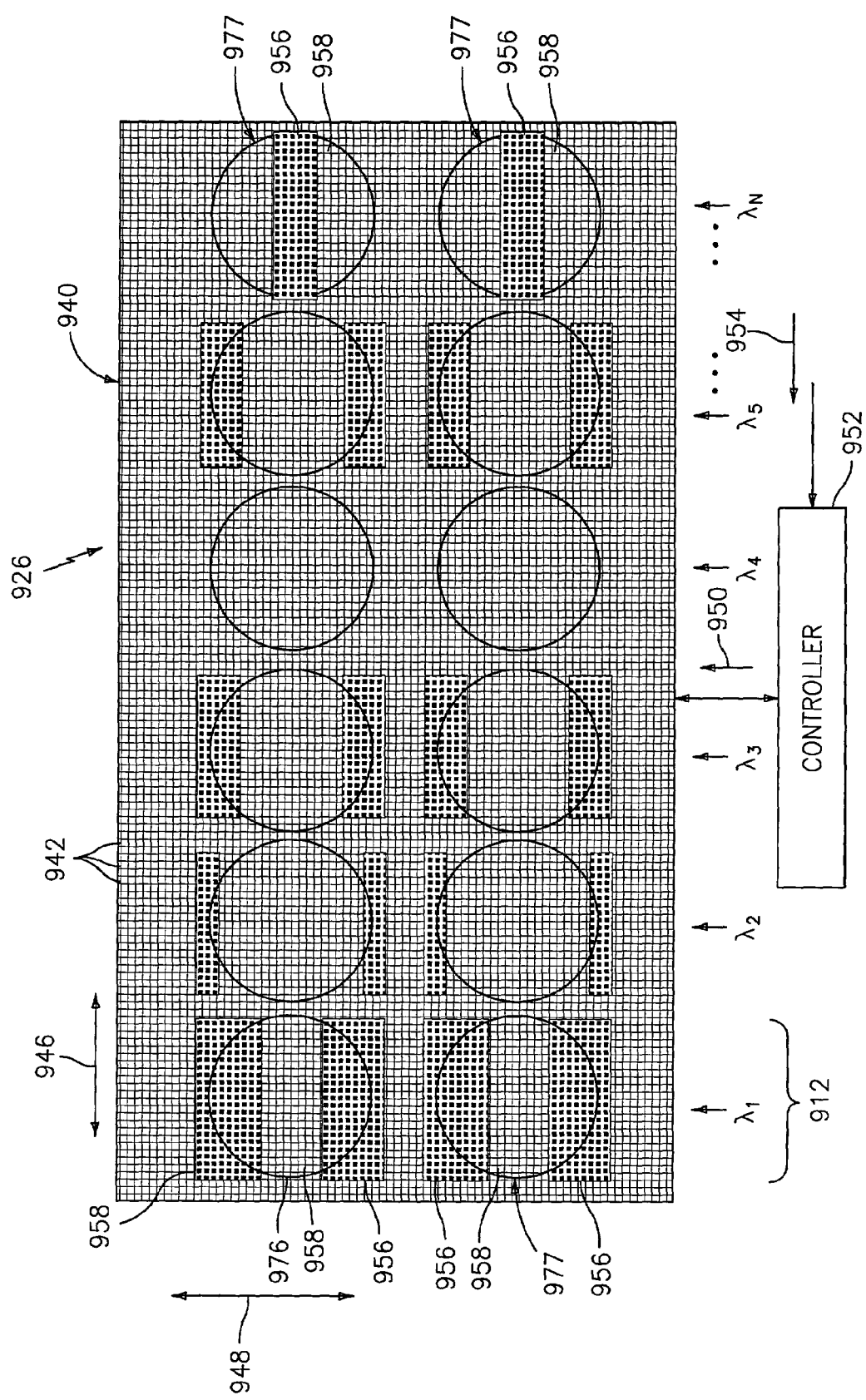
FIG. 78 is a block diagram of a spatial light modulator of the VOA Mux of FIG. 77 having a micromirror device, wherein the optical channels of a WDM input signal are distinctly projected onto the micromirror device, in accordance with the present invention.

FIG. 78 illustrates the outline of the polarized light beams 976,977 of the optical channels 912, which are imaged by the imaging lens 920 onto the array of micromirrors 942 of the micromirror device 940. The polarized light beams 976,977 have a generally circular cross-section and are imaged at separate and distinct locations on the micromirror device 940, such that the polarized light beams of the optical channels 912 do not substantially overlap spatially when focused onto the spatial light modulator 926.

Similar to that described hereinbefore, a predetermined number of micromirrors 942 are tilted or flipped to reflect a portion of the light of the optical channel 912 away from the output path 932 to attenuate the polarized light beams. Specifically, the dark shaded micromirrors 956 are tilted to the second position to deflect the incident light 929 along the optical path 930, and the white micromirrors 958 are tilted to the first position to reflect the incident light along the output path 932. In an exemplary embodiment as shown, each pair of polarized light beams 976,977 are equally attenuated, however, one will appreciate that each polarized light beam of each channel may be distinctly attenuated using different attenuation patterns or sequence, as shown in FIG. 74, and/or attenuated at different levels of attenuation.

Figure 79:
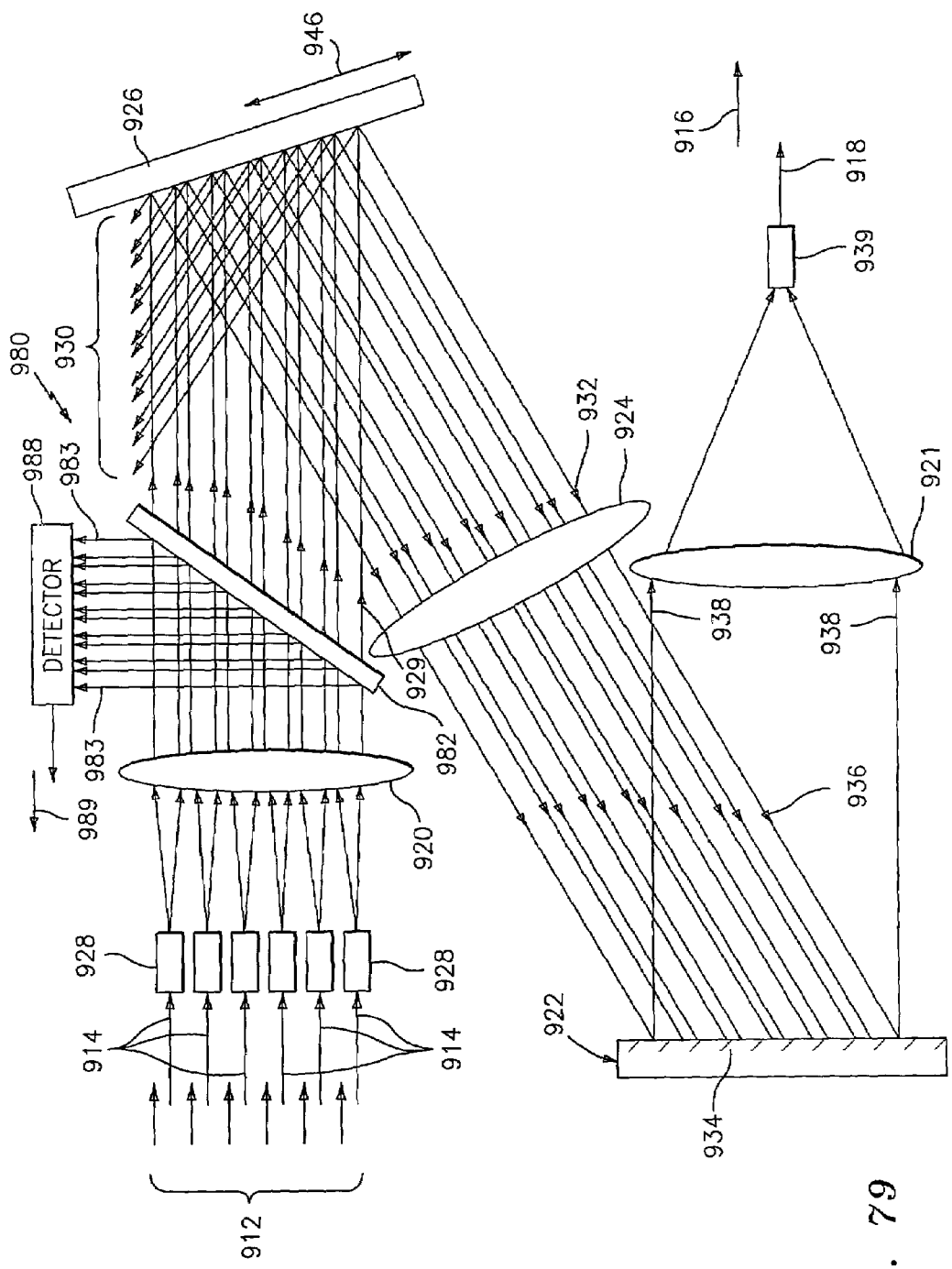
FIG. 79 is a block diagram of another embodiment of a VOA Mux including a spatial light modulator and detector, in accordance with the present invention.

FIG. 79 illustrates another embodiment of a VOA Mux 980 that is similar to the VOA Mux 900 of FIG. 73, and therefore similar components have the same reference numerals. The VOA Mux 980 further includes a partial reflective element or mirror 982 optically disposed to reflect a predetermined portion 983 of each channel 912 to a detector 988 for determining the power level of each of the channels. In the exemplary embodiment shown in FIG. 79, the partial mirror 982 is disposed between the imaging lens 920 and the spatial light modulator 926. In this configuration, the detector 988 senses the optical channels before attenuation thereof. Alternatively, the partial mirror9 82 and the detector 988 may be optically disposed between the spatial light modulator 926 and the diffraction grating 922, either before or after the transform lens 924, to sense the optical channels after attenuation thereof.

The partial mirror 982 may comprise a glass element, having a partially reflective coating, or any other known partially reflective component. The detector 988 may include a plurality of photodetectors (not shown), such as a photodiode, for receiving the light reflected from each respective channel 912. As shown in FIG. 79, the detector then provides a feedback signal(s) 989 for a closed-loop system to that shown in FIG. 80, which will be described hereinafter. Alternatively, the detector 988 may include at least one photodetector that may be linearly translated to sequentially or selectively receive the partial light from each optical channel 912. Rather than translating the photodiode (s) laterally, the partial mirror 982 may be pivoted about an axis to direct the light of each optical channel to the photodiode(s), similar to that disclosed in U.S. patent Ser. No. 60/295,459, entitled "Optical Channel Monitor", which is incorporated herein by reference in its entirety. Further, the detector 988 may include a CCD or LCD array for sensing the power of the optical channels 912. Alternatively, the detector 988 as described hereinabove may be optically disposed to receive the light deflected off the spatial modulator 926 along path 930. One will appreciate that a bulk lens (not shown) may be disposed between the partial mirror 982 and the detector 988 to focus the optical channel 912 onto the photodetector(s).

Figure 80:
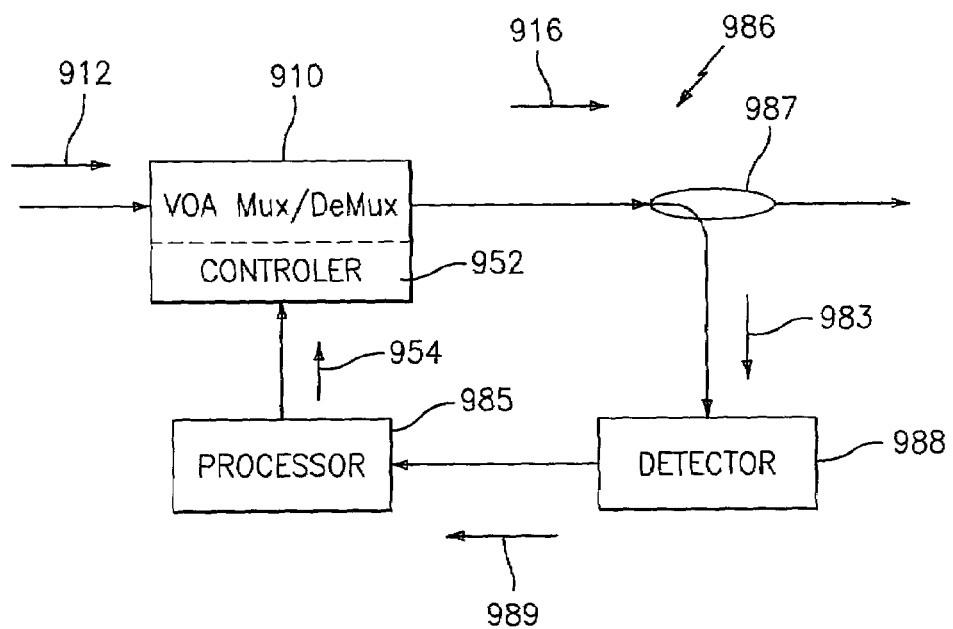
FIG. 80 is a closed-loop optical system including a VOA Mux in accordance with the present invention.

In FIG. 80, a closed-loop system 986 is shown wherein an optical channel (s) 912 is provided to a VOA Mux/DMux embodying the present invention, such as the VOA Mux 900 of FIG. 73 and/or the VOA Mux 980 of FIG. 79. An optical coupler 987 taps off a portion 983 of the attenuated output signal 916 to the detector 988, which measures the power level of the channel, for example. The detector 988 generates and provides a feedback signal 989 to the processor 985. In accordance with a feedback algorithm and the feedback signal 989, the processor 985 generates the input command 954. In response to the input command 954, the controller 952 generates and provides the control signal 9950 (see FIG. 74) to the micromirror device 940, which in turn flips the appropriate micromirrors 942 to attenuate the optical channel 912.

While the VOA Muxs 900, 970, 980 described hereinbefore in FIGS. 73, 77 and 79, respectively, are shown and described as a multiplexer, one will appreciate the VOA Muxs may function as a demultiplexer (i.e., VOA Demux) by simply providing a WDM input optical signal to the output pigtail 918 with each input pigtail 914 providing a respective output signal indicative of a selectively attenuated optical channel of the WDM input signal, similar to that described hereinafter.

Figure 81:
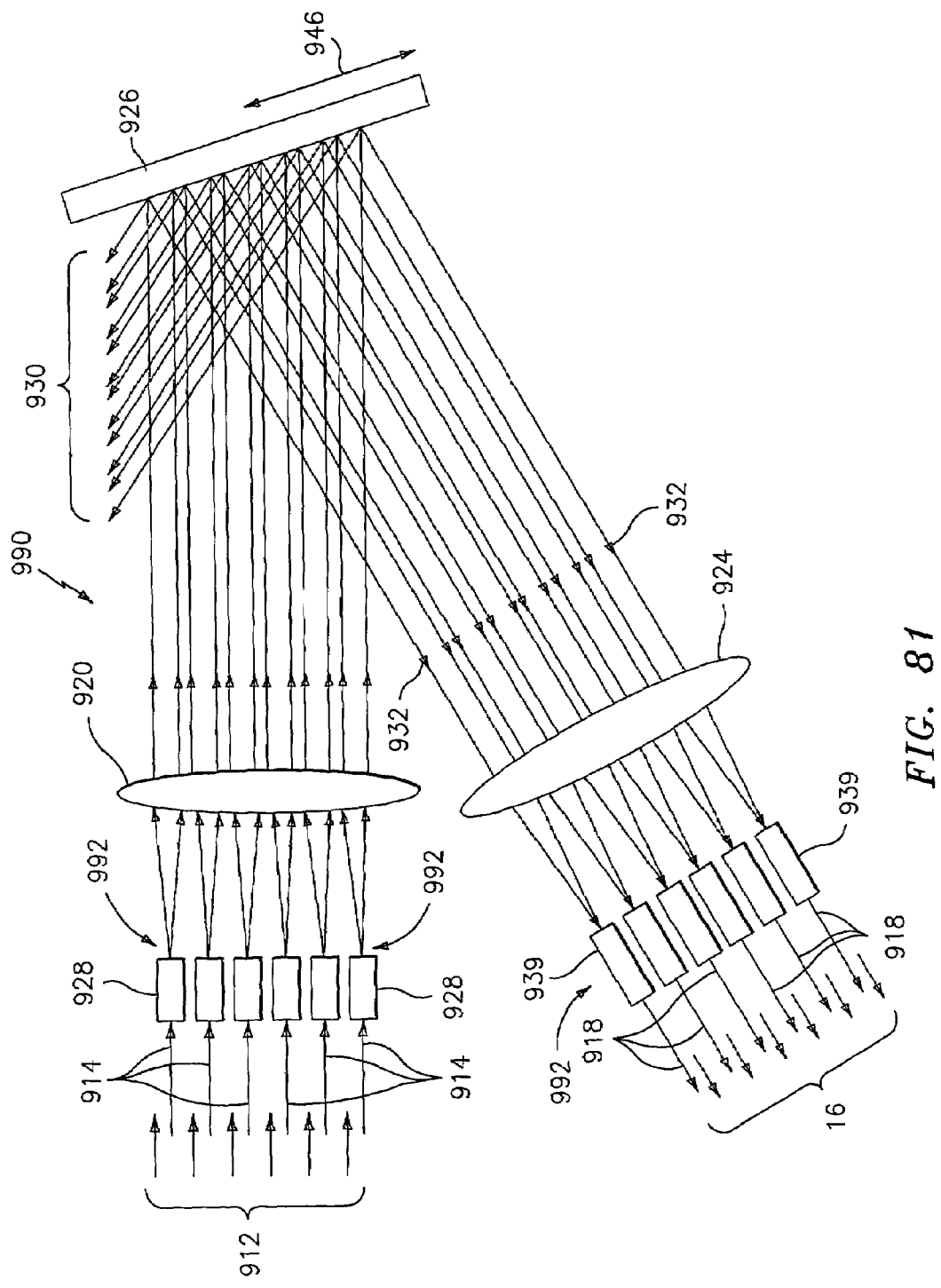
FIG. 81 is a block diagram of a variable optical attenuator (VOA) device, having a plurality of 1×1 VOAs that include a spatial light modulator, in accordance with the present invention.

FIG. 81 illustrates an N 1×1 variable optical attenuator (VOA) device 990, in accordance with the present invention, having a plurality VOAs 992. The VOA device 990 is similar to the VOA Mux 900 of FIG. 73, except the VOA device does not include the multiplexing optics, i.e., the collimator lens 921 and the diffraction grating 922. Further, the VOA device has a plurality of output pigtails 918 for receiving respective attenuated, optical channels passing through the transform lens 924.

Figure 83:
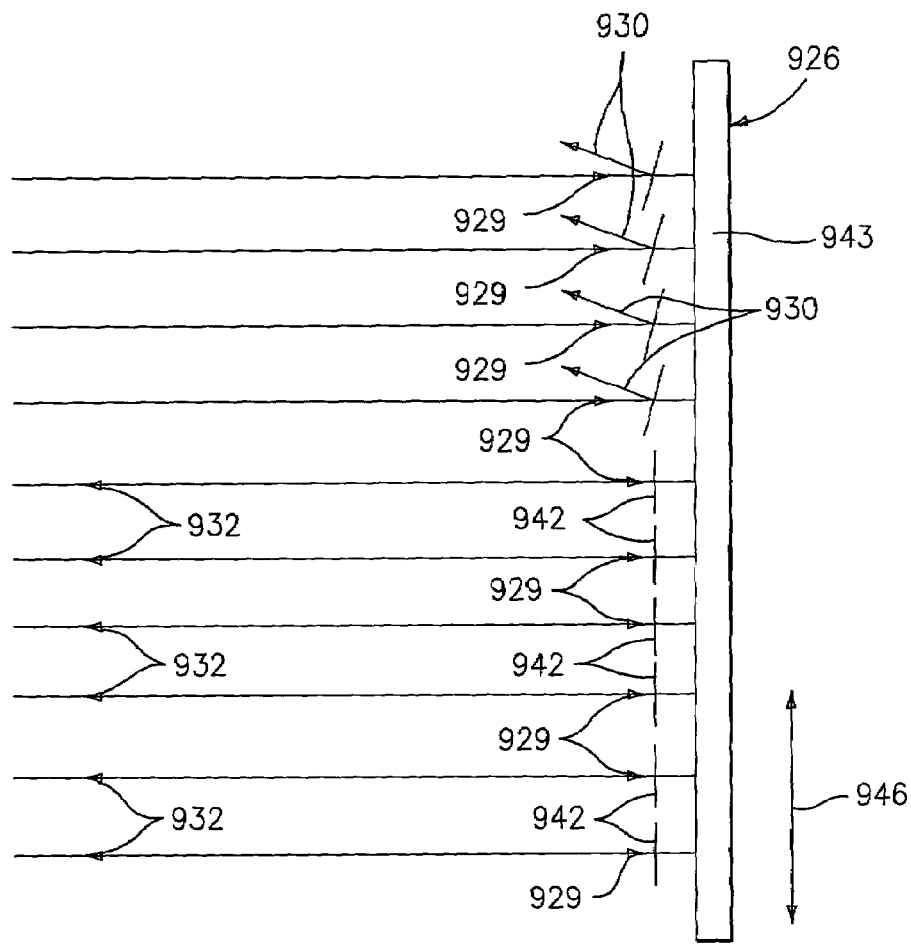
FIG. 83 is an expanded cross-sectional view of the micromirror device of FIG. 82 showing a partial row of micromirrors, in accordance with the present invention.
Figure 82:
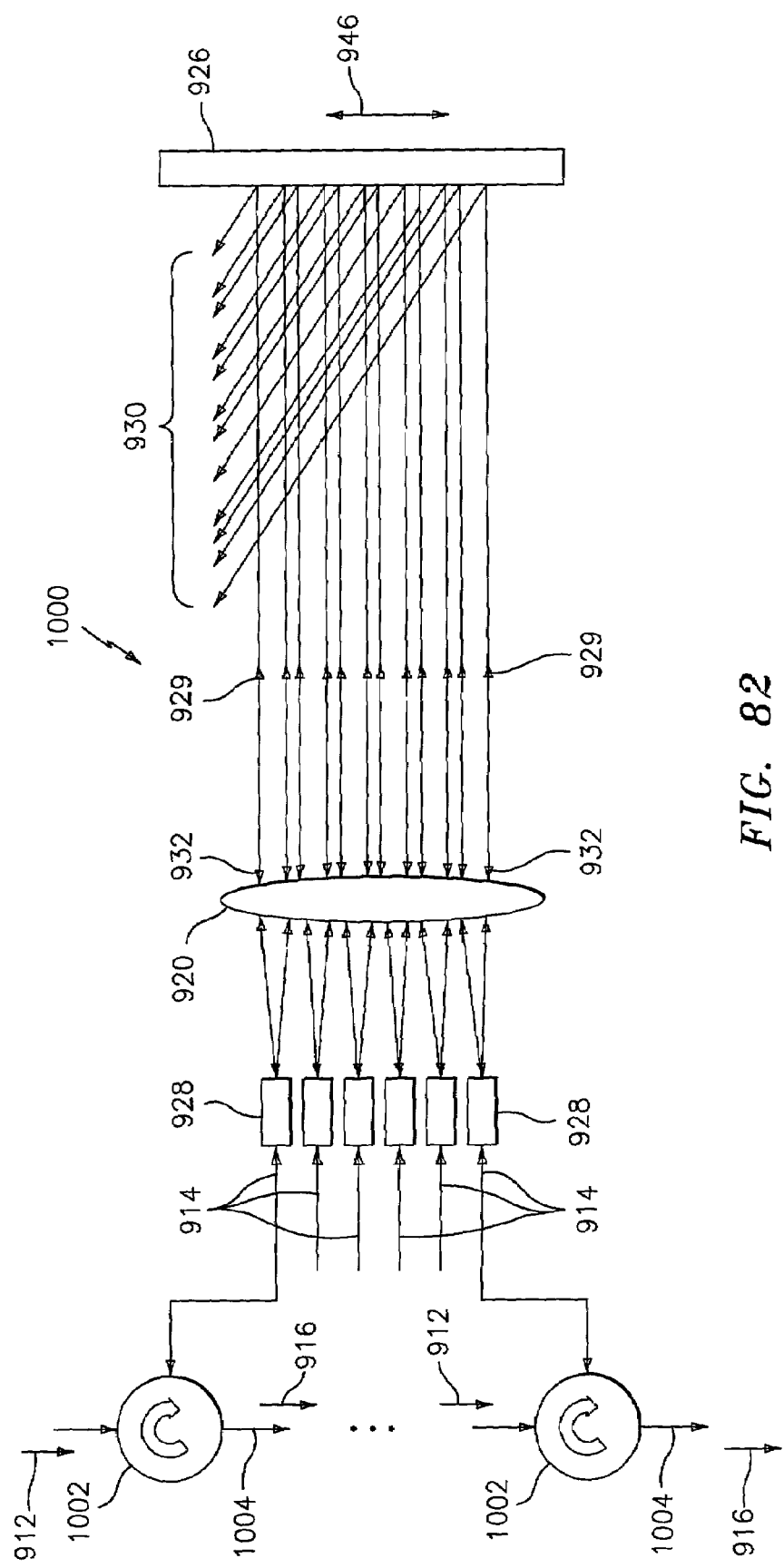
FIG. 82 is a block diagram of another embodiment of a VOA device including a spatial light modulator and detector, in accordance with the present invention.

In another exemplary embodiment of a VOA device 1000 is shown in FIG. 82 that is similar to the VOA device 990 of FIG. 81, except the micromirror device 940 of the spatial light modulator 926 is tilted to reflect the attenuated, optical channels back through the imaging lens 920, as indicated by arrows 932, to the corresponding input pigtail 914. In other words, as shown in FIG. 83, the micromirrors 940 either lie flat (i.e., parallel to the base 945) in a first position and thus reflect light back along the output path, as indicated by arrows 932, or can be tilted or flipped to a second position such that the micromirrors deflect light away from the output path 932 at a predetermined angle (e.g., 20 degrees), as indicated by arrows 930. A 3-port optical circulator 1002 is optically connected to each respective input pigtail 914 to direct the optical input channel 912 to the respective input pigtail, and to direct the attenuated optical channel from the input pigtail to a respective optical waveguide 1004 to provide the output signal 916.

Figure 84:
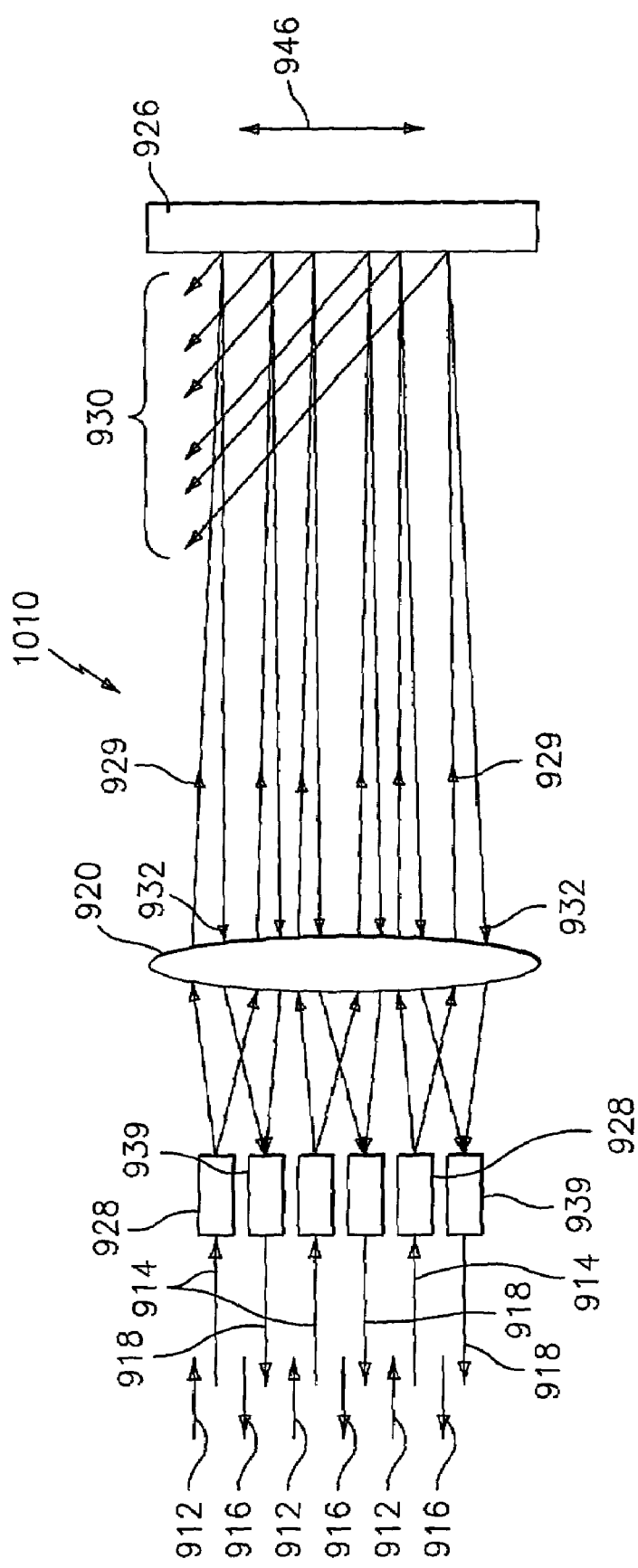
FIG. 84 is a block diagram of another embodiment of a VOA device including a spatial light modulator, in accordance with the present invention.

In another exemplary embodiment, an N 1×1 VOA device 1010 is provided in FIG. 84 that is substantially similar to the VOA device 1000 of FIG. 82, and therefore, common components have the same reference numeral. The VOA device 1010 replaces each of the circulators 1002 of FIG. 82 with an output pigtail 918. Each output pigtail 918 receives a respective attenuated, optical channel reflected from the micromirror device 940 of the spatial light modulator 926 back along a respective optical path 932.

To accomplish these expected return paths, the micromirror device 940 of the spatial light modulator 926 cannot be an image plane of the input pigtails 914 along the spectral axis 946. These conditions can be established by ensuring that the lens system be astigmatic. In particular, the lens 920 may be a cylindricalized lens with its cylindrical axis parallel to the spectral axis 946. By tilting and displacing the micromirror device 940 of the spatial light modulator 926 from the image plane, the return path can be displaced to focus onto the respective output pigtails 918.

Figure 85:
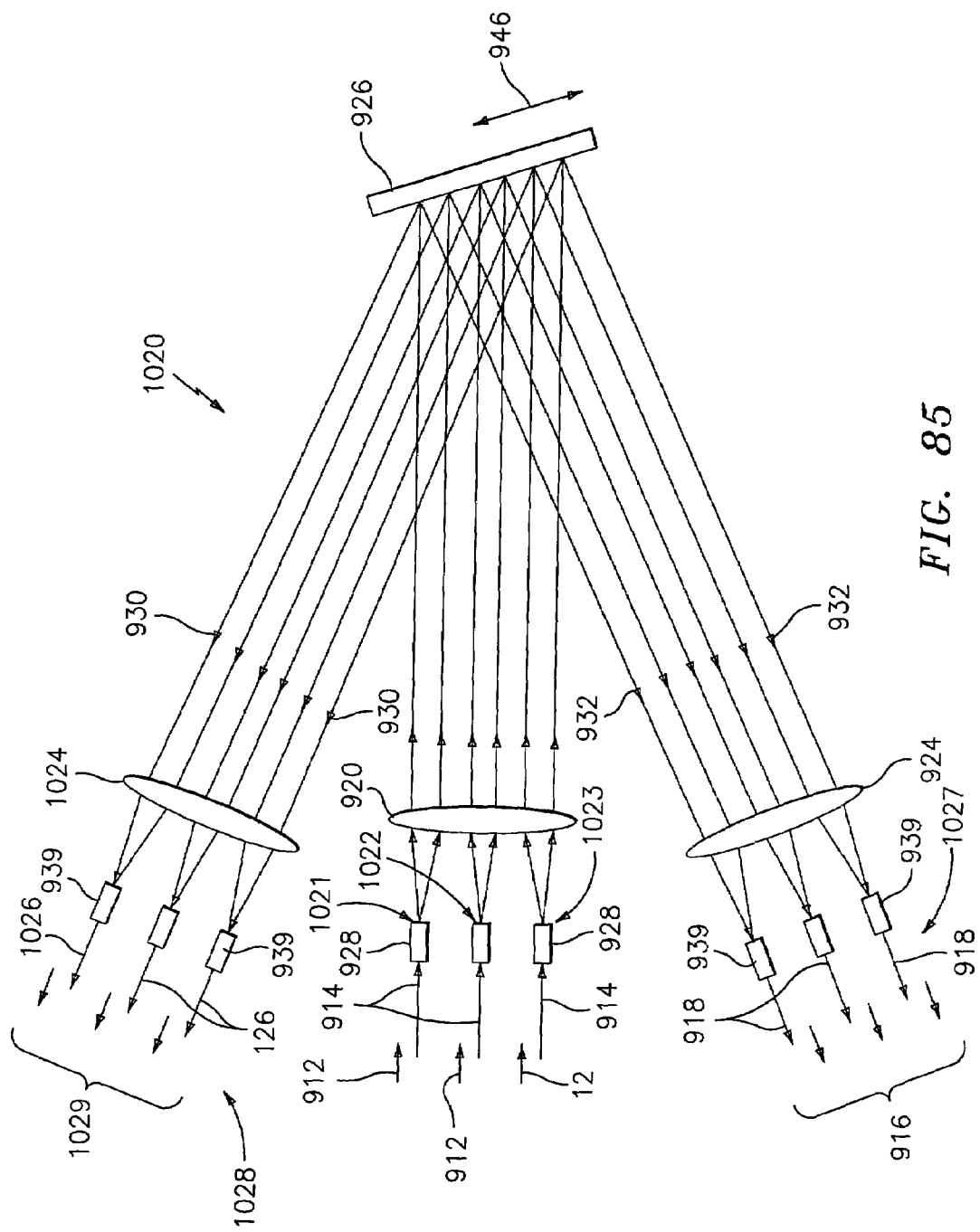
FIG. 85 is a block diagram of an optical switching device including a spatial light modulator, in accordance with the present invention.

FIG. 85 illustrates an N 1×2 optical switching device 1020 embodying the present invention comprising a plurality of optical switches 1021–1023. The optical switching device 1020 is similar to the VOA device 990 of FIG. 80, and therefore the same or similar components have the same reference numerals. The optical switching device 1020 further includes a second transform lens 1024 and a second set of output pigtails 1026. In the operation of each optical switch 1021–1023, an input optical channel 912 is received by an input port (at input pigtails 914) and selectively outputted at either a first output port 1027 (at the first output pigtail 918) or a second output port 1028 (at the second output pigtail 1026). Specifically, a respective input pigtail receives an optical channel, which is then collimated by the imaging lens 920 onto the micromirror device 940 of the spatial light modulator 926. In response to a switching algorithm and an input command 954, the micromirrors 942 of the micromirror device 940 flip to reflect the corresponding optical channel along a first path 932 to the first output port 1027, or a second path 930 to the second output port 1028. The first transform lens 924 focuses the channel directed along the first path 932 onto a corresponding output pigtail 918 to provide an output signal 916 at the first port 1027. The second transform lens 1024 focuses the channels directed along the second path 930 onto a corresponding output pigtail 1026 to provide an output signal 1029 at the second port 1028.

Figure 86:
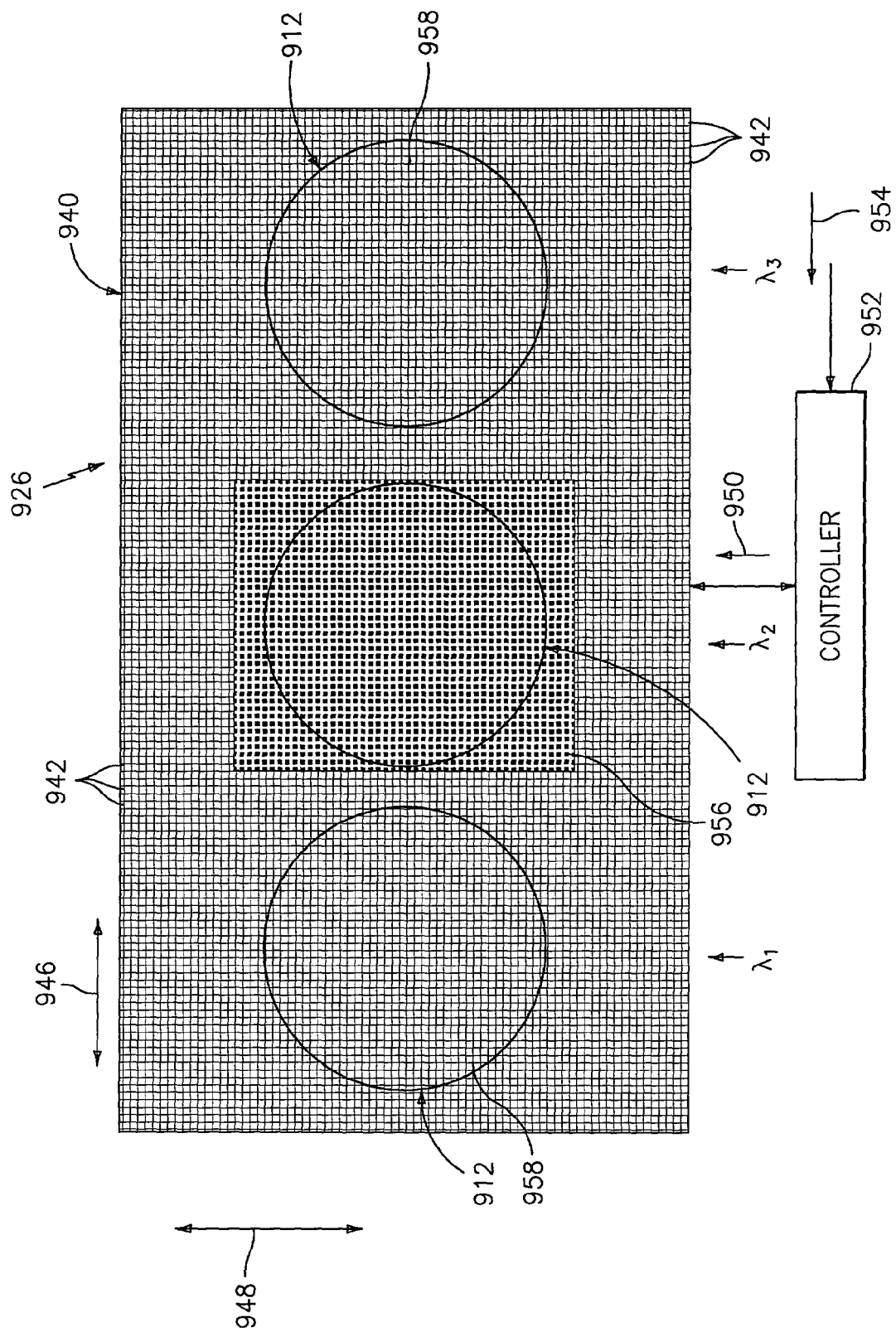
FIG. 86 is a block diagram of a spatial light modulator of the optical switching device of FIG. 85 having a micromirror device, wherein the optical channels are distinctly projected onto the micromirror device, in accordance with the present invention.

FIG. 86 illustrates the outline of the optical channels 912 that are collimated by the imaging lens 920 and imaged onto the micromirror device 940 of the spatial light modulator 926. The optical channels 912 have a generally circular cross-section and are imaged at separate and distinct locations on the micromirror device 940, such that the optical channels do not substantially overlap spatially. The cross-sectional area of each optical channel is sufficient to image over a multitude of micromirrors 942.

To direct an optical channel 912, such as that centered at wavelength $\lambda_2$, for example, to the second set of output pigtails 1026 at the second port 1028 substantially all of the micromirrors 942 disposed in the area illuminated by the optical channel at $\lambda_2$ are tilted to reflect the optical channel along the output path 930 to the output pigtails 1026. Specifically, the dark shaded micromirrors 956 reflect the incident light along the second optical path 930, and the white micromirrors 958 reflect the incident light along the first optical path 932 to the first set of output pigtails 918.

Figure 87:
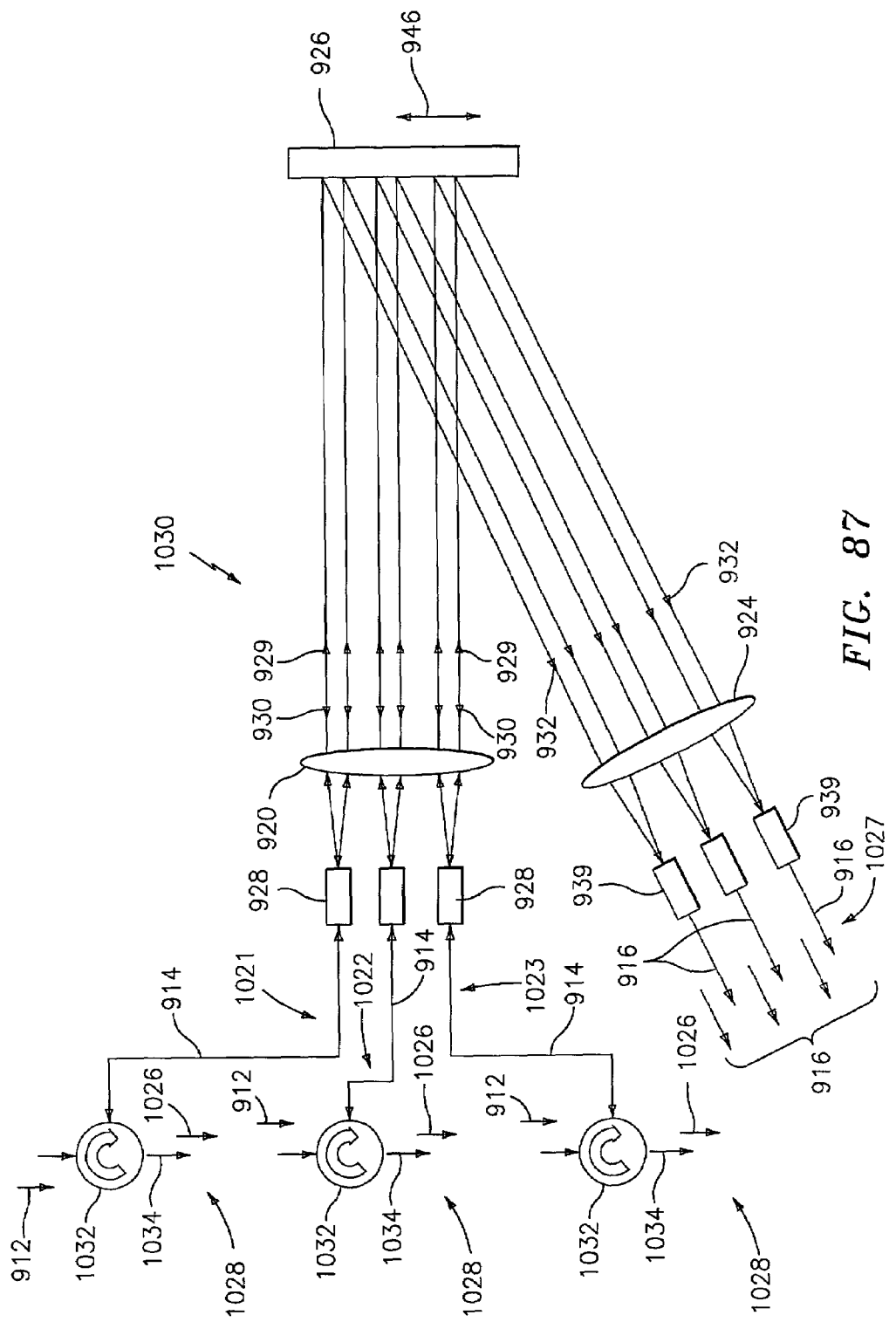
FIG. 87 is a block diagram of another embodiment of an optical switching device including a spatial light modulator, in accordance with the present invention.

In another exemplary embodiment of an N 1×2 optical switching device 1030 of FIG. 87, similar to the optical switching device 1020 of FIG. 85, the micromirror device 940 of the spatial light modulator 926 is tilted or positioned to reflect the optical channels 912 directed to the second port 1028 back through the imaging lens 920, as indicated by arrows 930, to the corresponding input pigtail 914. A 3-port optical circulator 1032 is optically connected to each respective input pigtail 914 to direct the optical input channel 912 to the input pigtail 914, and to direct the output optical channel from the input pigtail to an optical waveguide 1034 to provide the output signal 1026.

Similar to the N 1×1 VOA device 1010 described and shown in FIG. 83, the circulators 1032 of the optical switch device 1030 of FIG. 87 may be replaced with another set of output pigtails (not shown). Each output pigtail 918 receives a respective switched, optical channel reflected from the micromirror device 940 of the spatial light modulator 926 back substantially along a respective optical path 930. Specifically, the output pigtails receive the returned switched channels 1034 reflected back along the return optical path 930 similar to the pigtails 918 of FIG. 83.

One will appreciate that the optical switching device 1020, of FIG. 85 may function as an optical splitter (not shown) by simply flipping a number of micromirrors less than all the micromirrors 940 illuminated by the respective optical channel 912. For example, assuming the light distribution over the cross-section of the light beam of the channels 912 is uniform, half of the micromirrors may be flipped to reflect half the light of the optical channel to the first set of output pigtails 918 at the first output port 1027 and the other half of micromirrors may be flipped to direct the other half of light of the optical channel 912 to the second set of output pigtails 1026 at the second output port 1028.

One example of a micromirror device 940, similar to that shown in FIGS. 73 and 74, is the Digital Micromirror Device™ (DMD™) manufactured by Texas Instruments and described in the white paper entitled "Digital Light Processing™ for High-Brightness, High-Resolution Applications", white paper entitled "Lifetime Estimates and Unique Failure Mechanisms of the Digital Micromirror Device (DMD)", and news release dated September 1994 entitled "Digital Micromirror Display Delivering On Promises of 'Brighter' Future for Imaging Applications", which are incorporated herein by reference, as described hereinbefore.

Figure 88:
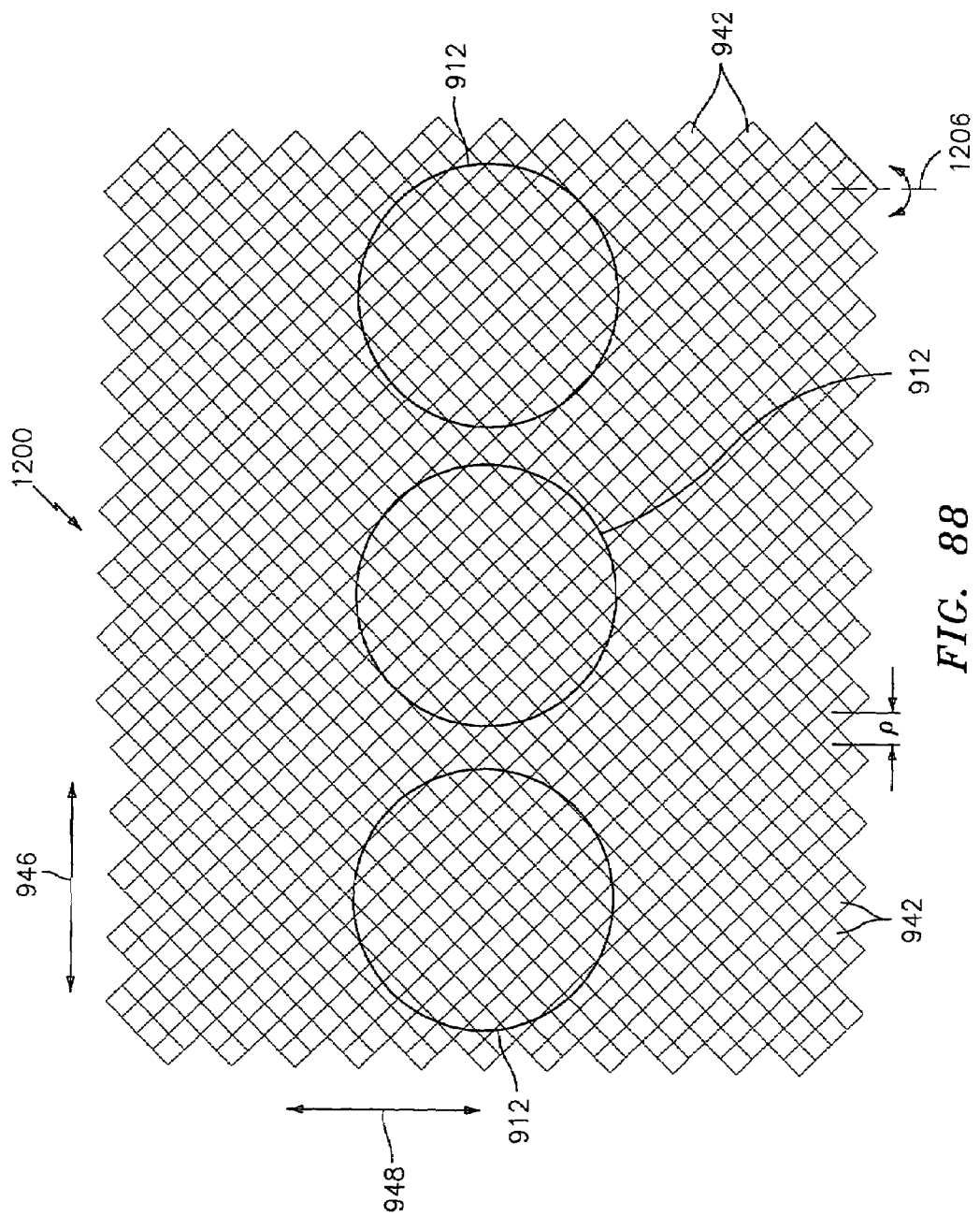
FIG. 88 is an expanded view of the micromirror device of the spatial light modulator of FIG. 14, wherein the optical channels are distinctly projected onto the micromirror device, in accordance with the present invention.

As described hereinbefore, the micromirrors 942 of the micromirror device 1200 flip about a diagonal axis 1206 as shown in FIG. 88. In an exemplary embodiment of the present invention shown in FIG. 88, the optical input channels 912 are focused on the micromirror device 1200 such that the spatial axis 948 of the optical channel is parallel to the tilt axis 1206 of the micromirrors. This configuration is achieved by rotating the micromirror device 45 degrees compared to the configuration shown in FIG. 83. Focusing the optical channels in this orientation maximizes the ability to control the attenuation step. Alternatively, the optical channels 912 may be focused such that the spatial axis 948 of the optical channel 912 is perpendicular to the tilt axis 1206 of the micromirrors. One will appreciate, however, that the micromirrors may flip about any axis, such as parallel to the spectral axis 46 or any desired angle therebetween.

While the embodiments of the present invention described hereinabove illustrate a single chromatic dispersion compensation device using a set of optical components, it would be advantageous to provide an embodiment including a plurality of dispersion compensation devices that uses a substantial number of common optical components, including the spatial light modulator.

While the VOA Mux and VOA Demux embodying the present invention described hereinabove illustrate a single device using a set of optical components, it would be advantageous to provide an embodiment including a plurality of VOA Muxs or VOA Demuxs that uses a substantial number of common optical components, including the spatial light modulator. Such an embodiment includes a complementary set of input pigtails 914 spatially displaced from the first set of input pigtails, and a complementary output pigtail 918 spatially displaced from the first output pigtail. The light passing to and from the input and output pigtails propagate and reflect off the same optics.

Figure 89:
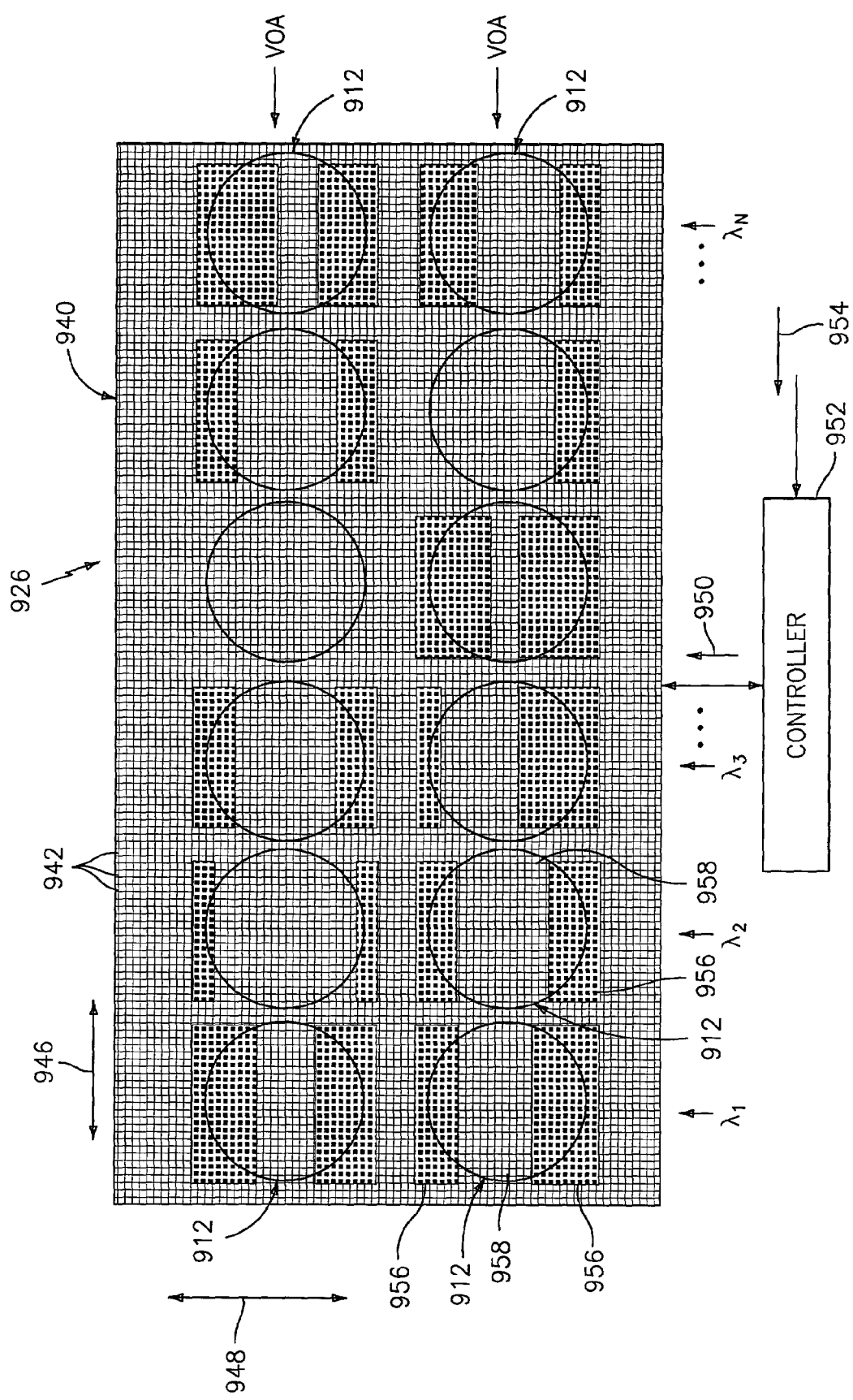
FIG. 89 is a block diagram of a spatial light modulator of a VOA Mux device that includes a plurality VOA Muxs, wherein the optical channels are distinctly projected onto the micromirror device, in accordance with the present invention.

To provide a plurality of VOA Muxs (or VOA Demuxs) (VOA Mux$_1$, VOA Mux$_2$) using similar components, each VOA Mux uses a different portion of the micromirror device 926, as shown in FIG. 89, which is accomplished by displacing spatially the second set of input and output pigtails. As shown, the channels 912 of each VOA Mux (VOA Mux$_1$, VOA Mux$_2$) is displaced a predetermined distance in the spatial axis 948. Similar to that described hereinabove, the shaded micromirrors 956 deflect a portion of the channel 912 away from the output path 932 (see FIG. 73), and the white micromirrors 958 reflect a portion of the channel along the output path 932. While a pair of VOA Muxs (or Demuxs) is shown in FIG. 89, one will recognize that another embodiment of the present invention has N number of VOA Muxs (or VOA DeMuxs) using substantially the same optical components, as described hereinabove.

While the micromirrors 984 may switch discretely from the first position to the second position, as described hereinabove, the micromirrors may move continuously (in an "analog" mode) or in discrete steps between the first position and second position. In the "analog" mode of operation the micromirrors can be can be tilted in a continuous range of angles. The ability to control the angle of each individual mirror has the added benefit of much more attenuation resolution than in the digital control case. In the "digital" mode, the attenuation step resolution is determined by the number of micromirrors 984 illuminated by each channel. In the "analog" mode, each mirror can be tilted slightly allowing fully continuous attenuation of the return beam. Alternatively, some combination of micromirrors may be switched at a predetermined or selected pulse width modulation to attenuate the optical channel or band.

One will recognize that each respective input pigtail 914 of the N1×1 VOA devices and N 1×2 optical switching devices described hereinbefore may receive an optical input channel 912 centered at any center wavelength.

While the embodiments of the present invention described hereinbefore include an input pigtail 914 for receiving an optical channel 912, one will recognize that the present invention contemplates that the optical channel 912 may comprise a plurality of optical channels or band of adjacent channels.

In the embodiments of the present invention described hereinbefore, the imaging lens 920 may be replaced by a plurality of graded index lenses (GRIN lens), one GRIN lens for each input pigtail 914 (or output pigtail for the VOA Demux). The use of GRIN lens is particularly advantageous for the VOA Mux 900 of FIG. 73 (and VOA Demux), in which the WDM channel arrangement wavelength order, bandpass and separation should match the characteristics of the dispersive element (grating or prism or AWG-arrayed wave guide) used to multiplex (or demultiplex) the different wavelength channels or beams. Under standard conditions where channels are separated on the order of a nanometer or half a nanometer in wavelength and optical components have apertures on the order of centimeters, the ratio of channel width to channel separation is not compatible with fiber core diameter to fiber outer diameter. Under these conditions, an array of graded index lenses can transform the fiber core beams of an array of fibers (i.e., pigtails) and provide a match of the channel width to channel separation set by the dispersive element.

Although the invention has been described as using an array of digital micro-mirrors to implement the pixelating device in the embodiments shown herein, it should be understood by those skilled in the art that any pixelating device that provides pixelated optical signal processing may be used, as described further below. Further, instead of using micro-mirrors with two reflective states or angles of reflection (e.g., +/−10 deg) as a pixel that reflects a portion of the light beam, the pixels may have one reflective state and the other state may be absorptive or transmissive. Alternatively, instead of the pixel having at least one state being reflective (which may provide other design advantages), the pixel may have one state being transmissive and the other state being absorptive. Alternatively, the pixel may have two transmissive or partially transmissive states that refract the incoming light out at two different angles. For each of various pixelating devices, the optics surrounding the pixelating device would be changed as needed to provide the same functions as that described for each of the embodiments herein for the different type of pixelated optical signal processing used.

Also, instead of the pixels having a square, diamond or rectangular shape, the pixels may have any other two or three-dimensional shapes, i.e., circle, oval, sphere, cube, triangle, parallelogram, rhombus, trapezoid.

One pixelating device, for example, may include liquid crystal technology, such as a liquid crystal display (LCD). An LCD may provide a device having either one absorptive state and one reflective state, or one absorptive state and one transmissive state. The underlying principle of an LCD is the manipulation of polarized light (i.e., an optical channel). For example, the polarized light may be rotated by 90 degrees in one state of the liquid crystal and not rotated in another state. To provide an LCD having one absorptive state and one transmissive state, a polarizer is provided at each side of the liquid crystal, such that the polarization angles of the polarizers are offset by 90 degrees. A mirror can be added at one end to provide an LCD having one absorptive state and one reflective state.

One example of having a reflective state and a transmissive state is a variation on existing bubble jet technology currently produced by Agilent and Hewlett-Packard Co., and described in U.S. Pat. Nos. 6,160,928 and 5,699,462, respectively. In that case, when the bubble is in one state, it has total internal reflection; and when in the other state, it is totally transmissive. Also in that case, the pixels may not be square but circular or oval.

One example of having a transmissive state and an absorptive state is Heterojunction Acoustic Charge Transport (HACT) Spatial Light Modulator (SLM) technology, such as that described in U.S. Pat. No. 5,166,766, entitled "Thick Transparent Semiconductor Substrate, Heterojunction Acoustic Charge Transport Multiple Quantum Well Spatial Light Modulator", Grudkowski et al and U.S. Pat. No. 5,158,420, entitled "Dual Medium Heterojunction Acoustic Charge Transport Multiple Quantum Well Spatial Light Modulator" to Grudkowski et al, provided the material used for the HACT SLM will operate at the desired operational wavelength. In that case, the pixels may be controlled by charge packets that travel along a surface acoustic wave that propagates along the device, where the size of the charge controls the optical absorption.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. A dynamically selectable optical filter, comprising:
   a light dispersive element which receives input light and provides a separated light having various wavelengths of light spatially distributed;
   a pixellating filter device, which receives said separated light, having a two-dimensional array of pixels, each of said wavelengths of light being incident on a plurality of pixels, each of said pixels having a first reflection state and a second reflection state in response to a pixel control signal, and said pixellating filter device providing a selected reflected separated light indicative of light provided from said pixels in said first reflection state based on a filter function;
   a light combining element, which receives said selected reflected separated light and recombines said selected reflected separated light to provide an output light; and
   a controller which generates said pixel control signal indicative of said filter function and wherein said filter function is selectable.

2. The apparatus of claim 1 wherein said pixelating filter device comprises a micro-mirror device and said pixels comprise micromirrors.

3. The apparatus of claim 1 wherein said filter function is: a band pass filter, a low pass filter, a band reject filter, or a high pass filter.

4. The apparatus of claim 1 wherein said filter function is a predetermined optical loss function.

5. The apparatus of claim 1 wherein said filter function changes dynamically over a predetermined time period.

6. The apparatus of claim 1 wherein said filter function changes continuously based on a predetermined filter change profile.

7. The apparatus of claim 1, wherein the light dispersive element comprises a diffraction grating.

8. The apparatus of claim 1, wherein the light dispersive element disperses optical channels of the input light onto the pixellating filter device to substantially separate the optical channels on the pixellating filter device.

9. The apparatus of claim 1, wherein the cross-sectional area of at least one channel of separated input light is generally circular in shape.

10. The apparatus of claim 1, wherein the cross-sectional area of at least one channel of separated input light is generally elliptical in shape.

11. The apparatus of claim 1, wherein at least one optical channel of said input light is projected onto at least 50 micro-mirrors of said pixellating filter device.

12. The apparatus of claim 1, wherein micro-mirrors discretely switch from a first position to a second position.

13. The apparatus of claim 1, wherein the optical filter further comprises:
a prism element, which receives said separated light having an incidence angle, and which provides a first stabilized light signal, said prism element providing a second stabilized light signal in response to said reflected separated light signal, said second stabilized light being substantially independent of changes in said incidence angle of said separated light.

14. The apparatus of claim 1, wherein the optical filter further comprises:
an optical lens, located a predetermined lens distance from said light dispersive element and having a lens focal length, which receives said separated light, and which provides a focussed light signal, said optical lens distance being different from said focal length so as to provide a substantially constant optical loss over a predetermined wavelength range.

15. The apparatus of claim 1, wherein said light dispersive element dispersing the optical channels of the input light onto said pixelating device to substantially overlap the optical channels on said pixellating filter device.

16. The apparatus of claim 1, wherein said pixellating filter device is oriented such that the optical path length for a given wavelength channel is substantially constant across the projected image on the pixellating filter device.

17. The apparatus of claim 1, wherein the filter function is selectable in response to an input selection provided by a user.

18. The apparatus of claim 1, wherein the two-dimensional array of pixels includes an array of mnicromirrors, each micromirror being about 14–20 microns wide.

19. The apparatus of claim 1, wherein the two-dimensional array of pixels includes an array of micromirrors having adjacent micromirrors that are closely spaced at approximately 1 micron.

20. The apparatus of claim 1, wherein said filter function is selectable based on a desired spectral filter profile.

* * * * *